(12) United States Patent
Takashima et al.

(10) Patent No.: US 8,583,660 B2
(45) Date of Patent: Nov. 12, 2013

(54) INFORMATION PROCESSING APPARATUS, INFORMATION PROCESSING METHOD, AND COMPUTER PROGRAM

(75) Inventors: Yoshikazu Takashima, Tokyo (JP); Kenjiro Ueda, Kanagawa (JP); Yoshiyuki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1138 days.

(21) Appl. No.: 11/814,977

(22) PCT Filed: Mar. 1, 2006

(86) PCT No.: PCT/JP2006/303844
§ 371 (c)(1),
(2), (4) Date: Jul. 27, 2007

(87) PCT Pub. No.: WO2006/100879
PCT Pub. Date: Sep. 28, 2006

(65) Prior Publication Data
US 2009/0204572 A1  Aug. 13, 2009

(30) Foreign Application Priority Data
Mar. 18, 2005  (JP) ................. P2005-080600

(51) Int. Cl.
*G06F 17/30* (2006.01)
(52) U.S. Cl.
USPC .......................................... 707/749; 707/756
(58) Field of Classification Search
USPC ................... 707/697, 698, 728; 386/231, 241
See application file for complete search history.

(56) References Cited

U.S. PATENT DOCUMENTS

| | | | |
|---|---|---|---|
| 5,202,983 A | 4/1993 | Orita et al. | |
| 5,745,752 A | 4/1998 | Hurvig et al. | |
| 5,805,550 A * | 9/1998 | Ohmori | 369/53.21 |
| 6,885,809 B1 * | 4/2005 | Asada | 386/241 |
| 7,206,272 B2 * | 4/2007 | Ishii et al. | 369/59.24 |
| 7,242,766 B1 * | 7/2007 | Lyle | 380/2 |
| 7,263,497 B1 * | 8/2007 | Wiser et al. | 705/51 |

(Continued)

FOREIGN PATENT DOCUMENTS

| | | |
|---|---|---|
| EP | 1513152 A1 | 3/2005 |
| EP | 1553769 | 7/2005 |

(Continued)

OTHER PUBLICATIONS

European Search Report (06714963.3-1247 / 1860569 PCT/JP2006303844) dated Dec. 2, 2009.

(Continued)

*Primary Examiner* — Sherief Badawi
(74) *Attorney, Agent, or Firm* — K&L Gates LLP

(57) ABSTRACT

A configuration is provided that allows secure data management to be performed on subsequently acquired data associated with content management units. When subsequently acquired data, such as information subsequently generated or downloaded by a user in association with content stored on an information recording medium, is recorded to a hard disk or the like, subsequently-acquired-data search information and access control information are set. This configuration allows a subsequently-acquired-data file to be searched for and be obtained based on the subsequently-acquired-data search information and allows access control for each subsequently-acquired-data file to be performed based on the access control information. The search information and the access control information are also set in shared directories, such as a studio shared directory.

18 Claims, 33 Drawing Sheets

(56) References Cited

U.S. PATENT DOCUMENTS

| | | | |
|---|---|---|---|
| 7,509,687 B2* | 3/2009 | Ofek et al. ............. | 726/30 |
| 7,745,718 B2* | 6/2010 | Makino et al. ............. | 84/615 |
| 2003/0093678 A1* | 5/2003 | Bowe et al. ............. | 713/180 |
| 2003/0161614 A1* | 8/2003 | Yanagihara et al. ............. | 386/95 |
| 2003/0215224 A1* | 11/2003 | Yoo et al. ............. | 386/125 |
| 2004/0055014 A1* | 3/2004 | Edelson ............. | 725/110 |
| 2004/0098592 A1* | 5/2004 | Taki ............. | 713/176 |
| 2005/0027756 A1 | 2/2005 | Pettigrew | |
| 2005/0177626 A1* | 8/2005 | Freiburg et al. ............. | 709/219 |
| 2006/0140091 A1* | 6/2006 | Iwamoto et al. ............. | 369/53.2 |
| 2006/0164552 A1* | 7/2006 | Cutler ............. | 348/576 |
| 2006/0174308 A1* | 8/2006 | Fuller et al. ............. | 725/133 |
| 2007/0172199 A1* | 7/2007 | Kobayashi et al. ............. | 386/95 |
| 2010/0046747 A1* | 2/2010 | Oashi et al. ............. | 380/30 |

FOREIGN PATENT DOCUMENTS

| | | |
|---|---|---|
| EP | 1679603 A1 | 7/2006 |
| JP | 08-055127 | 2/1996 |
| JP | 2002-311967 | 10/2002 |
| JP | 2003-096176 | 4/2003 |
| JP | 2003-140662 | 5/2003 |
| JP | 2005-052941 | 3/2005 |
| JP | 2005-526342 | 9/2005 |
| JP | 2005-327257 | 11/2005 |
| JP | 2007-500399 | 1/2007 |
| JP | 2004-030356 | 4/2010 |
| WO | 03-096176 | 11/2003 |
| WO | 2004/030356 A1 | 4/2004 |
| WO | 2006-031048 | 3/2006 |
| WO | 2006/051037 A1 | 5/2006 |
| WO | 2006-059888 | 6/2006 |
| WO | 2006/073252 A2 | 7/2006 |

OTHER PUBLICATIONS

Japanese Office Action issued on Feb. 16, 2010, for corresponding JP2009-205916.
International Search Report dated Mar. 28, 2006 (2 pages).
Japanese Office Action issued on Jul. 7, 2009, for corresponding Japanese Patent Application JP 2007-509172.
European Search Report issued Mar. 7, 2011, corresponding to European Appln. No. 11152051.6.
"Application Definition Blu-ray Disc Format BD-J Baseline Application and Logical Model Definition for BD-ROM", Mar. 1, 2005, pp. 1-45.
Intel Corporation et al., "Advanced Access Content System (AACS) Technical Overview (informative)", Jul. 21, 2004, pp. 1-32.
European Search Report issued Jul. 10, 2012 corresponding to European Appln. No. 12162626.6.
European Search Report issued Jul. 19, 2012 corresponding to European Appln. No. 12162434.0.
European Office Action issued Mar. 7, 2013 for corresponding European Appln. No. 12162426.6.

* cited by examiner

FIG. 18

| [FILE NAME ON LOCAL STORAGE] | [STUDIO ID] | [PACKAGE ID] | [FILE NAME AFTER CONVERSION] |
|---|---|---|---|
| studioA.STREAM.00001.m2ts | 1 | 123 | BDMV/STREAM/00001.m2ts |
| studioA.CLIPINF.00001.clpi | 1 | 123 | BDMV/CLIPINF/00001.clpi |
| studioB.STREAM.01001.m2ts | 1,2,5 | (all) | BDMV/STREAM/01001.m2ts |
| studioB.CLIPINF.01001.clpi | 1,2,5 | (all) | BDMV/CLIPINF/01001.clpi |
| studioC.STREAM.00002.m2ts | 1 | 123 | BDMV/STREAM/00002.m2ts |
| studioC.STREAM.00002.m2ts | 2 | 456 | BDMV/STREAM/00012.m2ts |
| studioD.jimaku.dat | 1 | 123 | BDMV/STREAM/00099.m2ts |

FIG. 21

| ⟨PERMISSION ID=0, RELATED STUDIO=A, RELATED PACKAGE=X⟩ | | | |
|---|---|---|---|
| [FILE NAME] | [VALIDITY PERIOD] | [WRITE ACCESS] | [READ ACCESS] |
| BDMV/STREAM/00001.m2ts | YYYY/MM/DD | false | true |
| BDMV/CLIPINF/00001.clpi | YYYY/MM/DD | false | true |
| ⟨PERMISSION ID=0, RELATED STUDIO=B, RELATED PACKAGE=Y⟩ | | | |
| [FILE NAME] | [VALIDITY PERIOD] | [WRITE ACCESS] | [READ ACCESS] |
| BDMV/AUXDATA/sound.bdmv | no limit | true | true |

(EXAMPLE 1) FOR SPECIFYING FOR EACH DIRECTORY
<(INFORMATION FOR IDENTIFYING DIRECTORY) STUDIO=A, RELATED PACKAGE=X>

| [NAME OF DIRECTORY TO BE ACCESSED] | [WRITE ACCESS] | [READ ACCESS] |
|---|---|---|
| STUDIO=A, PACKAGE=X | AVAILABLE | AVAILABLE |
| INTER-STUDIO SHARED DATA | N/A | AVAILABLE |
| INTER-PACKAGE SHARED DATA | N/A | AVAILABLE |
| : | | |

(B)

(EXAMPLE 2) FOR SPECIFYING FOR EACH FILE
<(INFORMATION FOR IDENTIFYING FILE) STUDIO=A, RELATED PACKAGE=X>

| [NAME OF FILE TO BE ACCESSED] | [WRITE ACCESS] | [READ ACCESS] |
|---|---|---|
| (STUDIO=A, PACKAGE=X) /BDMV/AUXDATA/sound.bdmv | AVAILABLE | AVAILABLE |
| (STUDIO=A, PACKAGE=X) /BDMV/STREAM/00001.m2ts | AVAILABLE | AVAILABLE |
| : | | |
| (INTER-STUDIO SHARED DATA) /BDMV/STREAM/00001.m2ts | N/A | AVAILABLE |
| : | | |

INFORMATION PROCESSING APPARATUS, INFORMATION PROCESSING METHOD, AND COMPUTER PROGRAM

CROSS REFERENCE TO RELATED APPLICATIONS

The present application claims priority to Japanese Patent Document Nos. 2005-080600 filed on Mar. 18, 2005, the disclosure of which is herein incorporated by reference.

BACKGROUND

The present invention relates to information processing apparatuses, information processing methods, and computer programs. More specifically, the present invention relates to an information processing apparatus, an information processing method, and a computer program which achieve use control for each unit with respect to content stored on an information recording medium and which achieve efficient search and stringent use control with respect to subsequently acquired data, such as data subsequently generated by a user or subsequently downloaded data.

BACKGROUND ART

Various types of software data (which are hereinafter referred to as "contents (content)"), such as audio data of music and so on, image data of movies and so on, game programs, and various application programs, can be stored on a recording medium as digital data. Examples of the recording medium include a Blu-ray Disc™ using a blue laser, a DVD (digital versatile disc), an MD (Mini Disc), and a CD (Compact Disc). In particular, a Blu-ray Disc™ using a blue laser is a high-density recordable disc and can record a large amount of video content as high-quality data.

Digital content is stored in various information recording media (recording media) as described above and is supplied to users. The users use their own playback apparatuses, such as PCs (personal computers) and disc players, to play back and use the content.

For a large amount of content, such as music data and image data, the creators or sellers thereof generally have distributorships and so on. Thus, for distributing the content, generally, a certain use restriction is applied, that is, only legitimate users are permitted to use the content, to prevent unauthorized copying and so on.

The use of a digital recording apparatus and a recording medium allows recording and playback to be repeatedly performed without deterioration of, for example, video and audio. Thus, there are problems in that distribution of unauthorized copied content through the Internet, circulation of the so called "pirated discs", i.e., CD-R discs and so on containing copied contents, and use of copied content stored on the hard disks of PCs and so on are rampant.

DVDs or large-capacity recording media, such as recording media utilizing a blue laser, that are under development in recent years allow a large amount of data of, for example, one to several movies to be recorded to one medium as digital information. As the recording of video information and so as digital information becomes available, prevention of unauthorized copying and protection of copyright holders become increasingly important issues. Today, in order to prevent such unauthorized copying of digital data, various technologies for preventing illegal copying are actually incorporated into digital recording apparatuses and recording media.

For example, DVD players employ a content scramble system (content scramble system). In the content scramble system, video data, audio data, and so on are encrypted and are recorded to a DVD-ROM (read only memory) and a key used for decrypting the encrypted data is given to a licensed DVD player. The license is given to a DVD player designed to comply with predetermined operating rules specifying that, for example, no unauthorized copying is to be made. Thus, the licensed DVD player uses the given key to decrypt the encrypted data recorded on the DVD-ROM, thereby making it possible to play back video and audio from the DVD-ROM.

On the other hand, since a DVD player that does not have the license does not have a key for decrypting the encrypted data, it cannot decrypt the encrypted data recorded on the DVD-ROM. In this manner, in the configuration of the content scramble system, DVD players that do not satisfy conditions required for the licensing cannot play back the DVD-ROM on which the digital data is recorded, thereby preventing unauthorized copying.

In this manner, a system for managing content stored on information recording media has been configured. For example, Patent Document 1 discloses a system that facilitates a user to download content, such as sound effects, moving images, and still images, which are used as materials for a video work. Patent Document 2 discloses a technology for allowing part of entire music data to be replaced with other data. It is, however, hard to say that secure data management and use management are achieved with respect to subsequently acquired data, such as data generated by a user executing a program, which is content stored on an information storage medium, and data or content obtained from an external server.

When secure management is to be performed on subsequently acquired data generated by a user executing a program stored on an information recording medium or data subsequently obtained from a server, for example, it is necessary for the user to take independent measures for each piece of the data, for example, protecting the data by setting a unique password or encrypting the data using an externally obtained cryptographic key. When such a data management configuration is employed, there is a problem in that an increase in the amount of generated data or obtained data causes the number of cryptographic keys and passwords to be managed to increase. There are also problems in that the data location becomes more uncertain and a relationship between stored data and a cryptographic key/password also becomes obscure. Currently, enough measures are not taken for use management for such subsequently acquired data.

In particular, in an environment where various application programs are executable by a computer or the like, a directory management by a general file system is set so that, in many cases, subsequently acquired data, which is data subsequently generated or obtained by the user, is set to be accessible from various applications. Thus, even subsequently acquired data that should be managed by a content management system needs to be set in a management directory using such a general file system, and unless a special setting is employed, the data is accessed from various application programs, which results in permitting illegitimate use and tamper of the data.

Examples of types of subsequently acquired data include subsequently acquired data that is used in association with content stored on a specific information recording medium; subsequently acquired data that can be shared in association with content provided by a specific studio, which is a content providing entity that provides content; and subsequently acquired data that can be shared in association with content of different studios. Since such various types of subsequently acquired data are available, it is necessary to perform use control corresponding to each type of data. However, it is difficult for the existing systems to perform use control corresponding to such types of subsequently acquired data.

[Patent Document 1] Japanese Unexamined Patent Application Publication No. 2003-140662
[Patent Document 2] Japanese Unexamined Patent Application Publication No. 2002-311967

SUMMARY

The present invention has been made in view of such situations, and an object of the present invention is to provide an information processing apparatus, an information processing method, and a computer program which allow subsequently acquired data, such as data externally obtained in association with content stored on an information recording medium or data generated by a user, to be subjected to use control that is similar to use control for content stored on the information recording medium and which further allow efficient search and stringent use control according to each piece of subsequently acquired data to be performed even when the subsequently acquired data is set in a management directory using a general file system.

A first aspect of the present invention provides an information processing apparatus.

The information processing apparatus has a data processor for executing processing for storing subsequently acquired data, which is subsequently generated or obtained, on storing means as data associated with content read from an information recording medium.

The data processor executes processing for setting, in a subsequently-acquired-data directory set for the storing means, a directory corresponding to identification information set for the information recording medium or the content and for setting, in the set directory, a file of the subsequently acquired data and search information for the subsequently-acquired-data file.

In addition, according to one embodiment of the information processing apparatus of the present invention, the data processor executes processing for setting, in the subsequently-acquired-data directory set for the storing means, a shared directory that can be shared for multiple different pieces of identification information set for the information recording medium or the content and for setting, in the set shared directory, a subsequently-acquired-data file and search information for the subsequently-acquired-data file.

In addition, according to one embodiment of the information processing apparatus of the present invention, the data processor executes processing for setting, as a file associated with the subsequently-acquired-data directory, access control information regarding the subsequently acquired data.

In addition, according to one embodiment of the information processing apparatus of the present invention, the access control information has access request information in which access authority information for a directory or a file set in the subsequently-acquired-data directory is recorded, and access enable/disable information in which access enable/disable information for the file set in the subsequently-acquired-data directory is recorded.

In addition, according to one embodiment of the information processing apparatus of the present invention, the data processor stores and records, in a file set in the subsequently-acquired-data directory, a file-name conversion table for files set in the subsequently-acquired-data directory.

In addition, according to one embodiment of the information processing apparatus of the present invention, the file-name conversion table is a table in which file names of the files set in the subsequently-acquired-data directory and file names that serve as converted file names and that are identifiable by a playback-processing execution application are associated with each other.

Additionally, a second aspect of the present invention provides an information processing apparatus having.

The information processing apparatus has a data processor for executing content-playback processing using content read from an information recording medium and subsequently acquired data stored on storing means and associated with the content.

The data processor executes processing for obtaining, based on identification information set for the information recording medium or the content, search information set in association with the identification information from the storing means, and for obtaining subsequently acquired data associated with the content read from the information recording medium, in accordance with the obtained search information.

In addition, according to one embodiment of the information processing apparatus of the present invention, the data processor executes processing for selecting, from low-order directories in the subsequently-acquired-data directory set for the storing means, a directory corresponding to the identification information set for the information recording medium or the content, for obtaining search information set for the selected directory, and for obtaining subsequently acquired data associated with the content read from the information recording medium, in accordance with the obtained search information.

In addition, according to one embodiment of the information processing apparatus of the present invention, the data processor executes processing for selecting, from low-order directories in the subsequently-acquired-data directory set for the storing means, a shared directory that can be shared for multiple different pieces of identification information set for the information recording medium or the content, for obtaining search information set for the selected shared directory, and for obtaining subsequently acquired data associated with the content read from the information recording medium, in accordance with the obtained search information.

In addition, according to one embodiment of the information processing apparatus of the present invention, the data processor obtains access control information set in association with the identification information from the storing means, based on the identification information set for the information recording medium or the content, and executes access to subsequently acquired data in accordance with the obtained access control information.

In addition, according to one embodiment of the information processing apparatus of the present invention, the data processor selects, from low-order directories in the subsequently-acquired-data directory set for the storing means, a directory corresponding to the identification information set for the information recording medium or the content; obtains access control information set for the selected directory; and executes access to subsequently acquired data in accordance with the obtained access control information.

In addition, according to one embodiment of the information processing apparatus of the present invention, the data processor selects, from low-order directories in the subsequently-acquired-data directory set for the storing means, a shared directory that can be shared for multiple different pieces of identification information set for the information recording medium or the content; obtains access control information set for the selected directory; and executes access to subsequently acquired data in accordance with the obtained access control information.

In addition, according to one embodiment of the information processing apparatus of the present invention, the data processor obtains, based on the identification information set for the information recording medium or the content, access control information set in association with the identification information from the storing means, and executes access to subsequently acquired data in accordance with the obtained access control information. The access control information has access request information in which access authority information for a directory or a file set in the subsequently-acquired-data directory is recorded, and access enable/disable information in which access enable/disable information for the file set in the subsequently-acquired-data directory is recorded. The data processor executes access-authority checking processing based on the access request information and access-enable/disable checking processing based on the access enable/disable information.

In addition, according to one embodiment of the information processing apparatus of the present invention, the data processor reads a file-name conversion table for files stored on the storing means from the storing means, converts files names of the files stored on the storing means in accordance with the file-name conversion table, and generates a virtual file system in which the converted files names serve as setting file names.

In addition, according to one embodiment of the information processing apparatus of the present invention, the data processor reads tamper-verifying data for a file or a file group stored on the storing means from the storing means and executes, based on the tamper-verifying data, tamper-verification processing of a subsequently-acquired-data file to be used.

Additionally, a third aspect of the present invention provides an information processing apparatus.

The information processing method has a data processing step of executing processing for storing subsequently acquired data, which is subsequently generated or obtained, on storing means as data associated with content read from an information recording medium.

The data processing step includes:
a step of setting, in a subsequently-acquired-data directory set for the storing means, a low-order directory corresponding to identification information set for the information recording medium or the content; and
a step of setting, in the set low-order directory, a file of the subsequently acquired data and search information for the file of the subsequently acquired data.

Additionally, a fourth aspect of the present invention provides an information processing method.

The information processing method has a data processing step of executing content-playback processing using content read from an information recording medium and subsequently acquired data stored on storing means and associated with the content.

The data processing step includes:
a step of obtaining, based on identification information set for the information recording medium or the content, search information set in association with the identification information from the storing means; and
a step of executing processing for obtaining subsequently acquired data associated with the content read from the information recording medium, in accordance with the obtained search information.

A fifth aspect of the present invention provides computer program for causing, on a computer, information processing to be executed.

The computer program has
a data processing step of executing processing for storing subsequently acquired data, which is subsequently generated or obtained, on storing means as data associated with content read from an information recording medium, The data processing step includes:
a step of setting, in a subsequently-acquired-data directory set for the storing means, a low-order directory corresponding to identification information set for the information recording medium or the content; and
a step of setting, in the set low-order directory, a file of the subsequently acquired data and search information for the file of the subsequently acquired data.

A sixth aspect of the present invention provides a computer program for causing, on a computer, information processing to be executed.

The computer program has:
a data processing step of executing content-playback processing using content read from an information recording medium and subsequently acquired data stored on storing means and associated with the content.

The data processing step includes:
a step of obtaining, based on identification information set for the information recording medium or the content, search information set in association with the identification information from the storing means; and
a step of executing processing for obtaining subsequently acquired data associated with the content read from the information recording medium, in accordance with the obtained search information.

The computer program of the present invention can be supplied to, for example, a general computer system that can execute various program codes via a recording media, such as a DVD, CD, or MO in a computer-readable format, or through a communication medium, such as a network. Supplying such a program in a computer-readable format can cause a computer to achieve processing according to the program.

Further objects, features, and advantages of the present invention will become apparent from more detailed descriptions based on an embodiment described below according to the present invention and the accompanying drawings. The term "system" herein refers to a logical combination of a plurality of apparatuses and is not limited to a system in which individual apparatuses are included in the same housing.

ADVANTAGES

According to one embodiment of the present invention, when subsequently acquired data, such as information subsequently generated or downloaded by a user in association with content stored on an information recording medium, is recorded to a hard disk, removable medium, or the like, subsequently-acquired-data search information is set. This allows a subsequently-acquired-data file to be searched for and subsequently acquired data to be obtained based on the subsequently-acquired-data search information.

In addition, according to one embodiment of the present invention, when subsequently acquired data, such as information subsequently generated or downloaded by a user in association with content stored on an information recording medium, is recorded to a hard disk, removable medium, or the like, access control information for the subsequently acquired data is set. This allows access control for each subsequently-acquired-data file to be performed based on the access control information.

Additionally, according to one embodiment of the present invention, directories that can be shared for different content stored on information storage media, for example, a package-shared directory and a studio-shared directory, are set as low-order directories in the subsequently-acquired-data storing directory and search information and access control information for files set in the shared directories are set. This makes it possible to perform efficient search and stringent access control on files set in package-unique directories and files set in the shared files.

Additional features and advantages of the present invention are described in, and will be apparent from, the following Detailed Description and the Figures.

BRIEF DESCRIPTION OF THE FIGURES

FIG. 18 illustrates an example of a file conversion table contained in the subsequently-acquired-data search information.

FIG. 21 illustrates an example of the data structure of access enable/disable information, which serves as the access control information.

FIG. 22 illustrates examples of the data structure of access request information, which serves as the access control information.

DETAILED DESCRIPTION

Details of an information processing apparatus, an information processing method, and a computer program according to the present invention will be described below with reference to the accompanying drawings. The description will be given in accordance with the following points.

1. Data Stored on Information Recording medium
2. Content Storage Structure
3. Encryption of Stored Content and Use Management Configuration
4. Management Structure of Subsequently Generated or Obtained Data
5. Configuration of Association of Data constituting CPS Unit on Information Recording Medium and Data constituting CPS Unit Stored other than on Information Recording Medium
6. Use Control Configuration of Subsequently Acquired Data
7. Configuration Example of Information Processing Apparatus

[1. Data Stored on Information Recording Medium]

An information processing apparatus of the present invention realizes use control for each unit with respect to content stored on an information recording medium, and also realizes use control for each unit with respect to subsequently acquired data, such as data subsequently generated or downloaded by a user, in the same manner as for content stored on an information recording medium. First, a stored-data example of an information recording medium on which content is recorded will be described with reference to FIG. 1.

An information recording medium 100 is manufactured at a disc manufacturing plant under the permission of a content right holder who has a legitimate content copyright or distributorship and thus stores legitimate content. Although the description in the following embodiment will be given using an example of a disc medium as an example of the information recording medium, the present invention is applicable to a configuration using various types of information recording medium.

The information recording medium 100 may be any type of recording medium, such as a ROM disc to which data cannot be rewritten, a partial ROM (partial ROM) disc that permits data to be written to only a partial data area, or a disc that allows data to be written to all areas.

Figure 1:
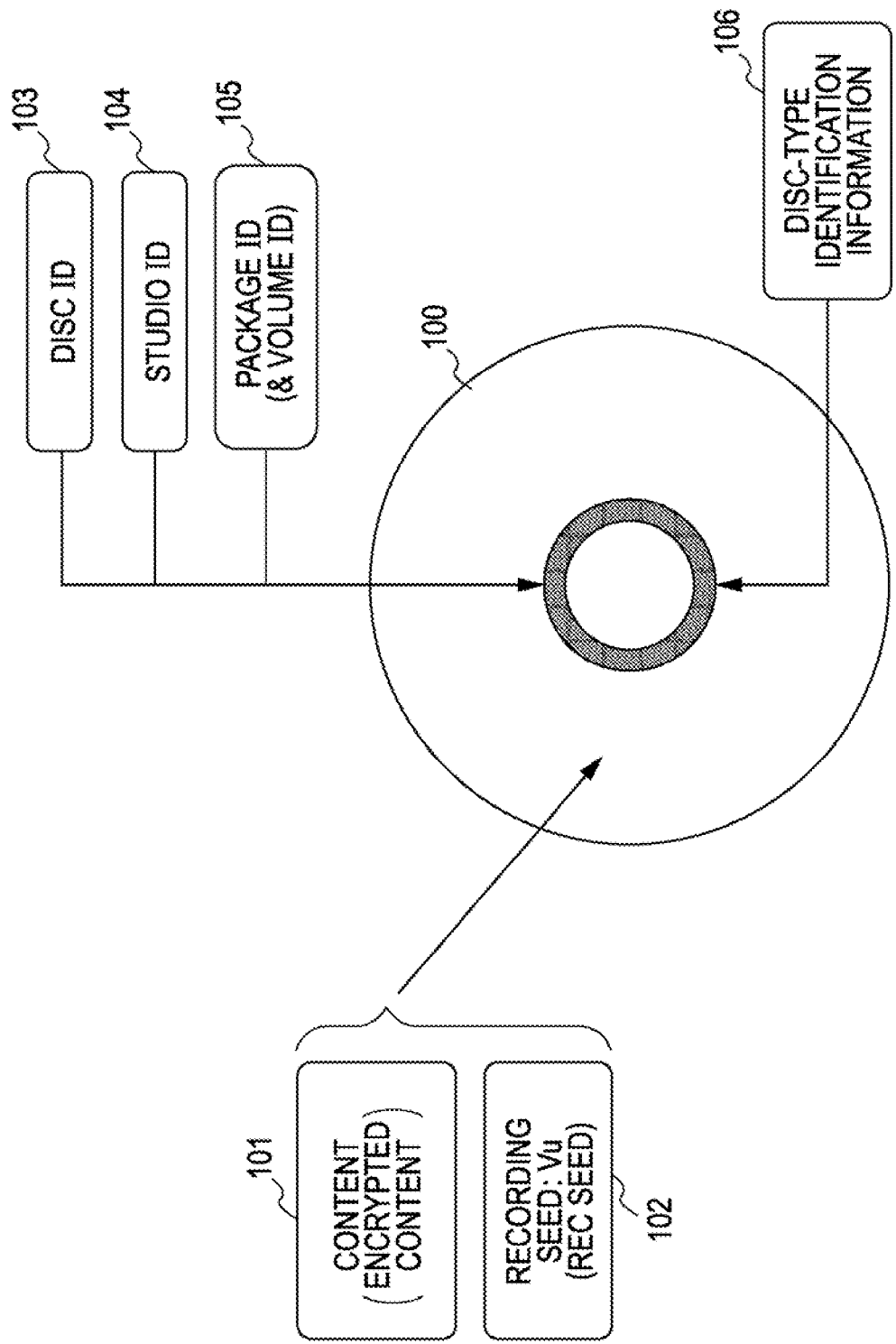
FIG. 1 is a diagram illustrating the structure of data stored on an information recording medium.

As shown in FIG. 1, content 101 is stored on the information recording medium 100. For example, the content 101 includes a moving-image content AV (audio visual) stream, such as HD (high definition) movie content, which is high-definition moving-image data; a game program in a format defined by a specific standard; an image file; audio data; and text data. The content includes various types of information, such as information that can be used with only data from the information recording medium 100 and information that can be used with a combination of data from the information recording medium 100 and data supplied from a server connected through a network.

At least part of the content 101 is stored on the information recording medium 100 as encrypted content and recording seeds (REC SEED) 102 are stored as information required for generating keys used for performing decryption processing on the encrypted content. For content use management, the encrypted content is stored on the information recording medium 100 as encrypted data that uses unit keys as independent cryptographic keys. The recording seeds (REC SEED) Vu 102 are key generation information used for generating the individual unit keys. The recording seeds (REC SEED) 102 may be obtained from, for example, a server connected through a network, instead of being stored on the information recording medium 100.

The information recording medium 100 further stores a disc ID 103 that serves as identification information of the information recording medium 100, a studio ID 104 that serves as an identifier of the editing studio of the content stored on the information recording medium 100, a package ID 105 that serves as an package identifier which is a manufacturing unit of the information recording medium 100, and a disc-type identification information 106. In addition to the package ID 105, a volume ID, which is different manufacturing-unit information on the information recording medium, may also be stored.

The content stored on the information recording medium 100 includes a moving-image content AV (audio visual) stream, such as HD (high definition) movie content, which is high-definition moving-image data; a game program in a format defined by a specific standard; an image file; audio data; and text data. For example, when the information recording medium is a Blu-ray Disc™, which is a data recording disc that uses a blue laser to allow high-density recording, data that complies with the Blu-ray Disc™ ROM standard format is stored as main content.

In addition, for example, data having data formats that do not comply with a specific AV data format may also be stored as sub content. Examples of the sub content include game programs, image files, audio data, and text data, which serve as service data.

For content use management, the various types of content 101 are encrypted using individual unit keys therefor and are stored on the information recording medium 100. The recording seeds 102 are used as key generation information for generating the unit keys.

That is, for example, an AV (audio visual) stream, music data, image data of moving images, still images, and so on, a game program, and web content, which constitute the content, are segmented into units, each serving as a unit of content use management, and different recording seeds Vu 102 are assigned to the segmented units. Thus, unit keys can be generated based on the recording seeds for the corresponding units, so that playback can be performed through encrypted-content decryption processing using the unit keys.

For example, for use of AV (audio visual) stream content stored on the information recording medium 100, a predetermined cryptographic-key generation sequence using the recording seeds Vu 102 and other secret information, which is not shown, such as a physical index recorded on the information storage medium 100, is executed to obtain unit keys for the corresponding units, and based on the obtained unit keys, decryption processing is performed on the encrypted content contained in the units to perform playback.

Figure 2:
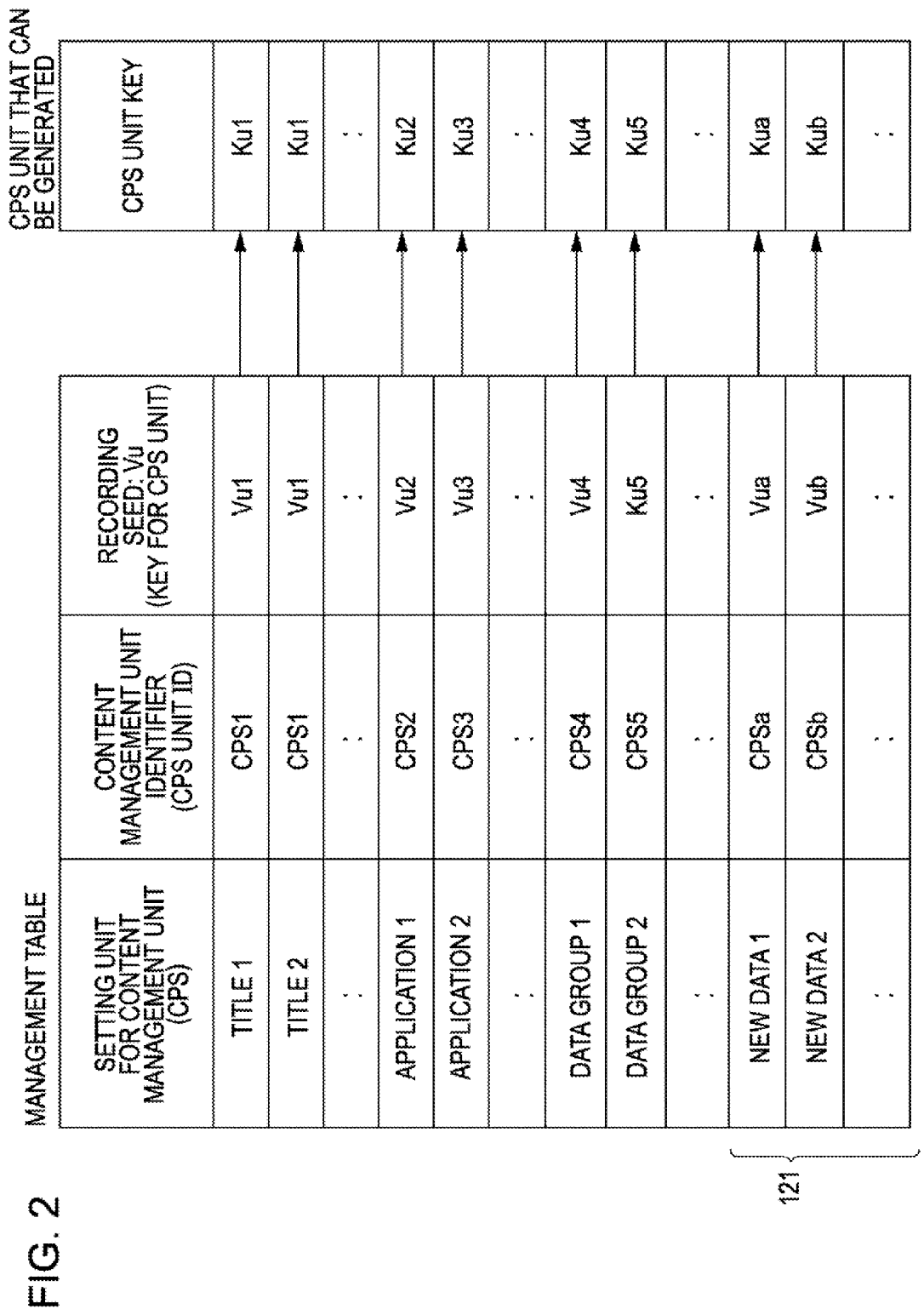
FIG. 2 shows an example of a CPS-unit management table.

As described above, the encrypted content stored on the information recording medium 100 is segmented into units, each serving as a unit of content use management. This unit will be referred to as a "CPS unit (content management unit)". FIG. 2 shows an example of a relationship between a CPS unit structure and the recording seeds. FIG. 2 shows a relationship between a CPS-unit management table, which serves as content management information stored on the information recording medium, and CPS unit keys, which can be generated based on the recording seeds for the corresponding units.

As shown in the CPS-unit management table in FIG. 2, various types of information, such as titles, applications, and data groups, can be set as the CPS units, and CPS unit IDs, which serve as identifiers for the respective CPS units, are contained in the CPS-unit management table in association with the recording seed information.

In FIG. 2, title 1 is set for a CPS unit 1 and Vu1 is set as the recording seed therefor, title 2 is set for the CPS unit 1 and Vu1 is set as the recording seed, and application 1 is set for a CPS unit 2.

For example, a unit key Ku1 is generated based on the recording seed Vu1, and cryptographic processing using the unit key Ku1 allows decryption processing to be performed on the encrypted content contained in one CPS unit (CPS 1), which can be identified by title 1 and title 2. Similarly, a unit key Ku2 is generated based on the recording seed Vu2, and cryptographic processing using the unit key Ku2 allows decryption processing to be performed on the encrypted content contained in one CPS unit (CPS 2), which can be identified by the application 1. The same applies to the other unit keys.

The CPS unit management table also contains, in addition to content stored on the information recording medium, CPS units for subsequently acquired data, such as data subsequently generated or obtained from outside by the user. The user can newly define CPS units for the subsequently acquired data. CPS units corresponding to data fields 121 shown in FIG. 2 can be used as the units for the subsequently acquired data.

The CPS units can be set as management units for subsequently acquired data generated or obtained by the user. Examples of the subsequently acquired data include data obtained by executing content, such as a program, stored on the information recording medium 100, specifically, game progress information, score information, and so on; and auxiliary data for an AV stream, which is content stored on the information recording medium, such as subtitle data obtained from an external server. Use of the data will be described in detail in a subsequent paragraph.

[2. Content Storage Structure]

The storage format of content stored on the information recording medium according to the present invention will be described with reference to FIG. 3.

Figure 3:
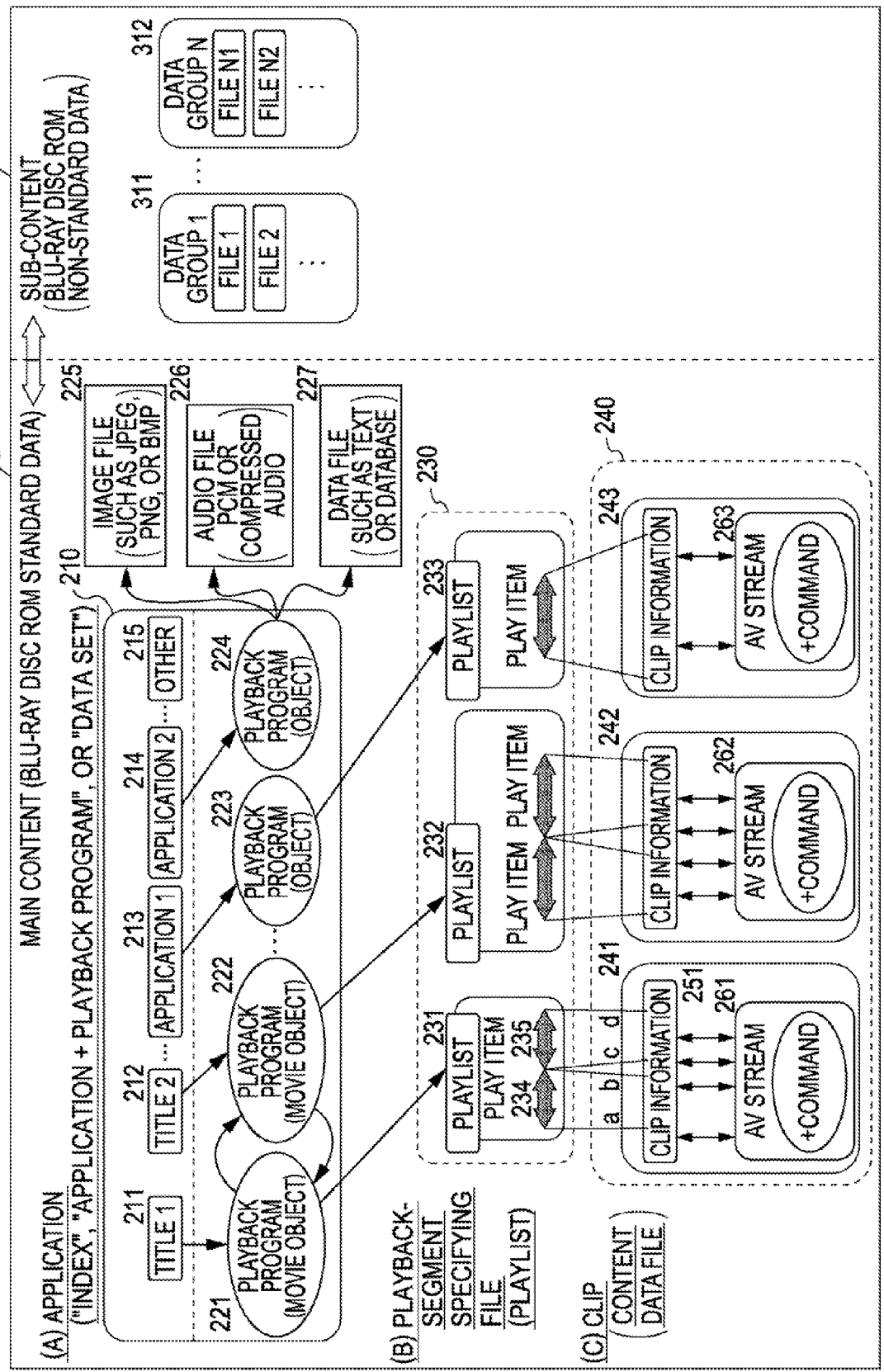
FIG. 3 is a diagram illustrating a setting example of content management units set for content stored on the information recording medium.

As shown in FIG. 3, the information recording medium stores main content 200, including AV streams of moving-image content, such as HD (high definition) movie content, which is high-definition moving-image data, and also stores sub-content 300, including other data and programs, such as game programs, image files, audio data, and text data, which serve as service data.

The main content 200 is stored as a specific AV format data, for example, Blu-ray Disc™ ROM data in compliance with the Blu-ray Disc™ ROM standard format. The sub-content 300 is stored as data that does not conform to the Blu-ray Disc™ ROM standard, that is, as data in an arbitrary format that is not compliant with the Blu-ray Disc™ ROM standard format.

As shown in FIG. 3, the main content 200, which is stored in compliance with the Blu-ray Disc™ ROM standard format, contains moving-image content (AV streams) as main content to be played and has a hierarchical structure according to the Blu-ray Disc™ ROM standard format. That is, the hierarchical structure has:

(A) application 210,
(B) playback-segment specifying file (playlist) 230, and
(C) clip (content data file) 240.

The clip (C) (content data file) 240 includes clips 241, 242, and 243, which are segmented content-data files. The clip 241 has an AV (audio visual) stream file 261 and a clip information file 251.

The clip information file 251 is a data file that contains attribution information regarding the AV (audio-visual) stream file 261. The AV (audio-visual) stream file 261 is, for example, MPEG-TS (Moving Picture Experts Group-Transport Stream) data, and has a data structure in which multiple types of information, such as image (video) data, audio (audio) data, and subtitle data, are multiplexed. Command information for controlling a playback apparatus during playback may also be multiplexed.

The playback-segment specifying file (B) (playlist) 230 has multiple playback-segment specifying files (playlists) 231, 232, and 233. Each of the playback-segment specifying files (playlists) 231, 232, and 233 selects one of the AV stream data files contained in the clip (content data file) 240 and has at least one play item that specifies a specific data portion of the selected AV stream data file by a playback start point and a playback end point. Selecting one playback-segment specifying file (a playlist) causes a playback sequence to be determined and the playback to be executed in accordance with the play item contained in the playback-segment specifying file (the playlist).

For example, a play item 234 is associated with the playback-segment specifying file (playlist) 231 and has playback start point a and playback end point b in the clip 241, and a play item 235 has playback start point c and playback end point d in the clip 241. Thus, selecting the playback-segment specifying file (playlist) 231 to playback the content causes specific data areas from a to be and from c to d in the AV stream file 261, which is content contained in the clip 241, to be played back.

The application (A) 210 is set as a layer including combinations of playback programs 221 and 222 and application index files 211 and 212 containing content titles to be displayed on a display, the content of the content tiles being to be played back, and combinations of playback programs 223 and 224 and application execution files 213 and 214 for game content, web content, and so on. The user can determine a target to be played back, by selecting the title contained in the application index file 211 and 212.

As shown in the figure, each title is associated with one of the playback programs (e.g., movie objects) 221 to 224. Thus, when the user selects one title, playback processing based the playback program associated with the selected title is started. The application index files 211 and 212, which are represented as title 1 and title 2 shown in the figure, contain title-presentation programs for displaying the titles and menus which are automatically played back when the information recording medium is loaded and the operation is started.

The application index files 211 and 212 and the application execution files 213 and 214 may contain application resource files used for application execution. Also, various data files that can be obtained from the information recording medium or a server connected through a network may be used as the application resource files. Examples of such data files include image files 225, such as JPEG, PNG, or BMP files, audio files 226, such as PCM or compressed-audio files, and various data files 227, such as text or database files.

The playback programs (e.g., movie objects) 221 to 224 serve as content-playback processing programs for specifying playback-segment specifying files (playlists) to be played back and for providing programmable functions required for presenting playback content (HD movie content), such as giving a response to content-playback-processing-related information that is input from the user, jumping between titles, and branching of the playback sequence. Jumping can be mutually performed between the playback programs 221 to 224. A playback program that is to be actually executed is selected in accordance with a user input or a preset program, and based on the playback-segment specifying file (playlist) 230 specified by the selected program, playback content is selected from the clip 240 and is played back.

As shown in the figure, the main content 200 is managed as, for example, Blu-ray Disc™ ROM standard data by a hierarchical structure in compliance with the Blu-ray Disc™ ROM standard format. In this hierarchical structure frame, content management units (CPS units) are set and content use management is performed each content management unit (CPS unit). Details of the content management units (CPS units) are described below.

The sub-content 300, in addition to the main content 200, is also stored on the information recording medium. The sub-content 300 is stored in an arbitrary format that does not conform to a specific AV format, for example, the Blu-ray Disc™ format ROM standard format.

Examples of the sub-content 300 include game programs, image files, audio data, and text data, which serve as service data. Sets of data files are set as data groups.

FIG. 3 shows data group 1 311 to data group N 312. These data groups can also be set as content to be subjected to use management. When a data group is set as content to be subjected to use management, a content management unit (CPS unit) is set for each data group and use management is performed for each data group.

[3. Encryption of Stored Content and Use Management Configuration]

Next, a content management configuration in which content stored on the information recording medium is divided into content management units (CPS units) to realize use control that varies for each unit will be described with reference to FIG. 4.

As described above with reference to FIG. 2, the unit keys are respectively assigned to the content management units (CPS units) as cryptographic keys that are different from each other. A unit to which one unit key is assigned is the content management unit (CPS unit). The unit keys can be generated based the recording seeds for the corresponding units.

Content belonging to each CPS unit is encrypted with the corresponding unit key, and for use of the content, the unit key assigned to the corresponding unit is obtained to play back the content. The unit keys can be independently managed. For example, the unit key assigned to one unit A may be set as a key that can be obtained from the information recording medium. The unit key assigned to unit B may be set as a key that can be obtained when the user executes a predetermined procedure through accessing a server connected through a network. That is, the configurations for obtaining and managing keys for the respective units may be independent from each other.

A scheme for setting a unit to which one key is assigned, i.e., the content management unit (CPS unit), will now be described with reference to FIG. 4.

A description will first be given of the setting configuration of the content management units (CPS units) for the main content 200.

For the main content 200, CPS units including the application index files 211 and 212, each including at least one title, contained in the application (A) 210, or application execution files 213, 214, and so on are set.

Figure 4:
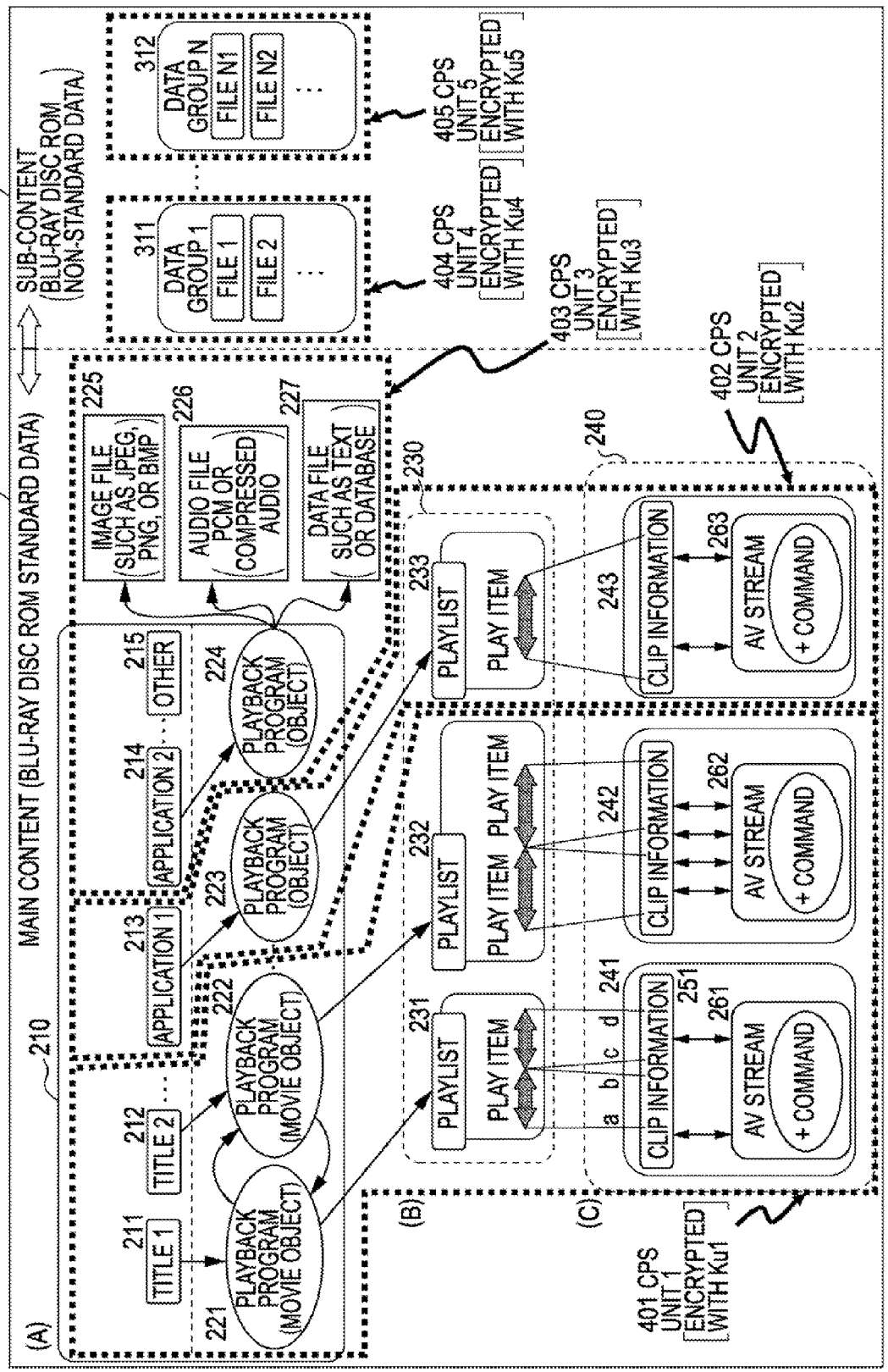
FIG. 4 is a diagram illustrating an example of a cryptographic configuration for the content management units set for the content stored on the information recording medium.

A CPS unit 1 401 shown in FIG. 4 is a unit in which application index files, playback program files, playlists, and AV stream file groups, which serve as content main data, are set as one unit.

A CPS unit 2 402 is a unit in which an application index file, a playback program file, a playlist, and an AV stream file group, which serves as content main data, are set as one unit.

A CPS unit 3 403 is a unit that includes application execution files, a playback program file, and various data files that can be obtained from the information recording medium or a server connected through a network.

Each of the units is independently encrypted with the single key (the CPS unit key: a key Ku1, Ku2, or Ku3 shown in FIG. 4) and is stored on the information recording medium.

In FIG. 4, the content management units (CPS units) 1 401 and 2 402 are constituted by the application (A) in the upper layer and the playback-segment specifying file (B) (playlist) and the clip (C) (content data file) in the lower layer. The content management unit (CPS unit) 3 403 does not contain any playback-segment specifying file (B) (playlist) and clip (C) (content data file) in the lower layer and is constituted by the application layer (A) in the upper layer and the various data files that can be obtained from the information recording medium or the server connected through the network. Specifically, the data files include the image files 225, the audio files 226, the data files 227, and so on.

The content management unit (CPS unit) 1 401 includes titles 1 211 and 2 212, playback programs 221 and 222, playlists 231 and 232, and clips 241 and 242. AV stream data files 261 and 262, which are the content main data contained in the two clips 241 and 242, are encrypted with the unit key Ku1, which is a cryptographic key set in association with the content management unit (CPS unit) 1 401.

The content management unit (CPS unit) 2 402 includes an application file 213, which is constituted by game content, web content, and so on, a playback program 223, a playlist 233, and a clip 243. An AV stream file data 263, which is the content main data contained in the clip 243, is encrypted with the unit key Ku2, which is a cryptographic key set in association with the continent management unit (CPS unit) 2 402. Further, the application file 213 may also be an encrypted file using the unit key Ku2.

The content management unit (CPS unit) 3 403 is set as a unit that includes application files 214 and 215 contained in the application layer (A) in the upper layer, a playback program 224, and various data files that can be obtained by the playback program 224 from the information recording medium or the server connected through the network. Examples of the data files include image files 225, such as JPEG, PNG, or BMP files, and an audio file 226, such as PCM or compressed audio files, and various data files 227, such as text or database files.

The content management unit (CPS unit) 3 403 is encrypted with the unit key Ku3, which is a cryptographic key set in association with the content management unit (CPS unit) 3 403.

For example, in order for the user to execute playback processing for an application file or content for the content management unit 1 401, it is necessary to obtain the unit key Ku1 through cryptographic processing using the recording seed Vu1, which is set in association with the content management unit (CPS unit) 1 401, and to execute a content-decryption processing sequence using the obtained unit key Ku1. After the execution of the decryption processing, it is possible to play back the content by executing the application program.

For example, in order to perform processing for using an application file for the content management unit 3 403 or using the image files 225, the audio files 226 such as PCM or compressed audio files, or the various data files 227 such as text or database files, which are associated with the program file 224, it is necessary to obtain the unit key Ku3, which is a cryptographic key set in association with the content management unit (CPS unit) 3 403, to execute decryption processing. After the execution of the decryption processing, the application file or various files are executed.

An example of the structure of a directory in which content and management information, such as key information, for the various content management units (CPS units) described above will be described with reference to FIG. 5.

Figure 5:
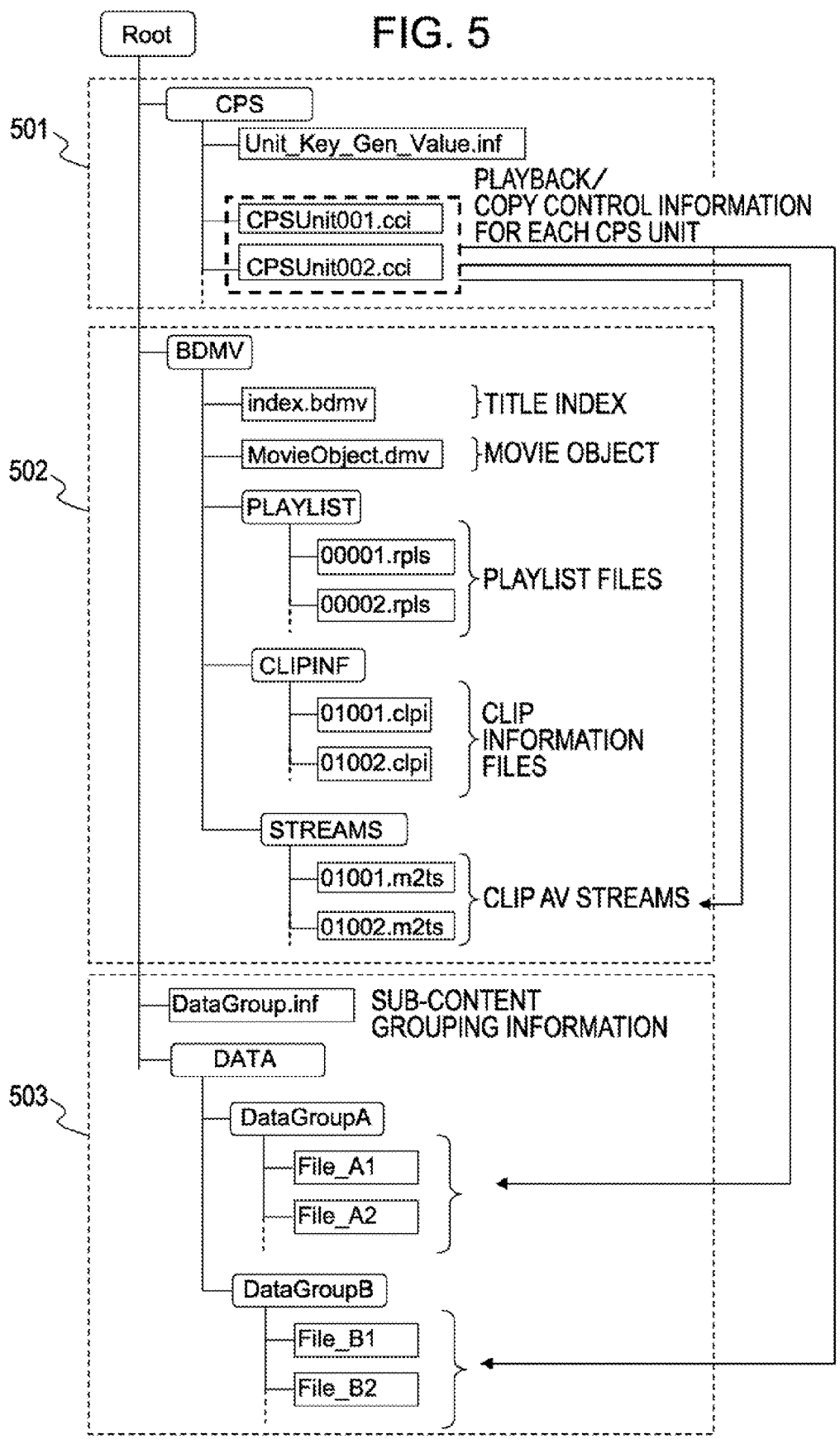
FIG. 5 is a diagram illustrating an example of the structure of a data-storing directory for the information recording medium.

In the directory structure shown in FIG. 5, a main-content data portion 502, a sub-content data portion 503, and a content management data portion 501 for main content and sub-content are set. A BDMV directory shown in the main-content data portion 502 is set as a directory in which content and applications that comply with the Blu-ray Disc™ ROM format are stored.

As described above with reference to FIGS. 3 and 4, the main content that complies with the Blu-ray Disc™ ROM format has a hierarchical structure including, for example, titles, objects, playlists, clip information, and AV streams, and data files containing them are set in the BDMV directory.

The data directory of the sub-content data portion 503 is set as a directory in which content and applications which have formats that do not conform to the Blu-ray Disc™ ROM format are stored for each group. Data Group inf in the sub-content data portion 503 is a file in which grouping information of sub-content is stored.

In the management data portion 501, management files for both main content and sub-content are stored. For example, the management files store the CPS unit management table described above and shown in FIG. 2, content playback control information set for each unit, and copy control information. In the CPS unit management table, CPS unit IDs for respective content management units (CPS units) and corresponding recording seed information are associated.

The content playback control information and the copy control information are set as individual information for each CPS unit. Independent content use control information is set for each CPS unit stored on the information recording medium, for example, as follows: [CPS unit 1] the number of copies permitted for a recording media: a, the number of playback operations permitted: b, availability of remote playback: available [CPS unit 2] The number of copies permitted for the recording media: 0, the number of playback operations permitted: c, availability of remote playback: not available.

[4. Management Structure of Subsequently Generated or Obtained Data]

As described above, content stored on the information recording medium is divided into CPS units, and the content can be used by using a recording seed to obtain a CPS unit key, which is a cryptographic key, for each CPS unit.

A description will be given below of processing for managing data that are different from content stored on the information recording medium, i.e., data that are subsequently generated or obtained by some kind of user processing. Examples of such data include data generated in accordance with a program stored on the information recording medium, specifically, character data and progress data generated by executing a game program; data obtained from a server through a network; and text and image data generated by the user.

Figure 6:
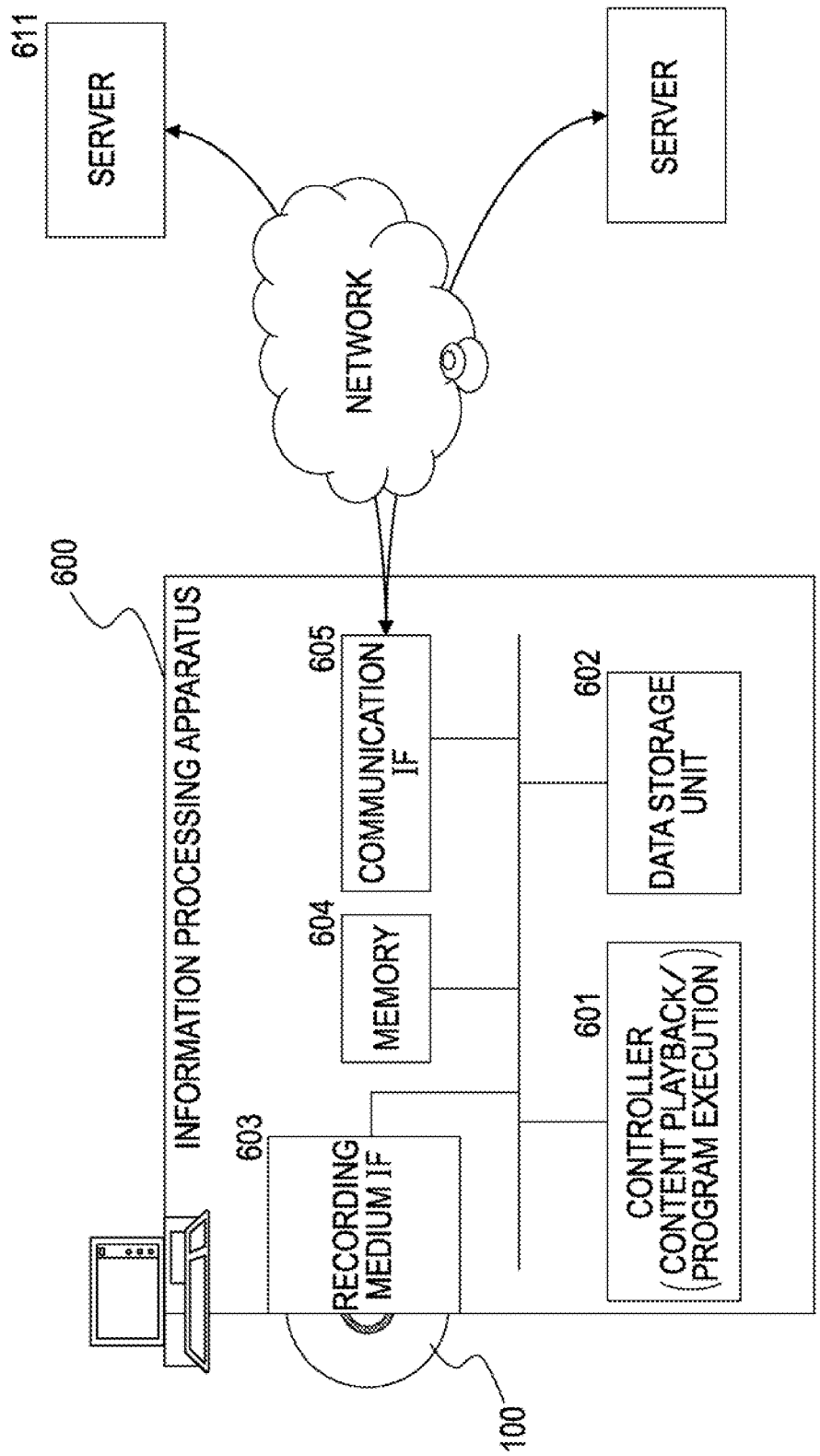
FIG. 6 is a diagram illustrating processing in which an information processing apparatus in which the information recording medium is loaded generates or obtains subsequently acquired data.

FIG. 6 shows an example of processing for generating and obtaining data associated with content stored on the information recording medium.

FIG. 6 shows an information recording medium 600, such as a PC, for executing playback processing for an information recording medium. The information processing apparatus 600 includes a controller 601 that has a program execution function, such as a CPU, for executing content playback processing; a data storage unit 602, including a hard disk; a recording medium interface 603 for inputting/outputting data to/from an information recording medium; a memory 604, including a RAM or ROM, for use as a program execution area or parameter storage area; and a communication interface 605 for executing communication through a network. A minimum configuration of the information processing apparatus 600 is shown in FIG. 6 in order to illustrate processing for generating and obtaining subsequently acquired data, and an example of a specific hardware configuration of the information processing apparatus is described in a subsequent paragraph.

The information processing apparatus 600 reads content, stored on the information recording medium 100 and divided into CPS units, from the information recording medium 100 via the recording medium interface 603, and performs playback processing on the content under the control of the controller 601. A licensed program is used to execute the processing for playing back the content managed by the CPS units and processing for storing and using subsequently acquired data.

For example, as described above with reference to FIGS. 3 and 4, content that is recorded according to the Blu-ray Disc™ ROM standard is stored on the information recording medium 100. The content is divided into CPS units and is subjected to encryption processing.

The information processing apparatus 600 generates CPS unit keys based on recording seeds for the corresponding CPS units to play back the content. The content includes, for examples, games, various programs such as AV stream playback programs, and AV stream data.

As a scheme for the information recording medium 600 to subsequently generate or obtain data based on data reading from the information recording medium 100, the following two schemes are available.

A first scheme corresponds to a case in which the information processing apparatus 600 reads analyzable information from the information recording medium 100 and obtains or generates new data based on the read information. In this processing, for example, URL information corresponding to a location from which subsequently acquired data is obtained is written on the information recording medium 100, and the information recording medium 100 obtains the URL information and accesses a server 611, specified by the URL, through the communication IF 605 and a network by using a browser to download data, such as new content of the corresponding URL. Other than content downloading, subsequently acquired data may be newly generated by the information processing apparatus 600 based on information read from the information recording medium 100.

A second scheme is to use an application program recorded on the information recording medium 100. For example, the information processing apparatus 600 may downloads content by executing a program read from the information recording medium 100 and connecting to the specific server 611 through the communication IF 605 and the network in accordance with the program, or the information processing apparatus 600 may generate subsequently acquired data by executing the program.

The data generated or obtained by such various types of processing do not belong to CPS units, which are segments for managing content recorded on the information recording medium 100. In the configuration of the present invention, however, such subsequently acquired data are managed as data belonging to specific CPS units.

More specifically, subsequently acquired generated or obtained based on content associated with a CPS unit stored on the information recording medium 100 is managed as data belonging to the same CPS unit. Alternatively, subsequently acquired data is managed by a newly defined CPS unit.

Figure 7:
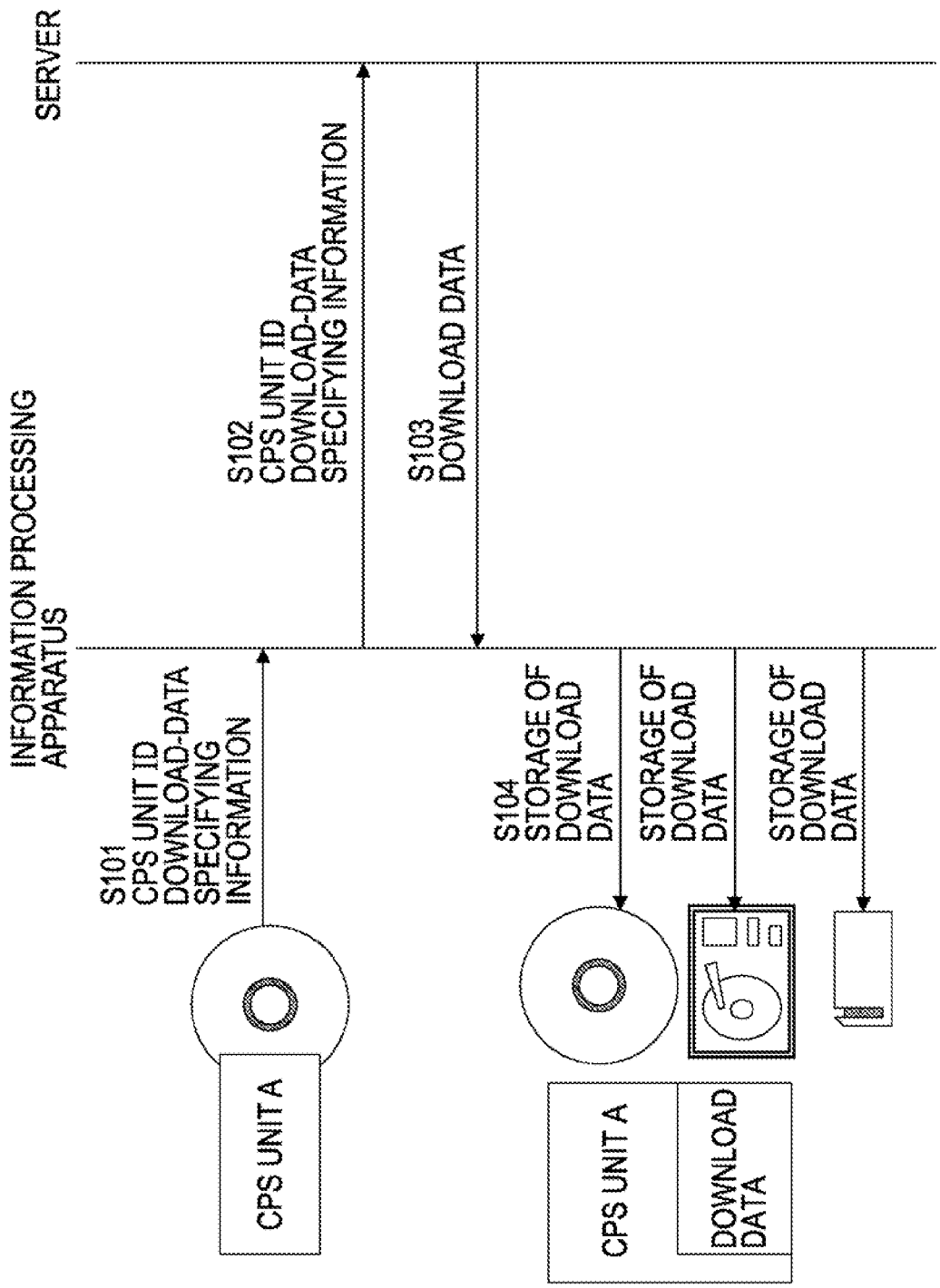
FIG. 7 is a diagram illustrating a processing sequence in which the information processing apparatus obtains subsequently acquired data.

FIG. 7 shows a processing sequence for obtaining subsequently acquired data from an external server based on content stored on the information recording medium. In step S101, the information processing apparatus reads content, managed by a CPS unit, from the information recording medium. For example, it is assumed that the information processing apparatus reads content belonging to a CPS unit A.

The information processing apparatus reads download-data specifying information, such as an URL, from the information recording medium and obtains a CPS unit ID, which serves as the identifier of the CPS unit for the read content. In step S102, the information processing apparatus transmits the data, i.e., the CPS unit ID and the download-data specifying information, to the server.

Through a predetermined authentication sequence, the server executes authentication processing for, for example, determining whether the CPS unit ID is one obtained from a legitimate information recording medium to thereby verify the authenticity of the data request. When the authenticity is verified, the server transmits the requested download data to the information processing apparatus in step S103. For example, the download data is dubbed audio data for an AV stream, subtitle data, or a playback program for specific content.

In step S104, the information processing apparatus stores the download data, obtained from the server, on the information recording medium or a storage unit, such as the hard disk in the information processing apparatus or a removable memory. In any case, the download data is stored and managed as data belonging to the same CPS unit A identified by the CPS unit ID. That is, the download data is encrypted with a CPS unit key Ku (a) generated using a recording seed Vu (a) set for the CPS unit A and is stored.

In the setting of the sequence described with reference to FIG. 7, during the transmission of a request for download data to the server, the information processing apparatus transmits the CPS unit ID and the download-data specifying information. This is because the transmission of the CPS unit ID allows for management as follows.

(1) The server can manage download data for each CPS unit.

(2) When the download availability, billing processing, or the like is managed for each CPS unit, a CPS unit for which download is once permitted can be downloaded from the next time by only transmitting the CPS unit ID.

(3) When download data is encrypted using the key (unit key) defined for each CPS unit on the information recording medium, it is necessary for the server to have the CPS unit ID to perform encryption processing. The server holds the CPS unit key for the CPS unit ID, encrypts the data by using the held CPS unit key, and transmits the encrypted data, thereby making it possible to achieve secure data transmission.

As the download-data specifying information, information, other than a URL or the like, can also be used. Examples of such information include a studio ID, package ID, volume ID, title ID, movie object ID, playlist ID, or playback segment information (time stamps for the start point and the end point), which are values defined by the Blu-ray Disc ROM standard or the like. Alternatively, values that are not defined by the Blu-ray Disc ROM standard or the like may also be used as the download-data specifying information. For example, as long as information that allows the server to specify download data is used, various data can be used as the download-data specifying information. Examples include user auxiliary information, such as a user ID or billing status; date and time information; and management data generated by the information processing apparatus during content playback, such as the number of playback operations, a range that has already been played back, a game score, and multi-story playback path information.

A specific example of data generated or obtained by the information processing apparatus will be described next with reference to FIGS. 8 and 9.

Figure 8:
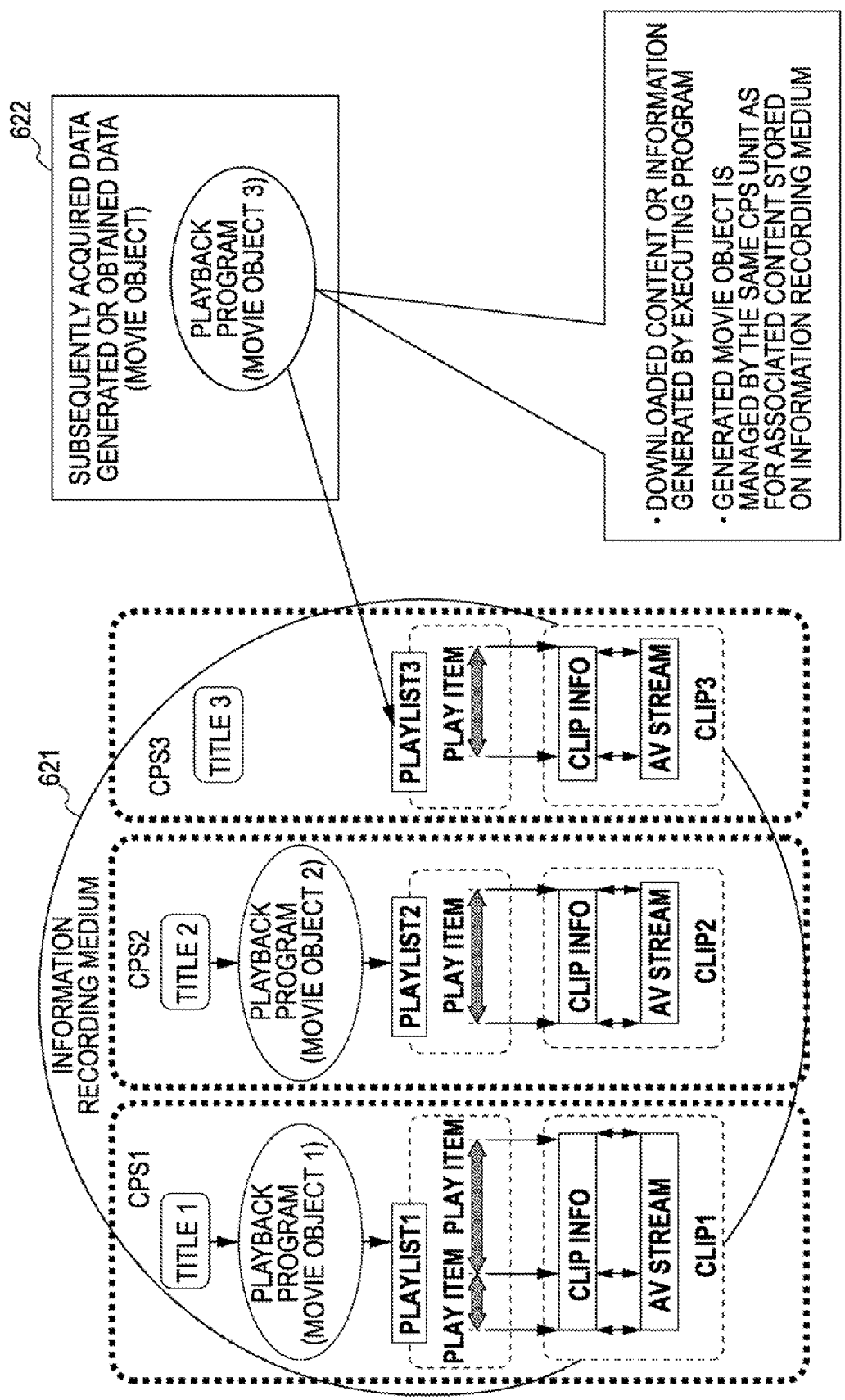
FIG. 8 is a diagram illustrating an example of subsequently acquired data that is generated or obtained by the information processing apparatus.

FIG. 8 shows an example in which part of data that conforms to the Blu-ray Disc™ ROM standard format is generated or obtained as subsequently acquired data. As described above with reference to FIGS. 3 and 4, content stored on an information recording medium according to the Blu-ray Disc™ ROM standard format has a hierarchical structure, and data and programs in the individual layers are associated to thereby make it possible to perform, for example, content playback processing on an AV stream.

On an information recording medium 621 shown in FIG. 8, CPS units 1, 2, and 3 associated with three titles [title 1], [title 2], and [title 3], respectively, are set as content that conforms to the Blu-ray Disc™ ROM standard format.

Of the three CPS units, the CPS units 1 and 2 associated with the two titles [title 1] and [title 2], respectively, store movie objects 1 and 2, which serve as playback programs corresponding to the respective titles. The user loads the information recording medium into the information processing apparatus and specifies [title 1] or [title 2] to execute the corresponding movie object 1 or 2, which serves as a playback program. This makes it possible to play back a clip file, i.e., AV stream data, in a segment specified by a playlist. It is, however, necessary to retrieve a recording seed for the corresponding CPS unit from management data to generate a CPS unit key and to decrypt the encrypted data, such as an AV stream.

However, a movie object 3, which serves a playback program for the title 3, is not stored in the CPS unit 3, and thus, a clip file, i.e., AV stream data, contained in the CPS unit 3 cannot be played back. In this case, the information processing apparatus executes processing for generating or obtaining the movie object 3, which serves as a playback program corresponding to the title 3, to generate or obtain the movie object 3 as subsequently acquired data 622. The generated or obtained movie object 3 is managed as data constituting the CPS unit 3.

Figure 9:
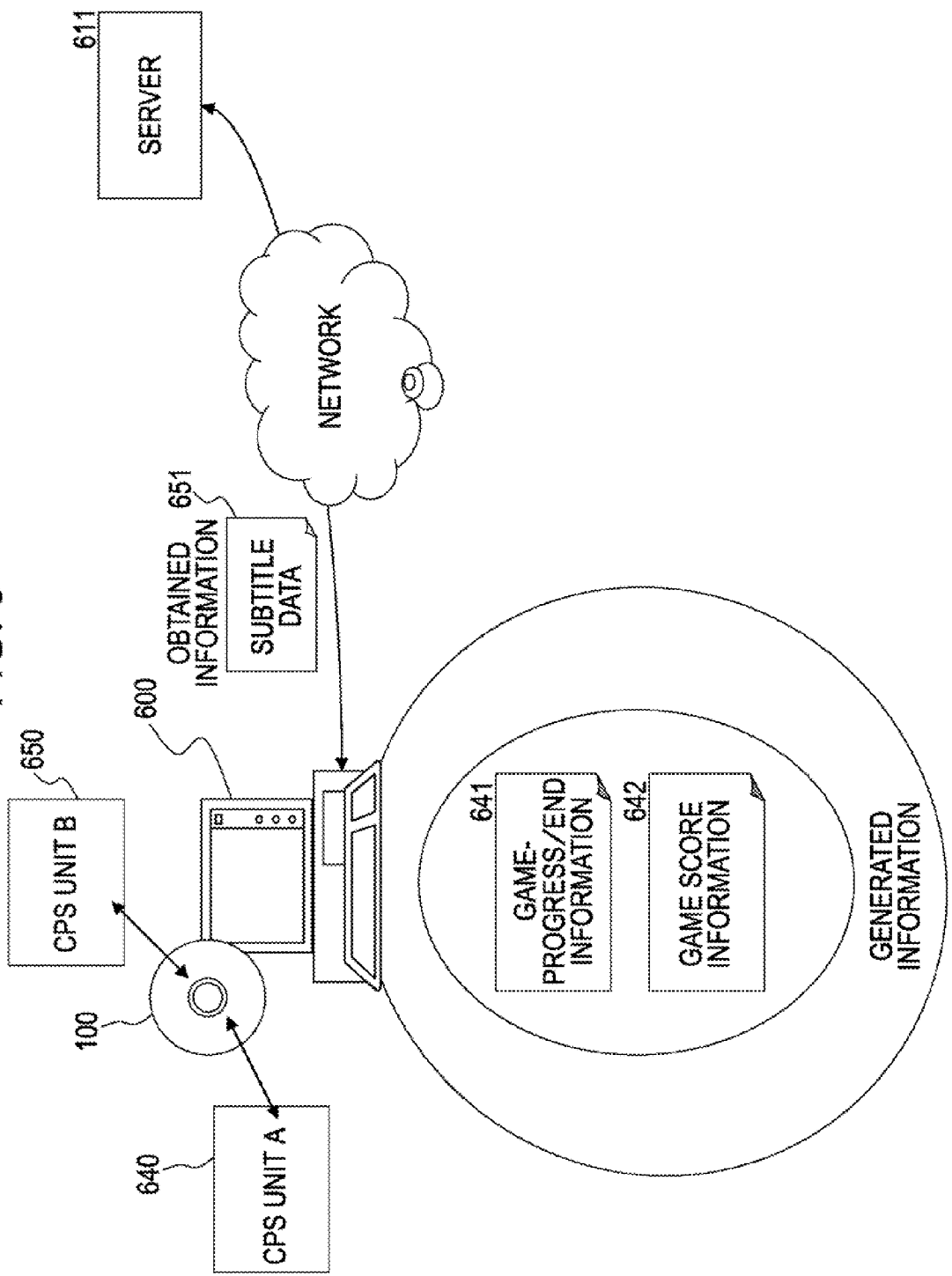
FIG. 9 is a diagram illustrating an example of subsequently acquired data that is generated or obtained by the information processing apparatus.

FIG. 9 shows another specific example of data subsequently generated or obtained by the information processing apparatus.

The information processing apparatus 600 plays back the information recording medium 100 on which content managed by multiple CPS units is stored.

For example, a CPS unit A 640 is a content management unit including a game program. When the information processing apparatus 600 executes the game program, subsequently acquired data 641 and 642, such as game progress/end information and game-score information, are generated. The information processing apparatus 600 executes processing for setting the data as data constituting the CPS unit A 640, and the resulting data are stored on the information recording medium 100 or on the storage unit, such as the hard disk in the information processing apparatus 600.

A CPS unit B 650 is a content management unit including AV stream content, such as moving images including a movie and so on. The information processing apparatus 600 obtains subsequently acquired data 651, including subtitle data for the AV stream content, from the server 611, and plays back the obtained data. The information processing apparatus 600 executes processing for setting the obtained subtitle data 651 as data constituting the CPS unit B 650, and the resulting data is stored on the information recording medium 100 on the storage unit, such as the hard disk in the information processing apparatus 600.

The configuration may be such that, in either of the processing, a new CPS unit is set for the subsequently acquired data and the subsequently acquired data is stored on the information recording medium 100 or on the storage unit, such as the hard disk in the information processing apparatus 600 or a removable memory, as data constituting the newly set CPS unit. As the CPS units, CPS units for new data, as those described above with reference to FIG. 2, are set in association with the new data. The recording seeds Vu for the corresponding CPS units are pre-stored on the information recording medium. The recording seeds are used to execute a predetermined cryptographic-processing sequence to generate CPS unit keys. The generated CPS unit keys are used to encrypt the generated data or obtained data and the encrypted data are stored on the information recording medium 100 or on the storage unit, such as the hard disk in the information processing apparatus 600 or a removable memory.

The recording seeds Vu for the newly set CPS units may be obtained from an external server. However, it is desired that predetermined authentication processing be executed between the server that provides the recording seeds Vu and the information processing apparatus to prevent unauthorized recording-seed acquirement. The acquirement of the recording seeds Vu in this case include acquirement for each management table shown in FIG. 2.

A scheme for encrypting and managing subsequently generated or obtained data will now be described with reference to FIG. 10.

Figure 10:
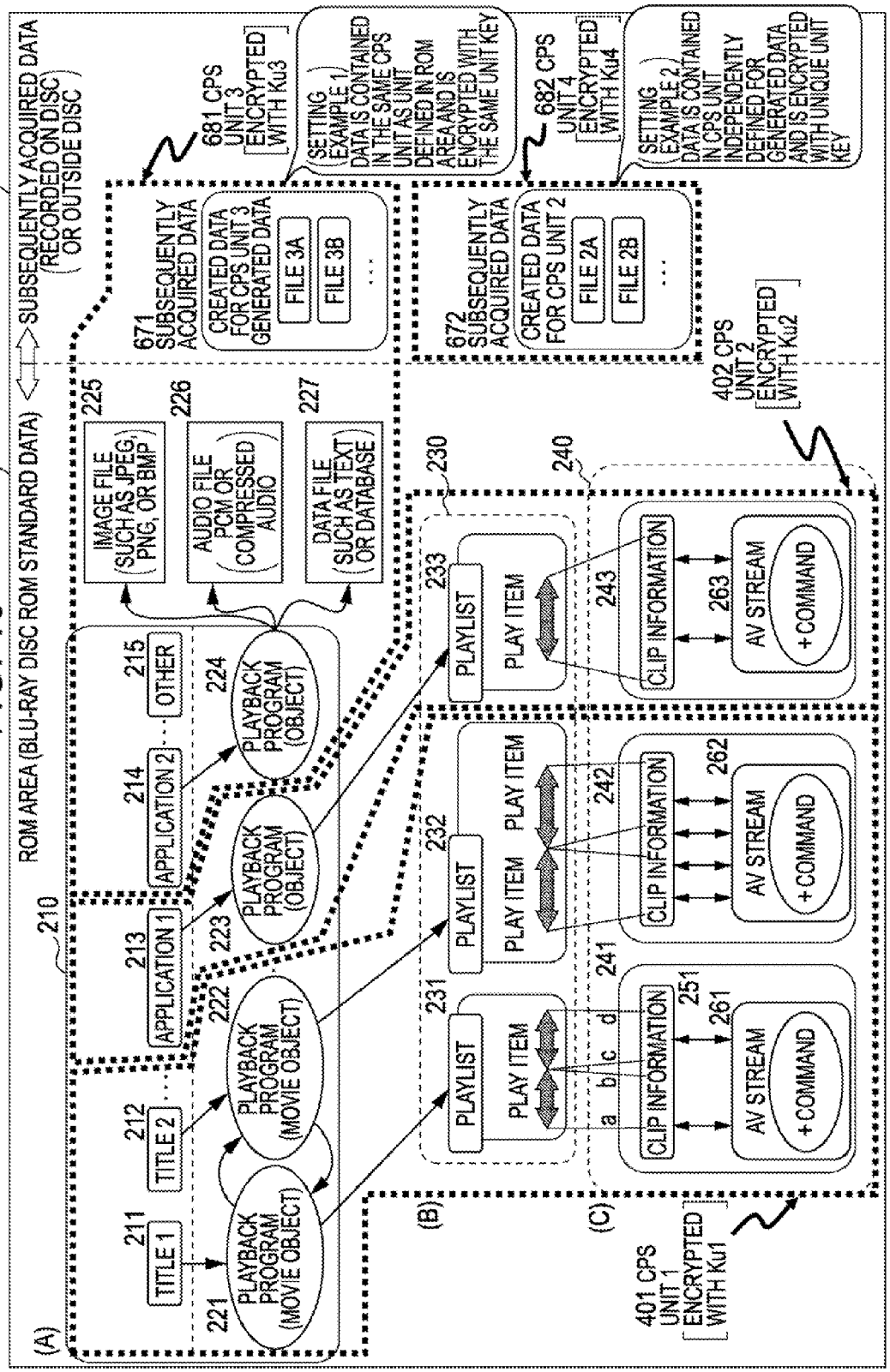
FIG. 10 is a diagram illustrating a relationship between CPS units and the subsequently acquired data that is generated or obtained by the information processing apparatus.

FIG. 10 shows an example of a data encryption method for a case in which data generated or obtained so as to correspond to the playback processing of content stored on an information recording medium is recorded on or outside the information recording medium.

In FIG. 10, the data area at the left side contains data that are already stored on the information recording medium, i.e., ROM area data 660, and the data area at the right side contains subsequently acquired data 670, i.e., newly generated or obtained data. The newly generated or obtained data are stored in a data-writable area or the hard disk in the information recording medium or external storing means, such as a removable medium. FIG. 10 shows two examples for setting CPS units for newly generated or obtained data.

SETTING EXAMPLE 1

This is an example of processing for integrating subsequently acquired data 671 into a CPS unit pre-set on the information recording medium, as indicated by a CPS unit 3 681 shown in FIG. 10.

The CPS unit 3 681 is data already stored on the information recording medium, i.e., a CPS unit 3 already set in the data area 660. In this configuration, the newly generated or obtained data 671 is contained in the CPS unit 3 681 to become one unit. In this case, the subsequently acquired data 671 or data contained in the subsequently acquired data 671 is encrypted with a unit key Ku3, which is generated using a recording seed Vu3 set in association with the CPS unit 3, and is stored on the information recording medium or on the storage unit, such as the hard disk.

In this configuration example, generated data is encrypted using the same key as a unit key for a CPS unit already defined in a ROM area of the information recording medium. In playback processing, the same key as one for data contained in the CPS unit already defined in the ROM area of the information recording medium can be used to execute processing for decrypting the subsequently acquired data 671, thus eliminating the need for processing for switching keys to allow seamless playback.

SETTING EXAMPLE 2

This is an example of processing for managing subsequently acquired data 672 by setting a new CPS unit that is different from a CPS unit that is pre-set on the information recording medium, as indicated by a CPS unit 4 682 shown in FIG. 10.

In this manner, the CPS unit 4 682 is additionally defined for the subsequently acquired data 672 and a unit key therefor is used to encrypt data contained in the subsequently acquired data 672. The CPS unit 4 682 is managed independently from the data recorded on the information recording medium. In this case, it is necessary to additionally set and record, as management data, information for assigning a CPS unit for the subsequently acquired data 672 and information for generating a unit key.

An example of setting playback/copy control information as management data for newly generated or obtained data will now be described with reference to FIG. 11.

Figure 11:
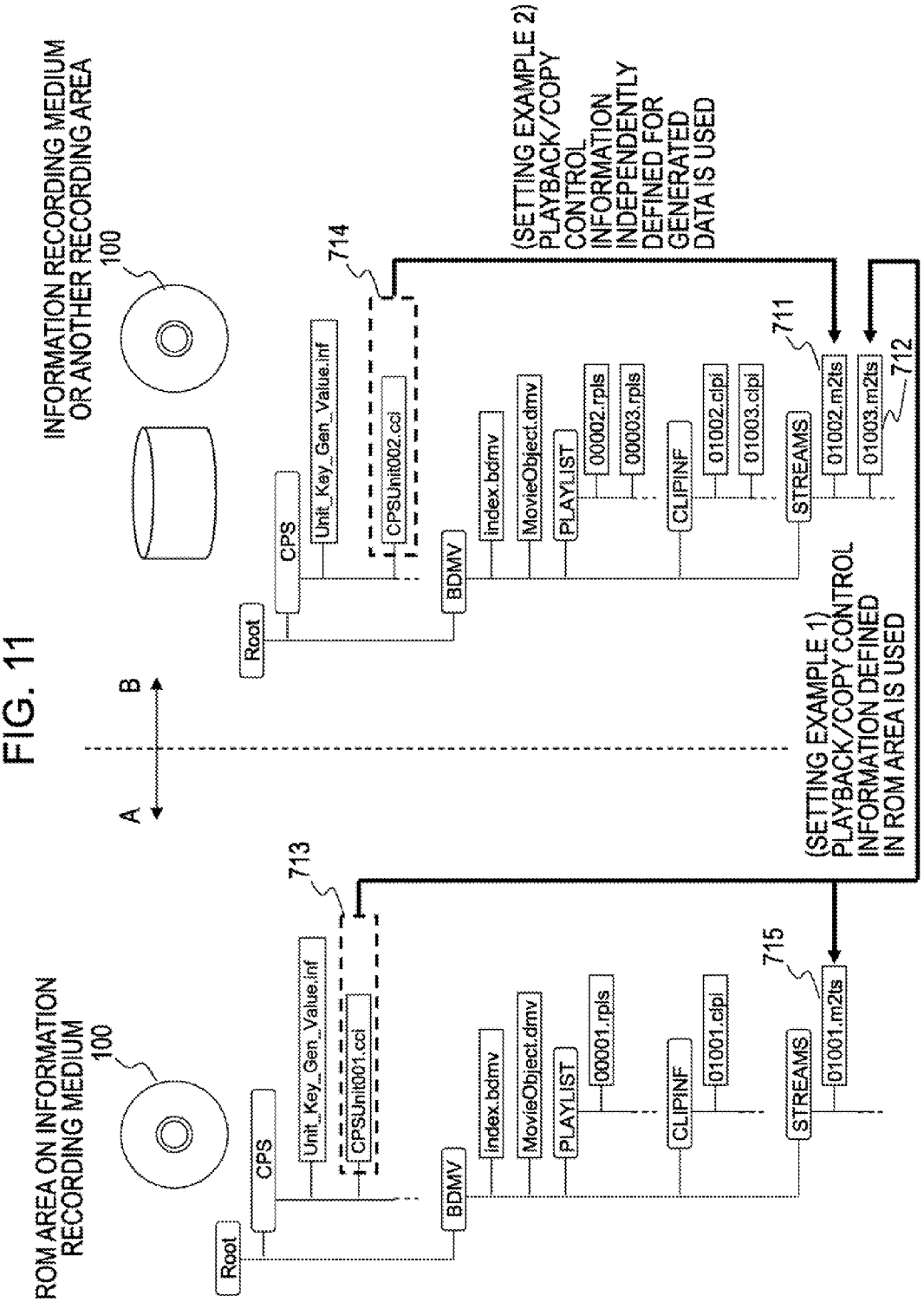
FIG. 11 is a diagram illustrating a setting example of playback/copy control information for the subsequently acquired data that is generated or obtained by the information processing apparatus.

FIG. 11 shows directory A for the structure of CPS management units pre-stored on the information recording medium 100 and directory B for newly generated or obtained data. In the example shown in FIG. 11, in either of the directories, data are set in a [BDMV] directory as content that conforms to the Blu-ray Disc™ ROM standard format and various types of management data are stored in the [CPS] directory.

As a method for recording the playback/copy control information, one of the following two setting examples is used.

SETTING EXAMPLE 1

Existing playback/copy control information is used as playback/copy control information for subsequently acquired data.

That is, as shown in FIG. 11, playback/copy control information [CPSUnit001.cci] 713 for data [01001.m2ts] 715 in CPS unit 001 stored on the information recording medium 100 is directly used as playback/copy control information for newly generated or obtained data [01003.m2ts] 712. In this case, it is unnecessary to newly generate playback/copy control information for the subsequently acquired data [01003.m2ts] 712. The playback/copy control information [CPSUnit001.cci] 713 for CPS unit 001 is set as playback/control information used for both the existing data [01001.m2ts] 715 and the subsequently acquired data [01003.m2ts] 712.

SETTING EXAMPLE 2

Playback/copy control information for subsequently acquired data is newly generated.

This is an example in which, as shown in FIG. 11, new playback/copy control information [CPSUnit002.cci] 714 is generated as playback/copy control information for subsequently acquired data [01002.m2ts] 711 and is used as management data.

The case of (setting example 1) is a method suitable for a case in which, for example, subtitle data of a language that is not recorded in the ROM area of the information recording medium 100 is downloaded and is played back in conjunction with video/audio data recorded in the ROM area. In this case, it is natural to perform processing assuming that both the data recorded in the ROM area and the downloaded data belong to one CPS unit to perform processing.

The case of (setting example 2) is suitable for, for example, a case in which it is desired to allow multiple users to share/copy data generated by executing an application program read from the information recording medium 100. Data, such execution applications and AV streams, recorded in the ROM area cannot be copied. However, playback/copy control that is different from that for the ROM area is possible for data generated by an execution application (i.e., information that may be transmitted to another user or may be downloaded to another portable device, such as game score information and map information)

Figure 12:
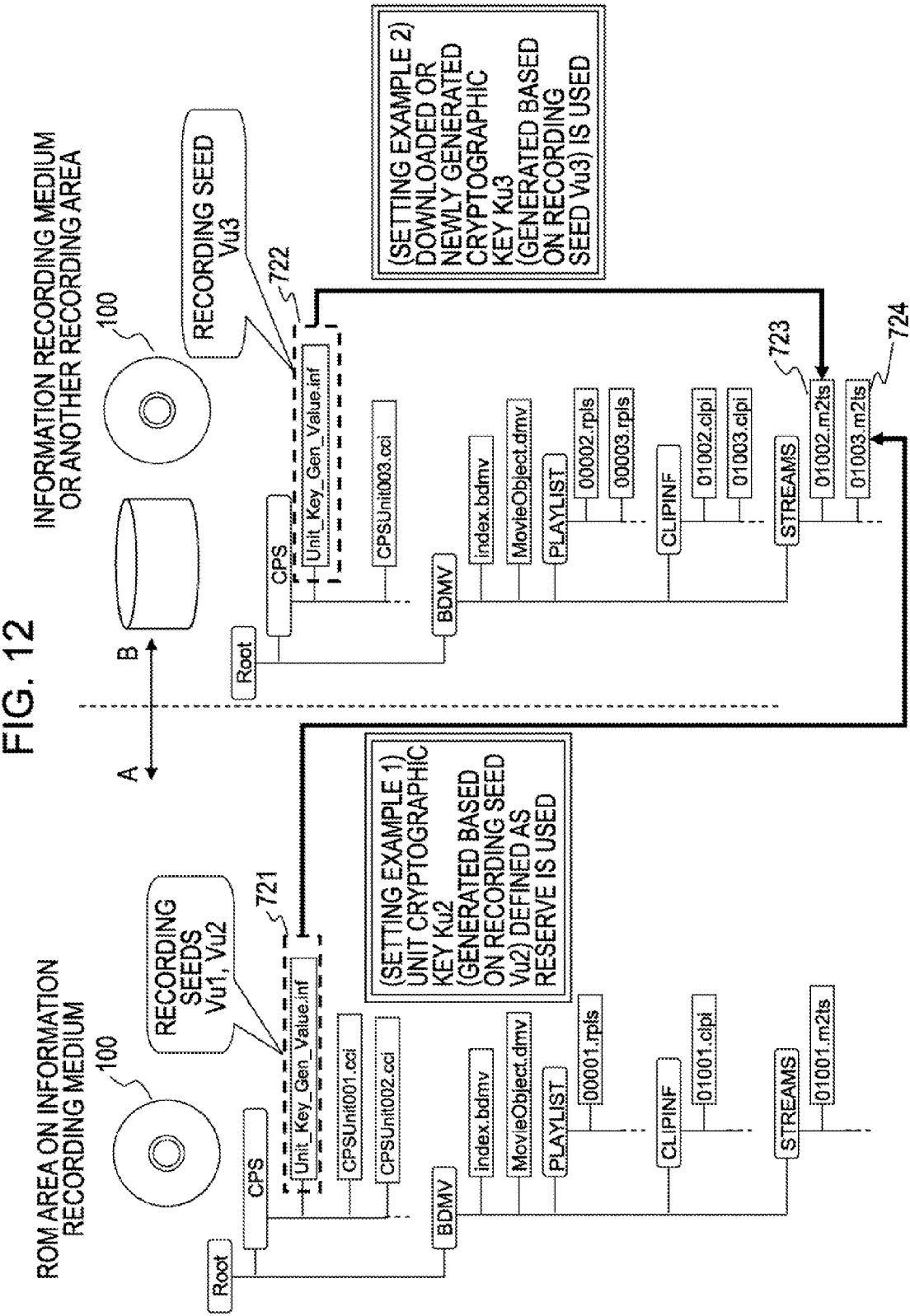
FIG. 12 is a diagram illustrating a setting example of cryptographic-key information for the subsequently acquired data that is generated or obtained by the information processing apparatus.

FIG. 12 shows a setting example of the recording seeds, which serve as information for generating cryptographic keys, i.e., unit keys, for corresponding CPS units.

Similarly to FIG. 11, FIG. 12 shows directory A for the structure of CPS management units pre-stored on the information recording medium 100 and directory B for subsequently acquired data, i.e., newly generated or obtained data. In the example shown in FIG. 12, in either of the directories, data are set in a [BDMV] directory as content that conforms to the Blu-ray Disc™ ROM standard format and various types of management data are stored in the [CPS] directory.

As described above with reference to FIG. 2, the recording seeds are associated with respective CPS unit identifiers (CPS unit IDs) and are managed in the CPS unit management table. Cryptographic-key information [Unit Key Gen Value.inf] 721 shown in FIG. 12 is the CPS unit management table stored on the information recording medium 100.

As a method for setting recording seeds for corresponding CPS units set in association with subsequently acquired data, one of the following setting methods is used.

SETTING EXAMPLE 1

Recording seeds for new data, the recording seeds being pre-set in the CPS unit management table, are used as recording seeds for generating cryptographic keys for subsequently acquired data.

In this configuration, recording seeds that are already set in the new-data fields 121 (see FIG. 2) in the CPS unit management table, described above with reference to FIG. 2, are used as recording seeds for generating cryptographic keys for subsequently acquired data. In FIG. 12, the recording seed that is already set in the new-data fields 121 in the cryptographic key information [Unit Key Gen Value.inf] 721, which is the management table data stored on the information recording medium 100, is associated with subsequently acquired data [01003.m2ts] 724. In this setting example, the recording seed that is already set in the new data fields 121 (see FIG. 2) can be used for a newly defined CPS unit.

SETTING EXAMPLE 2

Newly generated or obtained recording seeds are used as the recording seeds for cryptographic keys for subsequently acquired data. In FIG. 12, cryptographic-key information [Unit Key Gen Value.inf] 722, which serves as a new management table data, is set for subsequently acquired data [01002.m2ts] 723, and a CPS unit identifier newly set as a new entry and a generated or obtained recording seed are associated with each other and are contained. When recording-seed generation is permitted, the data processor in the information processing apparatus generates a new recording seed by, for example, generating a random number. In this setting example, with respect to new data, the setting of CPS units and the generation of recording seeds can be performed without any restriction.

When the information processing apparatus sets a new CPS unit, it is necessary to associate management data, i.e., playback/copy control information, for the newly set CPS unit with the new CPS unit. This association employs one of the two schemes described above and shown in FIG. 11, that is, one of the method in which existing playback/copy control information is associated and the method in which new playback/copy control information is set and associated.

[5. Configuration of Association of Data Constituting CPS Unit on Information Recording Medium and Data Consisting CPS Unit Stored other than Information Recording Medium]

As stated above, subsequently acquired data, which is not stored as original data on the information recording medium on which content managed by CPS units is stored, is stored on the information recording medium, the hard disk, or a removable memory, such as a flash memory. In order to process the new data as data to be managed by the CPS management data on the information recording medium, it is necessary to allow new data stored on the information recording medium or hard disk to be identified as data to be managed by the CPS management data on the information recording medium. A configuration for this identification will be described below.

Figure 13:
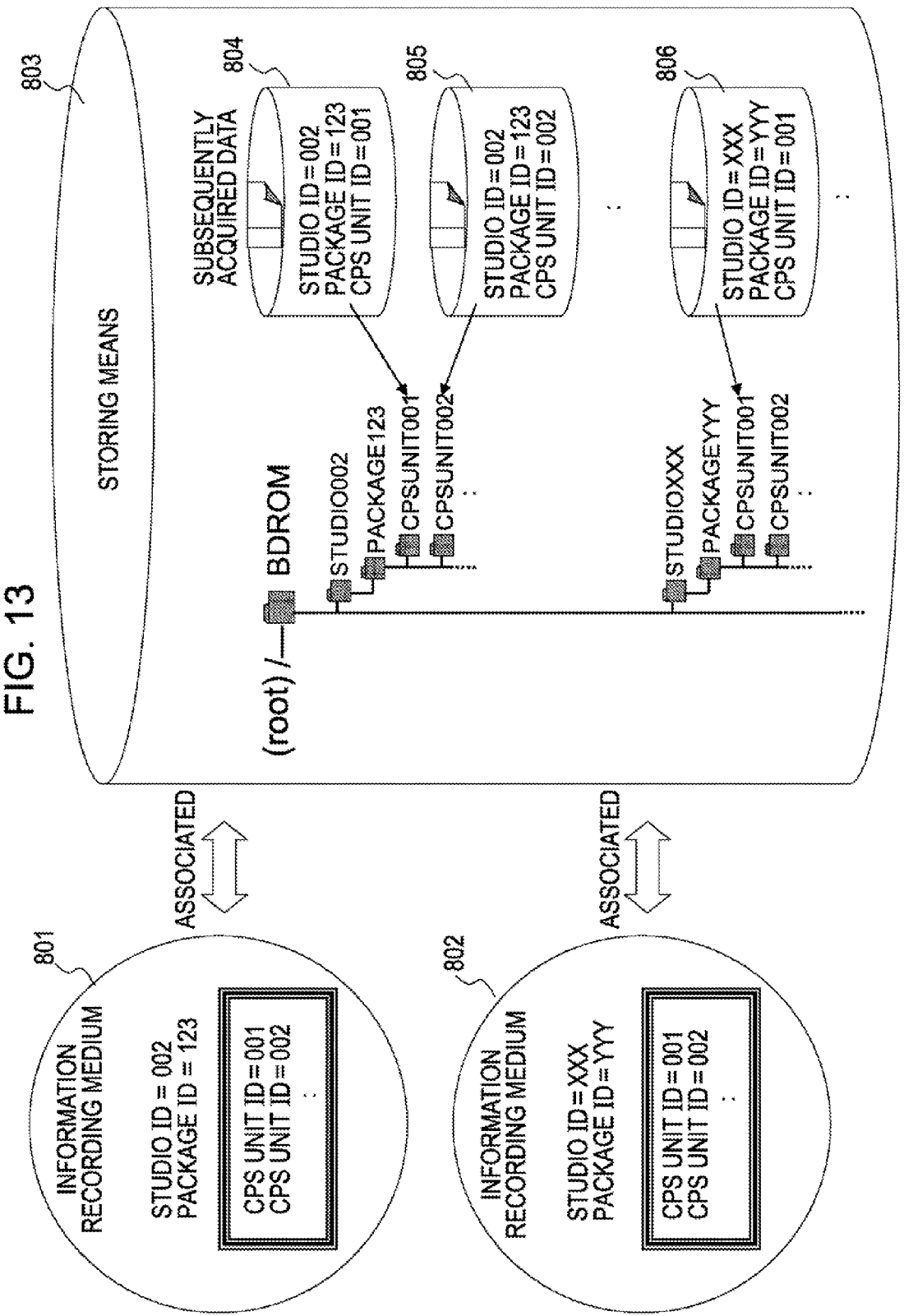
FIG. 13 is a diagram illustrating a configuration for identifying, as a CPS unit, the subsequently acquired data that is generated or obtained by the information processing apparatus.

FIG. 13 is a diagram showing the configuration in which subsequently acquired data and CPS units are associated with each other in a configuration in which the subsequently acquired data is stored on storing means, such as the hard disk in the information processing apparatus, other than on an information recording medium having original CPS units.

When subsequently acquired data is to be recorded on storing means other than an information recording medium having original CPS units, subsequently acquired data corresponding to information recording media 801 and 802, which are different from each other and have CPS units, are stored on storing means 803, such as one hard disk, as shown in FIG. 13.

In this case, it is necessary to identify to which information recording medium 801 or 802 each of the various subsequently acquired data stored on the storing means 803 corresponds.

As described above with reference to FIG. 1, each of the information recording media 801 and 802 stores the studio ID, which serves as the identifier of the editing studio for content stored on the information recording medium 100, and the package ID, which serves as the package identifier for each manufacturing unit of the information recording medium 100.

As shown in FIG. 13, the studio IDs, package IDs, and CPS unit IDs are assigned, as identification data, to various subsequently acquired data 804, 805, and 806 stored on the storing means 803. As shown in the figure, a directory hierarchical structure is constructed in order of the studio IDs, package IDs, and CPS unit IDs, and data are stored and managed based on this directory hierarchical structure.

Generated data can be stored in the directories, assigned for the respective CPS unit IDs, in arbitrary formats. For example, for data generated by an execution application for Java or the like, the format of the data is not limited to a particular format, as long as it can be interpreted by an execution application for Java or the like during playback.

Figure 14:
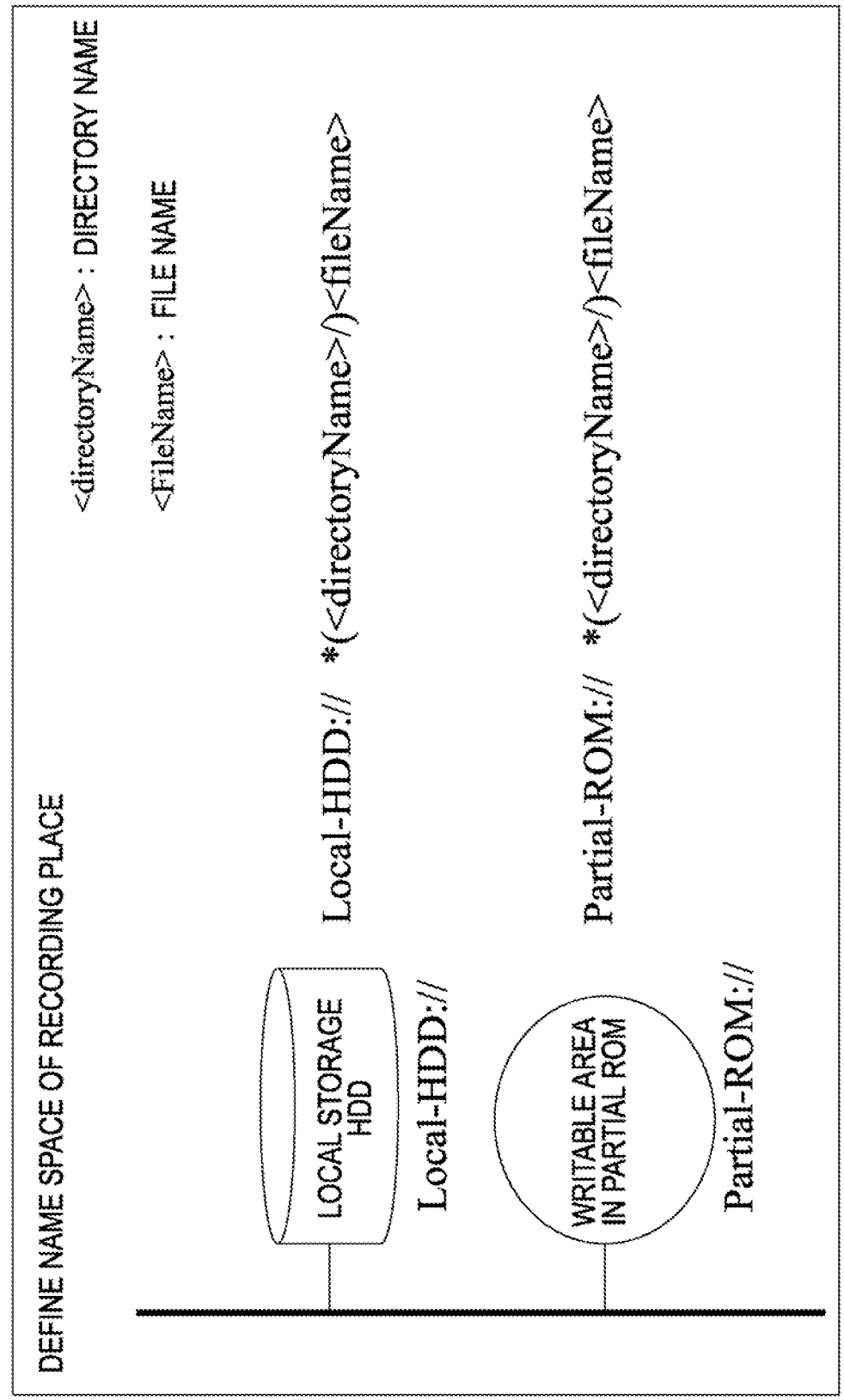
FIG. 14 is a diagram illustrating a configuration for identifying and obtaining, as a CPS unit, the subsequently acquired data that is generated or obtained by the information processing apparatus.

When a directory hierarchy is defined as described above, referring processing that is performed to call up data, recorded on the storing means other than an information recording medium having original CPS units, from an execution program for Java or the like, can be executed as call-up processing based on a name space, a directory, and a file name, as shown in FIG. 14. That is, name spaces are defined, for example, a data writing area of the information recording medium having original CPS units is defined as [Partial-ROM://] and the hard disk is defined as [Local-HDD://]. Thus, a file in which new data is stored can be identified by the name space, directory, and file name and the new data can be read, updated, or rewritten.

[6. Use Control Configuration of Subsequently Acquired Data]

As described above, subsequently acquired data, which are subsequently generated or obtained data as data corresponding to CPS unit content stored on an information recording medium (a recording medium, such as a ROM disc), are stored on a local storage, such as the hard disk. When various information recording media (recording media, such as ROM discs) are used by an information processing apparatus, a large number of pieces of subsequently acquired data are stored on the local storage. In such a case, the information processing apparatus requires data search to use the subsequently acquired data. A description will be given below of search information for efficiently obtaining necessary data from a large number of subsequently-acquired-data files set in a general directory and the configuration of use control for subsequently acquired data.

A processing example of using content stored on an information recording medium (a recording medium, such as a ROM disc) and subsequently acquired data stored on the local storage, such as the hard disk, will first be described with reference to FIG. 15. For example, it is assumed that content stored on an information recording medium (a recording medium, such as a ROM disc) is French-language movie content, and subsequently acquired data stored on the local storage, such as the hard disk, is Japanese-language subtitle data for the movie content. In this case, playback of both the movie content and the subtitle data together allows playback of the movie with the Japanese-language subtitle.

For such combined content playback, the information processing apparatus virtually combines a directory and a file containing the subsequently-acquired-data management file on the local storage and a directory and a file on the information recording medium (a recording medium, such as a ROM disc). In this virtual combination processing, a data file on the recording medium and a corresponding subsequently-acquired-data file on the local storage are set as a file in one directory. As a result of this processing, it is possible to perform high-speed access to files stored on different recording media.

Figure 15:
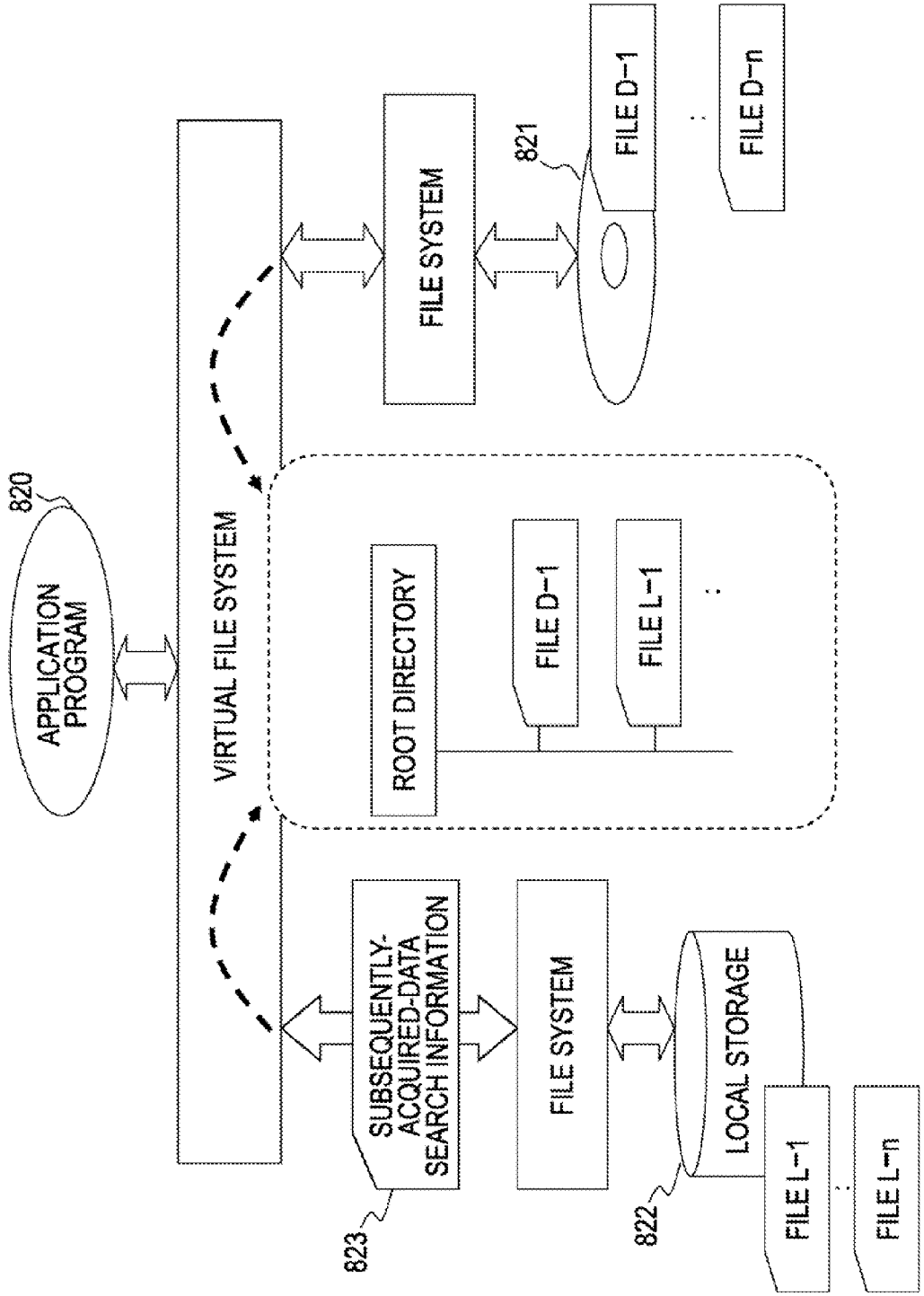
FIG. 15 is a diagram illustrating a virtual file system generated by the information processing apparatus.

An application program 820 shown in FIG. 15 is an application program for a movie object or the like and is executed by the information processing apparatus. The application program 820 operates files recorded on the information recording medium (a recording medium, such as a ROM disc) 821 and files recorded on a local storage 822 via a virtual file system. The application program 820 uses subsequently-acquired-data search information 823 via the file system to obtain required subsequently acquired data. The subsequently-acquired-data search information 823 is search information for a file recorded on the local storage 821.

The virtual file system serves to conceal a difference in recording media (file systems) with respect to the application program 820. Thus, without realizing a difference in recording media on which files are recorded, the application program 820 can operate files recorded on recording media by using the same API.

For example, the virtual file system is generated by merging, when a disc is loaded into the apparatus or when the application program is executed, a file system on the disc and a file system on the local storage, and the generated virtual file system is stored in the memory in the information processing apparatus. In this case, every time a directory or file recorded on the local storage is modified as a result of writing to the file, the virtual file system is updated.

Next, an example of setting and using the subsequently-acquired-data search information 823, which is search information for a file recorded on the local storage 821, will be described with reference to FIG. 16. A directory shown in FIG. 16 is a file management directory for a general system file set on the storing means 803, such as the hard disk or a removable memory, described above with reference to FIG. 13.

An application directory used by various application programs executed by the information processing apparatus and a binding unit directory in which the above-described subsequently-acquired-data files associated with the CPS units are set under the root. As described above, subsequently acquired data, such as download data, recorded on the local storage, such as the hard disk, is bound with data on the information recording medium (a recording medium, such as a ROM disc) and is constructed as one virtual file system before the start of playback processing. Thus, this bound data is referred to as a "binding unit (binding unit)". All subsequently acquired data to be bound with data on the information recording medium (a recording medium, such as a ROM disc) are set in the binding unit directory.

Figure 16:
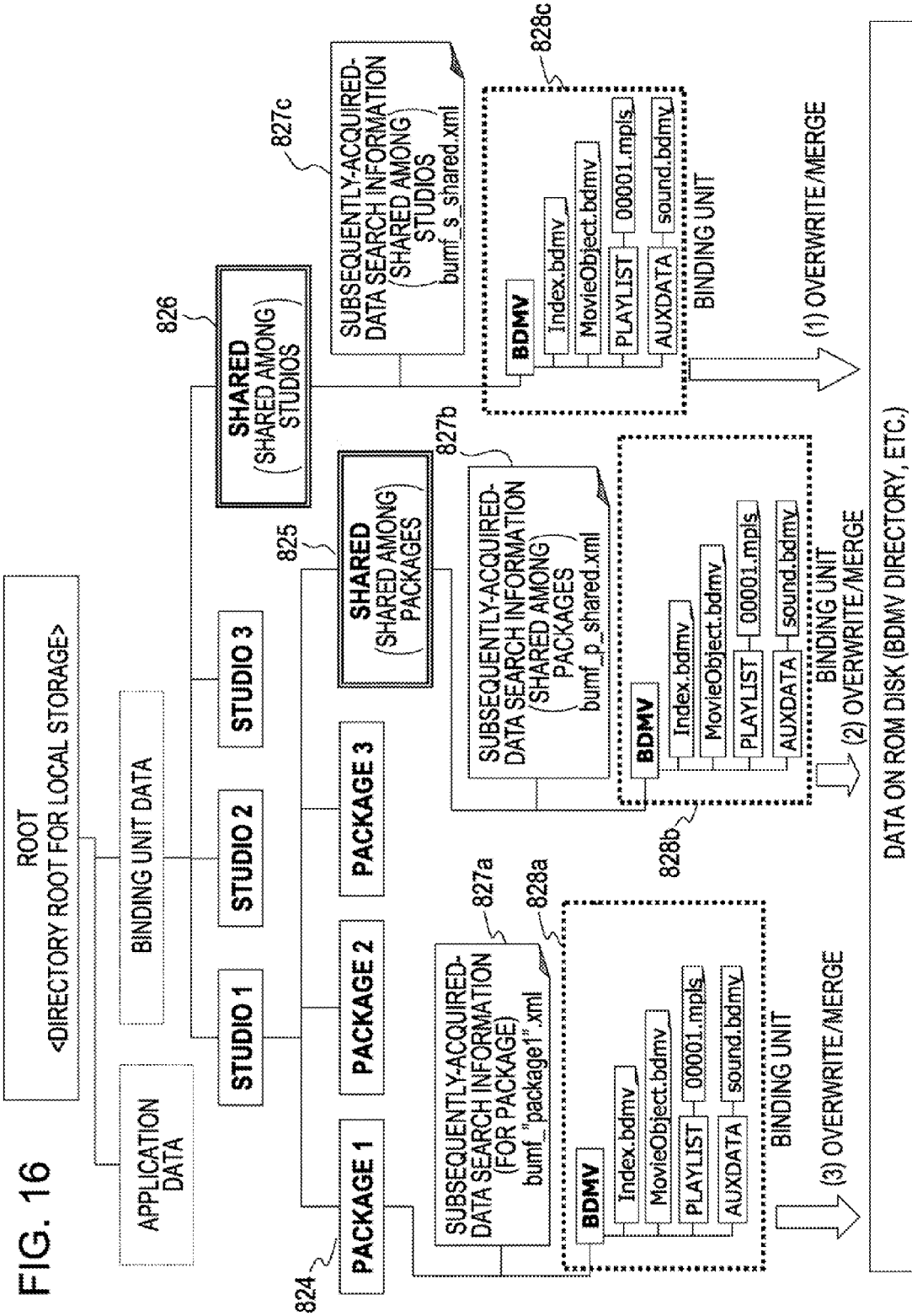
FIG. 16 is a diagram illustrating a setting example of the directory structure of the local storage in the information processing apparatus and subsequently-acquired-data search information.

The directory structure shown in FIG. 16 has a structure in which a studio directories are set under the biding unit directory and package directories is set under the studio directories. This structure is analogous to that of the directory described above with reference to FIG. 13.

Packages 1, 2, and 3 indicate directories for discs on which contents associated with CPS management units are recorded. For example, a subsequently-acquired-data file for content stored on an information recording medium (a recording medium, such as a ROM disc) provided with package ID=1 is set in a package-specific directory 824 for package 1. In the example shown in the figure, the subsequently acquired data corresponds to a binding unit 828a. The subsequently acquired data is set as a binding unit that contains an index, movie object, playlist, and AV data.

Although only one binding unit 828a is shown in the package-specific directory 824 for package 1, multiple binding units can be set. Subsequently-acquired-data search information 827a is a file for searching data set in the package-specific directory for package 1.

In the example shown in the figure, low-order directories, i.e., packages 1 to 3, and an inter-package shared (shared) directory 825 are set in a studio 1 directory. The inter-package shared (shared) directory 825 contains subsequently acquired data that is shared during the use of content-storing packages (discs) associated with studio 1.

For example, when a movie production company A stores a large number of pieces of content on ROM discs and supply the ROM discs to users, unique subsequently acquired data are associated with the respective ROM discs, and the package-specific subsequently acquired data, such as subtitle data, are recorded in binding units set in the directories for packages 1 to 3. However, it is preferred that, for example, a movie preview, other service data, or the like that does not have to be associated with specific content be made available during playback of any ROM disc on which the content provided by the movie production company A is stored. Such data are set in the inter-package shared (shared) directory 825. Such data are contained in a binding unit 828b. Subsequently-acquireddata search information 827*b* is a file for searching data set in the inter-package shared (shared) directory 825.

The figure further shows directories for studios 1 to 3 and an inter-studio shared (shared) directory 826 as directories under the binding-unit data directory. The inter-studio shared (shared) directory 826 contains subsequently acquired data that are shared during use of content-storing packages (discs) associated with studios 1 to 3.

For example, it is preferred that, when multiple different movie production companies A to C store contents on ROM discs and supply the ROM discs to users, data that does not have to be associated with a specific movie production company, for example, various types of service data and advertisement content, be made available independently from the movie production companies during playback of any ROM disc on which the content is stored. Such data are set in the inter-package shared (shared) directory 826. Such data are contained in a binding unit 828*c*. The subsequently-acquired-data search information 827*c* is a file for searching data set in the inter-studio shared (shared) directory 826.

For example, when a disc with package ID=1 is loaded into the information processing apparatus, available subsequently acquired data are the binding unit 828*a* set in the package-specific directory 824 for package 1, the binding unit 828*b* set in the inter-package shared (shared) directory 825, and the binding unit 828*c* set in the inter-studio shared (shared) directory 826.

In the virtual file system described above with reference to FIG. 15, data set in these three difference binding units and data stored on the information recording medium (a recording medium, such as a ROM disc) are merged to generate a virtual file. As described above, the virtual file system is generated by merging, when a disc is loaded into the apparatus or when the application program is executed, a file system on the disc and a file system on the local storage, and the generated virtual file system is stored in the memory in the information processing apparatus.

It is assumed that, as shown in FIG. 16, there are multiple binding units to be merged, as follows:

(1) the binding unit 828*c* set in the inter-studio shared (shared) directory 826, (2) the binding unit 828*b* set in the inter-package shared (shared) directory 825, and (3) the binding unit 828*a* set in the package-unit directory 824 for package 1.

Merge processing is performed on the binding units (1) to (3) in order of (1)→(2)→(3). When the same file name exists, processing for overwriting it with a subsequent file is executed. In this processing, merge processing is performed with priority being given to a file associated with a package, then, the inter-package shared file, and last, the inter-studio shared file.

Next, the data structure of a subsequently-acquired-data search-information file will be described with reference to FIG. 17. A file used for searching for subsequently acquired data stored on the storing means (the local storage), such as the hard disk, is a subsequently-acquired-data search-information file.

Figure 17:
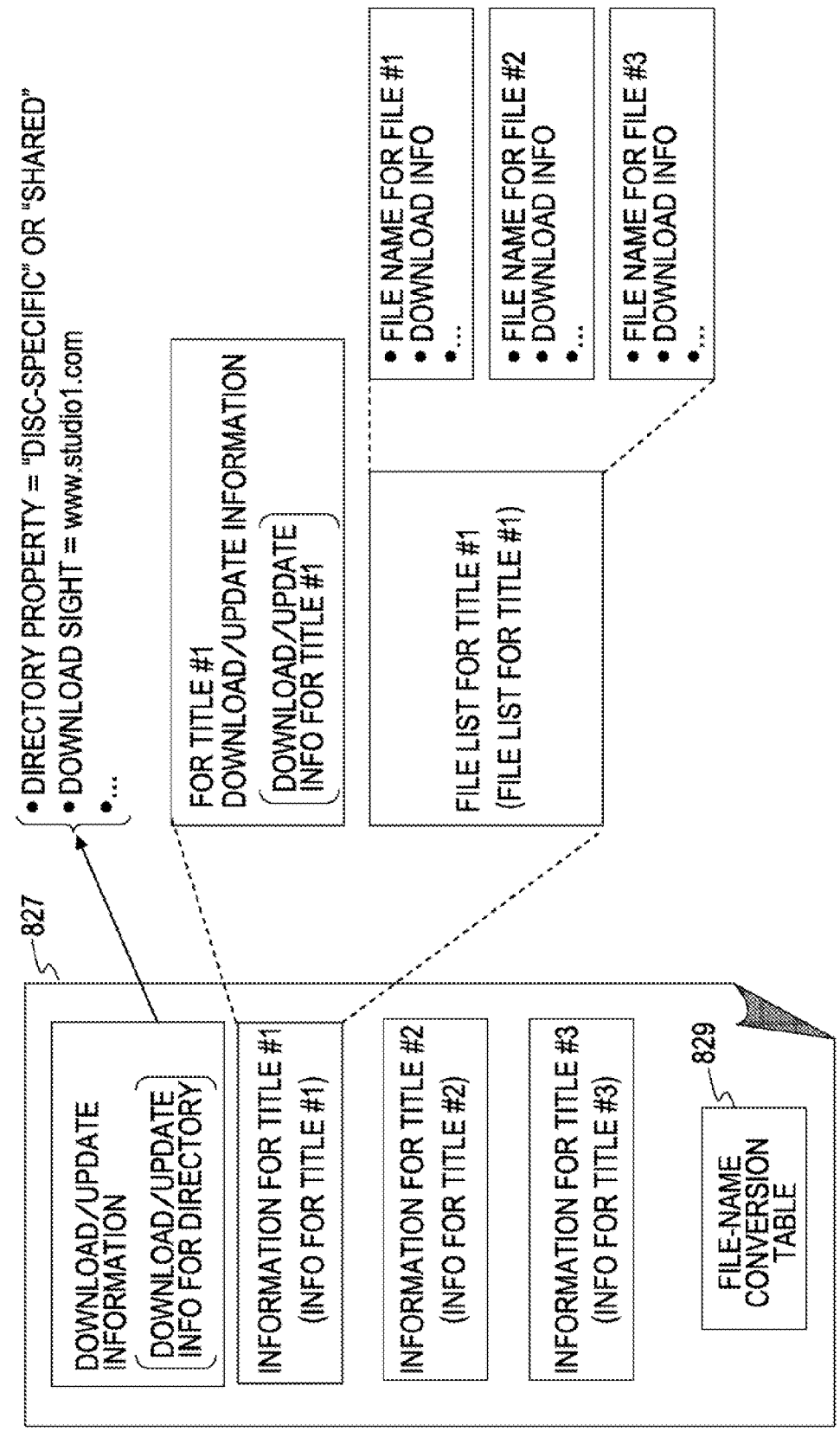
FIG. 17 is a diagram illustrating an example of the data structure of the subsequently-acquired-data search information.

As shown in FIG. 17, the subsequently-acquired-data search-information file 827 contains properties of a directory and download-sight information. The subsequently-acquired-data search-information file 827 further contains, as information for titles (indices) for files stored in the directory, download/update information for the titles and title-related information including file lists for the tiles. The file list for the title contains the file name of the subsequently acquired data for each title and download information. Based on the title, an application for performing content playback can obtain the file name of a required file and can select data based on the file name.

Further, a file-name conversation table 829 is recorded in the subsequently-acquired-data search-information file 827. The structure of the file-name conversation table will be described with reference to FIG. 18.

For example, the file names of subsequently-acquired-data files set in the inter-studio shared (shared) directory shown in FIG. 16 are file names set by data-providing studios that provide the subsequently acquired data. Thus, unless some rule is applied, there is a possibility that the same file name is set. Thus, it is necessary to pre-determine a file-name setting rule and to store subsequently-acquired-data files provided with file names that comply with the rule.

For example, it is possible to employ a method for avoiding the duplication by sharing information among users. For example, when content that uses a shared (shared) directory is produced, it is possible to perform an operation in which the user issues a request to a management entity in advance to obtain use permission of a specific file name. Examples of possible methods include a method in which, when an AV stream file is to be downloaded to a shared (shared) directory, the user issues a request to the management entity in advance to obtain a specific file name, such as [001XX.m2ts] or [001XX.clpi], that is not the same as the others.

Another method is, for example, to set a studio name or the like that provides subsequently acquired data to store the subsequently acquired data in a shared (shared) directory. For example, for subsequently acquired data for studio A, the following are set:

studioA.STREAM.00001.m2ts, and
studioA.CLIPINF.00001.clpi.

For example, for subsequently acquired data for studio B, the following are set:

studioB.STREAM.01001.m2ts, and
studioB.CLIPINF.01001.clpi.

However, if such studio names are mixed in file names set in the virtual file generated by the above-described merge processing, the file names may differ from file names registered as file names that can be used by a playback processing application, which may makes it impossible to use the subsequently acquired data.

In order to overcome this problem, the file-name conversion table shown in FIG. 18 is used. That is, the file-name conversation table 829 is recorded in the subsequently-acquired-data search-information file 827, and when the merge processing is performed during generation of a virtual file, the file-name conversation table is referred to determine a file name to be set for the virtual file.

The file-name conversion table shown in FIG. 18 has a structure in which entries in [File Name on Local Storage Name], [Studio ID], [Package ID], and [File Name after Conversion] are associated with each other.

The [File Name on Local Storage] is an actual file name used during recording to the local storage on which subsequently acquired data is stored. The file names are set as, for example, file names to which or studio names are added, in order to prevent the duplication.

The file-name conversion processing is determined based on a studio ID and a package ID for corresponding playback content. When playback processing is executed, processing for biding data on an information recording medium (a recording medium, such as a ROM disc) and subsequently acquired data is performed. All of subsequently acquired data to be used are associated with studio IDs and package IDs. The information processing apparatus for performing content playback processing obtains the studio ID and the package ID of content to be played back; obtains a file name after the conversion by using the file-name conversion table, based on the obtained IDs; and sets the obtained file name as a file name in the virtual file system.

For example, when the file name on the local storage name is studioA.STREAM.00001.m2ts, the studio ID of playback content is 1, and the package ID is 1, 2, or 3, the file name after the conversion is BDMV/STREAM/00001.m2ts.

This post-conversion file name "BDMV/STREAM/00001.m2ts can be used by the playback application.

In this manner, the use of the file-name conversion table to execute file-name conversion allows arbitrary file names to be set in directories on the local storage and thus allows files having arbitrary and different names be set.

For the second and third entries from the bottom of the file-name conversion table shown in FIG. 18, the [File Names on Local Storage] are the same, which is studioC.STREAM.00002.m2ts;

for studio ID=1 and package ID=1, 2, or 3, the post-conversion file name is BDMV/STREAM/00002.m2ts; and for studio ID=2 and package ID=4, 5, or 6, the post-conversion file name is BDMV/STREAM/00012.m2ts. Thus, the file-name conversion table is configured to convert file names into different file names from each other depending on the values of a studio ID and a package ID. In this manner, the use of the file-name conversion table to perform file-name conversion allows file names to be set as, for example, different file names used by different playback applications.

Such a file-name conversion table may be used by storing it in subsequently-acquired-data search information set in a shared directory, such as the inter-studio shared (shared) directory 826 or the inter-package shared (shared) directory 825 shown in FIG. 16. Alternatively, the file-name conversion table may be stored in a subsequently-acquired-data search-information file set in a directory corresponding to a package ID. A file under a directory corresponding to a package ID is completely under control of one studio, unlike the case of a shared (shared) directory. Thus, the file can be stored with a file name having a format that allows easy management, and when a virtual file system is constructed, the file name can be converted into a file name (such as "XXXXX.m2ts") that complies with a format that can be interpreted by the playback application.

In the directory structure shown in FIG. 16, a subsequently-acquired-data directory structure for the local storage having three types of low-order directories as follows is shown:

(1) Inter-Studio Shared (Shared) Directory,
(2) Inter-Package Shared (Shared) Directory, and
(3) Package-specific directory.

However, a structure that does not have a shared directory, i.e., does not have an inter-studio shared (shared) directory and an inter-package shared (shared) directory, is also possible.

Figure 19:
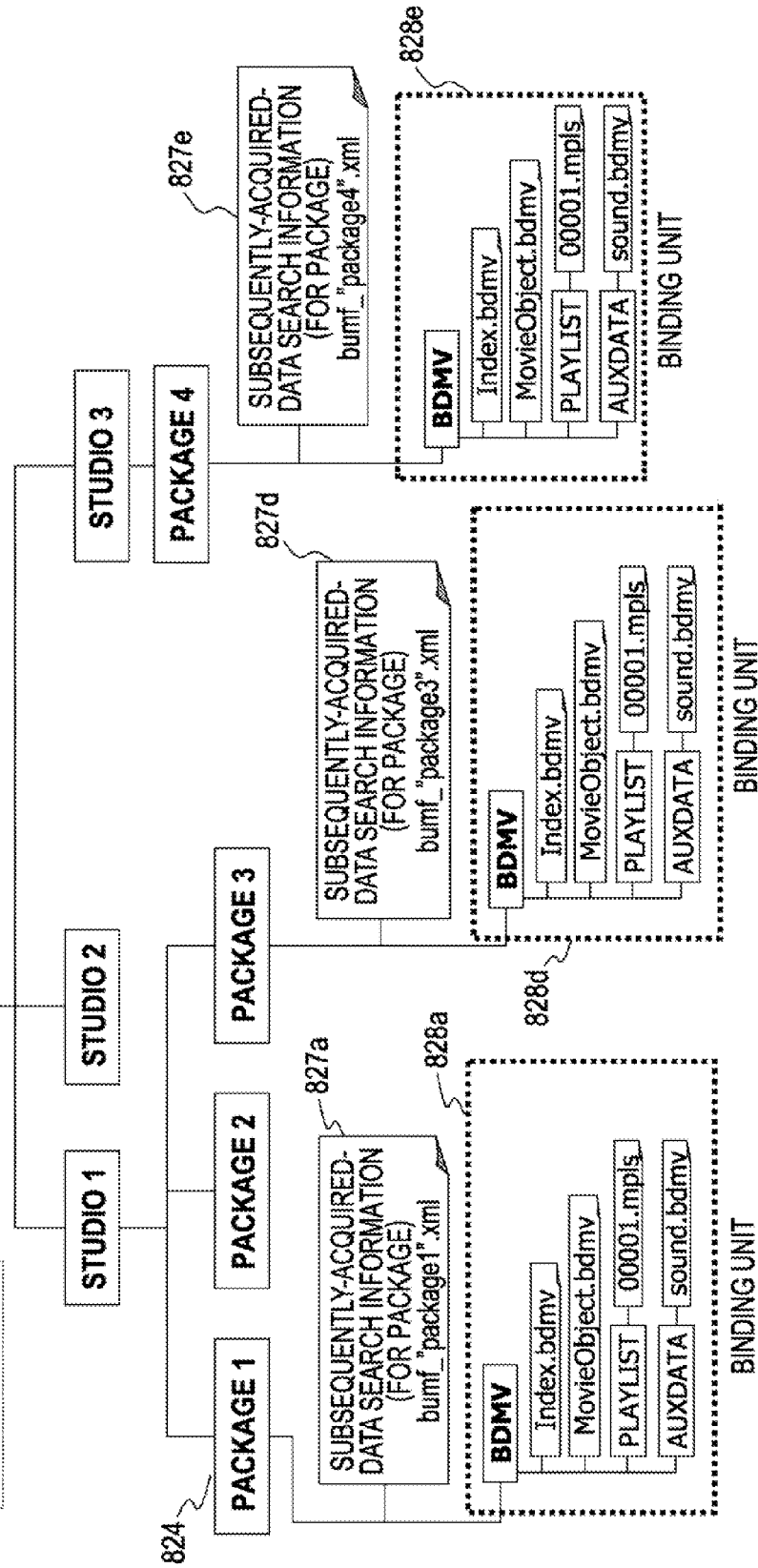
FIG. 19 is a diagram illustrating a setting example of the subsequently-acquired-data search information in a configuration that has no shared directory in the directory structure of the local storage in the information processing apparatus.

For example, as shown in FIG. 19, for the local storage, a subsequently-acquired-data storage directory structure that does not have any shared directory and that has only package-specific directories is also possible. In such a directory structure, subsequently-acquired-data search information 827*a*, 827*d*, and 827*e* are set in the package-specific directories, respectively. Binding units 828*a*, 828*d*, and 828*e* are set in the package-specific directories, respectively. Search information for the corresponding binding units are stored in subsequently-acquired-data search information 827*a*, 827*d*, and 827*e*.

In such a structure that does not have any shared directory, overwrite/merge processing as described above, that is, overwrite/merge processing that is performed in order of data for an inter-studio shared directory, data for an inter-package shared directory, and data for a package-specific directory, is not required when subsequently acquired data on the local storage and data stored on an information recording medium (a recording medium, such as a ROM disc) are merged to generate a virtual file.

The file-name conversion table described above with reference to FIG. 18 can be used for subsequently-acquired-data files set in package-specific directories as shown in FIG. 19, and may be contained in subsequently-acquired-data search information set in the package-specific directories or may be set as an independent file.

When the file-name conversion table is used, a file name to be stored on the local storage can be freely set as an arbitrary name. Thus, when a virtual file system is configured, the file-name conversion table is used to convert a file name into a file name registered as a file name that can be used by a playback processing application. In this conversion processing, the playback application can read subsequently acquired data from the virtual file system.

Next, a description will be given of a structure in which access control information is used to execute use control for subsequently acquired data stored on the local storage.

Figure 20:
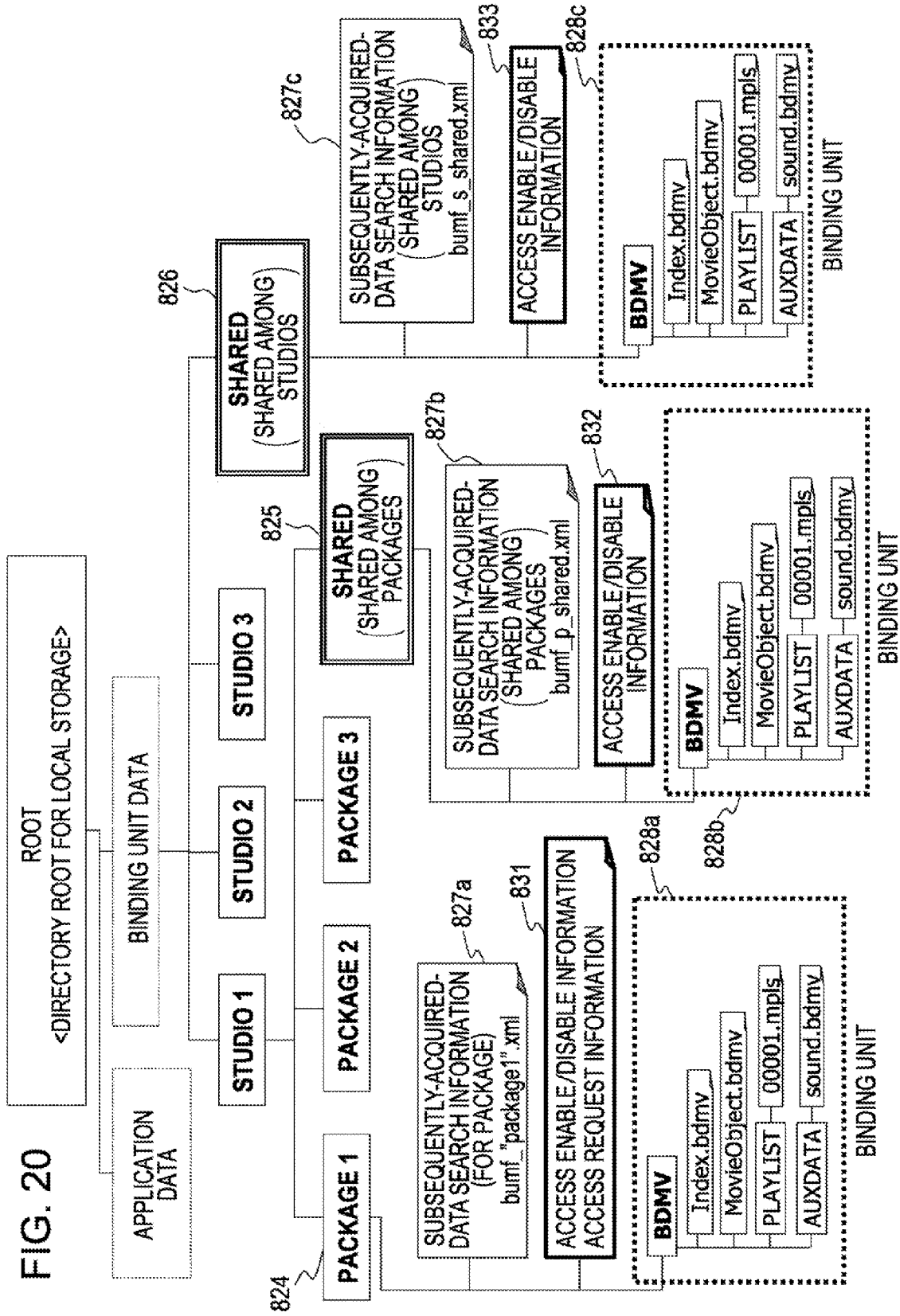
FIG. 20 is a diagram illustrating a setting example of the directory structure of the local storage in the information processing apparatus and access control information.

A directory shown in FIG. 20 is analogous to the directory described above with reference to FIG. 16 and is a file management directory for general system files set on the storing means 803, such as the hard disk or a removable memory. This directory has a structure in which studio directories are set under a binding unit directory, which is a directory for subsequently acquired data, and package directories are set under the studio directories.

Access control information 831 to 833, which are files that are not shown in FIG. 16, are added to the directory shown in FIG. 20. The access control information 831 is access control information file set in the package-specific directory 824 for package 1, a subsequently-acquired-data file associated with content stored on an information storage medium (a storage medium, such as a ROM disc) provided with package ID=1 being set in the package-specific directory 824. The access control information 831 includes access enable/disable information and access request information.

Access control information 832 is an access control information file set in the inter-package shared (shared) directory 825 in which subsequently acquired data that is shared during the use of content storage packages (discs) for studio 1 is stored, and has access enable/disable information.

The access control information 833 is an access control information file set in the inter-studio shared (shared) directory 826 in which subsequently acquired data that is shared during the use of content storage packages (discs) for studios 1 to 3 is stored, and has access enable/disable information.

Although the access control information 831 to 833 have independent file structures in the example shown in FIG. 20, the data may be included in the subsequently-acquired-data search-information file 827*a* to 827*c*.

First, access enable/disable information stored in all access control information 831 to 833 will be described with reference to FIG. 21. Validity-period information and write (write) and read (read) enable/disable information for the subsequently-acquired-data files belonging to the directories in which the access control information 831 to 833 are set are recorded in the access enable/disable information.

In the example of the access enable/disable information shown in FIG. 21, write (write) and read (read) enable/disable information for subsequently-acquired-data files associated with studio ID=A and package ID=X are recorded in a data portion 841, and write (write) and read (read) enable/disable information for subsequently-acquired-data file associated with studio ID=B and package ID=Y are recorded in a data portion 842.

First data recorded in the data portion 841 will be described by way of example. For the subsequently acquired data having subsequently-acquired-data file name "BDMV/STREAM/00001.m2ts", the validity period is YYYY/MM/DD, write (write) is false, which indicates that the data is write-prohibited data, and read (read) is true, which indicates that the data is read-permitted data.

In this manner, the access enable/disable information has a structure in which access enable/disable information for each studio and package is set, and is set as control information indicating a use validity period for use of content of the corresponding studio and package, write enable/disable information, and read enable/disable information. The content playback application, which is executed by the information processing apparatus, reads the access enable/disable information before obtaining subsequently acquired data, and checks the availability of the subsequently acquired data to be used and its available use mode (write/read) to use the data in accordance with the control information.

Access request information contained in the access control information 831 set in the package-specific directory will be described next with reference to FIG. 22.

As described above with reference to FIG. 15, when subsequently acquired data on the local storage is to be used, it is necessary to select subsequently acquired data that is stored on the local storage and that is to be used and to virtually combine the data with a directory and a file on an information recording medium (a recording medium, such as a ROM disc) on which CPS unit management content is stored, so that the data is merged in a virtual directory.

Access-permission information for a directory that becomes a merge candidate or a file that becomes a merge candidate for the virtual file system is recorded in the access request information.

For example, as described above with reference to FIG. 16, when content corresponding to one package (package ID=1) is to be played back using content stored on the information recording medium (a recording medium, such as a ROM disc) and subsequently acquired data stored on the local storage, the binding unit 828*c* set in the inter-studio shared (shared) directory 826, the binding unit 828*b* set in the inter-package shared (shared) directory 825, and the binding package 828*a* set in the package-specific directory, which are shown in FIG. 16 or 20, are directory data that become merge candidates.

The access request information includes access authority information regarding the directories that become merge candidates and files set in the directories.

FIG. 22(A) shows an example of access request information in which access authorization information for directories that become merge candidates are recorded. FIG. 22(B) shows an example of access request information in which access authority information for each file that becomes a merge candidate is recorded.

For example, in the access request information shown in FIG. 22(A), access authority information is recorded for each directory in which subsequently acquired data that corresponds to studio ID=A and package ID=X that is a merge candidate. As described above with reference to FIG. 16, directories in which subsequently acquired data that correspond to studio ID=A and package ID=X and that are merge candidates are:

(1) Package-X-specific directory for studio ID=A and package ID=X,
(2) Inter-Package Shared (Shared) Directory for studio ID=A, and
(3) Inter-Studio Shared Directory.

In the access request information shown in FIG. 22(A), data write (write) and data read (read) authority information is recorded as access authority information for each of the three directories. The example shown in the figure has the following settings:

(1) For a package-X-specific directory for studio ID=A and package ID=X, both write authority and read authority are given.
(2) For an inter-package shared directory for studio ID A, no write authority is given and only read authority is given.
(3) For an inter-studio shared directory, no write authority is given and only read authority is given.

When subsequently acquired data is used, the information processing apparatus reads the studio ID and the package ID of content stored on an information recording medium (a recording medium, such as a ROM disc) and reads, based on the ID information, the access request information from the access control information set in the corresponding package-specific directory of the package ID in the file system of the local storage. The information processing apparatus further checks data (a binding unit) set in the package-specific directory and the access authority for data set in the package-specific directory and the inter-studio shared directory and determine whether or not the use of the corresponding subsequently acquired data is possible based on the access enable/disable information set in each directory described above with reference to FIG. 21, thereby using the subsequently acquired data in accordance with the control information. Reading of the control information and control processing are executed based on an application program for playing back and using content. A specific processing sequence will be described in a subsequent paragraph with reference to a flowchart.

The access request information shown in FIG. 22(B) is an example of access request information in which access authority information for each file that becomes a merge candidate is recorded. That is, data write (write) and data read (read) authority information is recorded as the access authority information for files set in the directories:

(1) Package-X-specific directory for Studio ID=A and Package ID=X,
(2) Inter-Package Shared Directory for Studio ID=A, and
(3) Inter-Studio Shared Directory.

The access request information is recorded with either the setting shown in FIG. 22(A) or the setting shown in 22(B).

The access request information shown in FIG. 22 has been described as an example in which the access authority information is recorded in only three directories:

(1) Package-specific Directory,
(2) Inter-Package Shared Directory, and
(3) Inter-Studio Shared Directory, or files set in these directories. However, for example, the arrangement may be such that access authority information for a directory specific to a studio that is different from the studio ID of content to be used or a file set in the directory is recorded. Alternatively, the arrangement is such that the access authority information for a directory specific to a package ID that is different from the package ID of content to be used or a file set in the directory is recorded.

Figure 23:
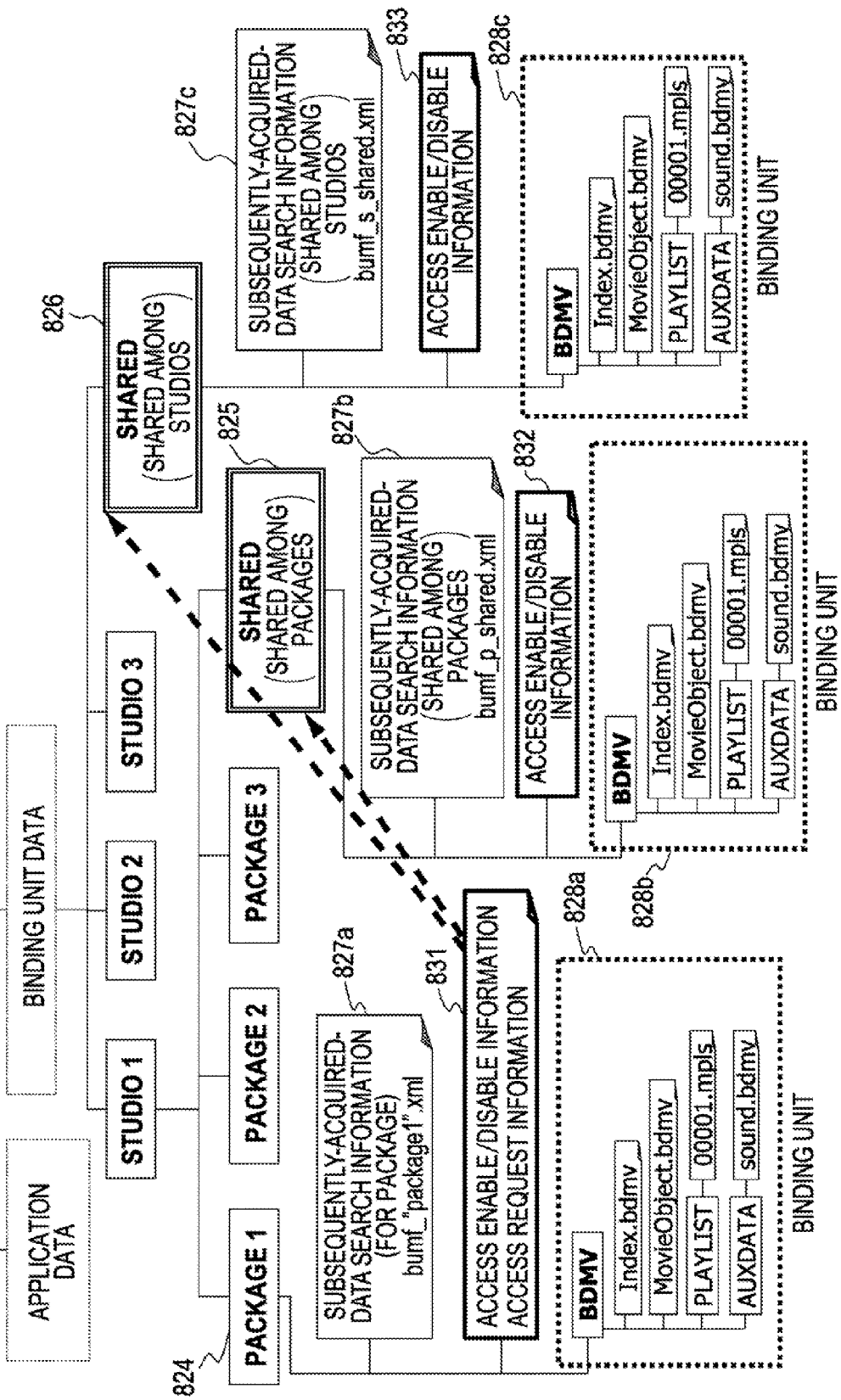
FIG. 23 is a diagram illustrating an example of use processing of the access control information.

An access-control processing sequence using the access request information and the access enable/disable information will be described with reference to FIG. 23. It is assumed that a disc on which a CPU management unit corresponding to studio ID=1 and package ID=1 is inserted into the information processing apparatus and the information processing apparatus uses subsequently acquired data on the local storage to play back the CPU management unit of studio ID=1 and package ID=1.

In this case, the information processing apparatus first obtains the access control information 831 for the package-specific directory in the binding unit data directory in which subsequently acquired data is stored on the local storage, the access control information 831 being set in the package-specific directory having studio ID=1 and package ID=1.

Next, the access request information is read from the access control information 831 for the obtained package-specific directory and access authority for a directory or file recorded in the access request information is checked.

Next, in the access request information, access enable/disable information set for a directory for which access permission (write authority or read authority) is set or for a directory containing a file for which access permission is set is obtained. In a basic example, access enable/disable information set in the following is referred to:

(1) Package-specific directory,
(2) Inter-Package Shared Directory, and
(3) Inter-Studio Shared Directory.

Access is possible to only a file for which an access authority is set in the access request information and access permission (write authority or read authority) is set in the access enable/disable information.

Specific modes are:

(a) Writing is permitted for subsequently-acquired-data file for which write authority is set in the access request information and write authority is set in the access enable/disable information, and (b) Reading is permitted for subsequently-acquired-data file for which read authority is set in the access request information and write authority is set in the access enable/disable information.

That is, only processing having a mode in which both settings of the access request information and the access enable/disable information indicate permissions is permitted.

Only when a disc having a studio ID and a package ID corresponding to a package-specific directory is inserted in the information processing apparatus, processing for updating the access control information set in the package-specific directory is permitted. Upon executing a program for executing processing for updating the access control information, the information processing apparatus reads a studio ID and a package ID for content stored on the disc loaded in the information processing apparatus, determines whether or not the read IDs match the studio ID and the package ID in a directory in which control information to be updated is set. Only when they match each other, the information processing apparatus can execute the processing for overwriting the access control information.

It is preferable to employ a configuration in which signature data for preventing data tampering are added to the above-described subsequently-acquired-data search information and the access control information. For example, with respect to the subsequently-acquired-data search information and access control information which are provided by a studio, electronic signatures using a secret key of the studio are added to the information. For use of the subsequently-acquired-data search information and the access control information, the information processing apparatus obtains a public key associated with the studio via a disc or network and executes signature verification processing using the obtained public key. The information processing apparatus then determines whether or not the subsequently acquired data can be used, only when it is checked that the data has not been tampered. When the data has been tampered, the processing is terminated. The processing described above is executed by the content playback application executed by the information processing apparatus.

As described above, the arrangement may be such that access authority information for a directory specific to a studio that is different from the studio ID of content to be used or a file set in the directory is recorded in the access request information. Alternatively, the arrangement is such that the access authority information for a directory specific to a package ID that is different from the package ID of content to be used or a file set in the directory is recorded in the access request information.

For example, when subsequently acquired data set in a directory for studio ID=1 is to be used during use of content having studio ID=3, it is required that the access control information set in the directory for studio ID=1 be obtained and access availability be checked after checking the data has not been tampered through the signature verification. The signature verification requires a public key associated with the studio. That is, the arrangement is such that a public key associated with each studio is stored on the local storage and, as needed, the studio public key corresponding to access control information is obtained from the local storage to perform signature verification.

In the configuration example described above with reference to FIG. 20 and the subsequent figures, the access control information has been described as being set in the following directories:

(1) Package-specific Directory,
(2) Inter-Package Shared Directory, and
(3) Inter-Studio Shared Directory.

However, the access control information does not have to be set in each shared directory. That is, the arrangement may be such that, the access control information, that is, the access enable/disable information, regarding shared directories, such as an inter-package shared directory and an inter-studio shared directory, is contained in the access control information under the directory of a specific package.

Figure 24:
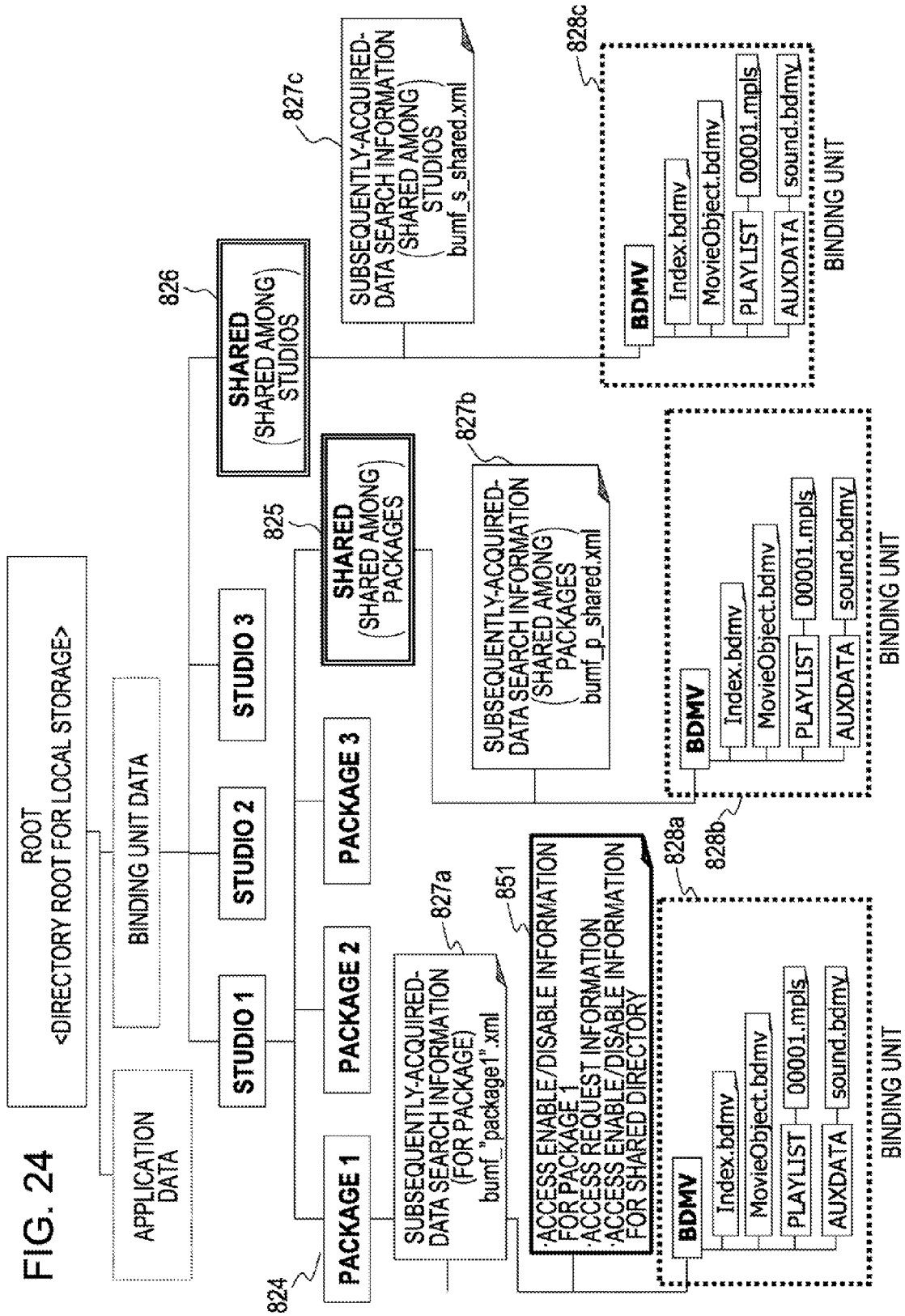
FIG. 24 is a diagram illustrating a setting example of the access control information.

That is, as shown in FIG. 24, the access control information is not set in the shared directories and the access enable/disable information for the shared directories are contained in access control information 851 under the package directory for studio ID=1 and package ID=1.

In such an arrangement, for example, during playback of content associated with package 3 that is different from package 1 or during playback of content associated with a different studio ID, the access control information 851 under the package directory for studio ID=1 and package ID=1 is referred to in order to check access to subsequently acquired data under the shared directories is permitted, thereby checking whether or not access to the data under the shared directories is permitted.

In the access-control-setting example and the use example described above with reference to FIG. 20, the subsequently-acquired-data storing directories have been given as having the following three different directories:

(1) Inter-Studio Shared (Shared) Directory,
(2) Inter-Package Shared (Shared) Directory, and
(3) Package-specific Directory.

However, similarly to the above-described subsequently-acquired-data search information, the arrangement can be such that any inter-studio shared (shared) directory and/or any inter-package shared (shared) directory are provided.

Figure 25:
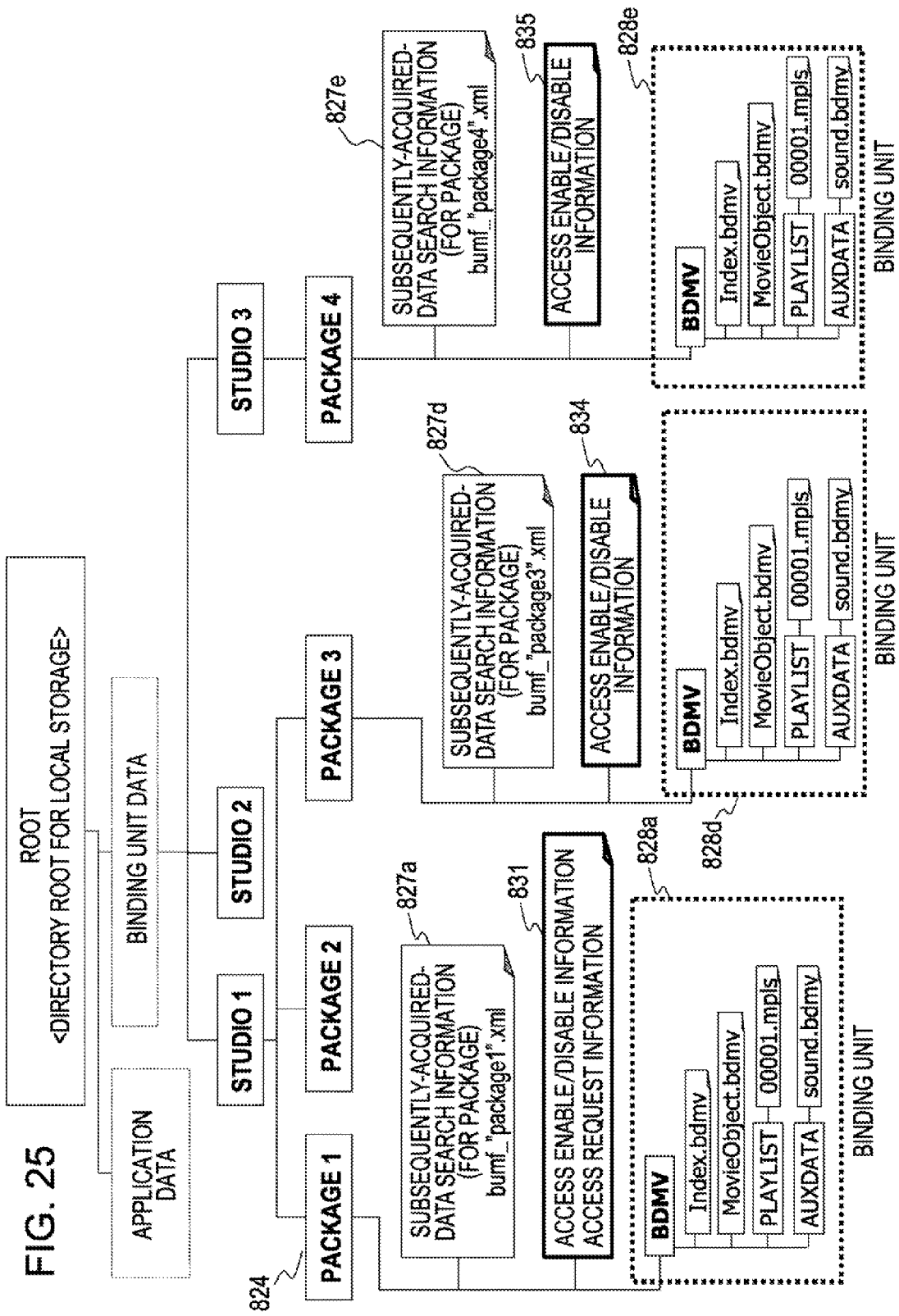
FIG. 25 is a diagram illustrating a setting example of the access control information in a configuration that has no shared directory in the directory structure of the local storage in the information processing apparatus.

For example, as shown in FIG. 25, access control information 831, 834, and 835 are set in the package-specific directories in the subsequently-acquired-data storing directory for the local storage, the subsequently-acquired-data storing directory having no shared directory and having only package-specific directories.

The access control information 831 is access control information file set in the package-specific directory for studio ID=1 and package ID=1, subsequently-acquired-data file associated with content stored on an information storage medium (a storage medium, such as a ROM disc) provided with studio ID=1 and package ID=1 being set in the package-specific directory. The access control information 831 includes access enable/disable information and access request information.

The access control information 834 is access control information file set in the package-specific directory for studio ID=1 and package ID=3, subsequently-acquired-data file associated with content stored on an information storage medium (a storage medium, such as a ROM disc) provided with studio ID=1 and package ID=3 being set in the package-specific directory. The access control information 834 includes access enable/disable information.

The access control information 835 is access control information file set in the package-specific directory for studio ID=3 and package ID=4, subsequently-acquired-data file associated with content stored on an information storage medium (a storage medium, such as a ROM disc) provided with studio ID=3 and package ID=4 being set in the package-specific directory. The access control information 835 includes access enable/disable information.

The access enable/disable information contained in all of the access control information 831, 834, and 935 have the same structure as those described above with reference to FIG. 21. That is, validity-period information and write (write) and read (read) enable/disable information for the subsequently-acquired-data files belonging to the directories in which the access control information 831, 834, and 835 are set are recorded in the access enable/disable information.

In the structure shown in FIG. 25, only the access control information 831 set in the package-specific directory for studio ID=1 and package ID=1 has access request information. As described above with reference to FIG. 22, the access request information contains access authority information for a directory or file to be accessed.

The access request information described above with reference to FIG. 22 has a structure in which the access permission information for a directory that becomes a merge candidate or a file that becomes a merge candidate for the virtual file system is recorded. However, in the directory structure that is shown in FIG. 25 and that does not have any shared directory, the presence/absence of access authority for each package-unquiet directory or a subsequently acquired data file set in each package-specific directory (i.e., the presence/absence of write authority and read authority) is recorded in the access request information independently from the merge.

An access-control processing sequence using the access request information and the access enable/disable information in a structure having no shared directory will be described with reference to FIG. 26. It is assumed that a disc on which a CPS management unit corresponding to studio ID=1 and package ID=1 is inserted into the information processing apparatus and the information processing apparatus uses subsequently acquired data on the local storage to play back the CPS management unit of studio ID=1 and package ID=1.

In this case, the information processing apparatus first obtains the access control information 831 for the package-specific directory in the binding unit data directory in which subsequently acquired data is stored on the local storage, the access control information 831 being set in the package-specific directory having studio ID=1 and package ID=1.

Next, the access request information is read from the access control information 831 for the obtained package-specific directory and access authority for a directory or file recorded in the access request information is checked. Directories or files recorded in the access request information include a directory or file for studio=1 and package ID=1, a directory or file for studio ID=1 and package ID=3, and a directory or file for studio ID=3 and package ID=4. That is, access authority information for other package-specific directories and files, instead of the access control information for the shared directories described above with reference to FIG. 23, is recorded in the access request information.

Next, in the access request information, access enable/disable information set for a directory for which access permission (write authority or read authority) is set or for a directory containing a file for which access permission is set is obtained. In this example, access enable/disable information set in the following directories is referred to:

(1) Package-specific Directory for Studio ID=1 and Package ID=1, (2) Package-specific Directory for Studio ID=1 and Package ID=3, and (3) Package-specific Directory for Studio ID=3 and Package ID=4.

Access is possible to only a file for which an access authority is set in the access request information and access permission (write authority or read authority) is set in the access enable/disable information.

Specific modes are:

(a) Writing is permitted for subsequently-acquired-data file for which write authority is set in the access request information and write authority is set in the access enable/disable information, and (b) Reading is permitted for subsequently-acquired-data file for which read authority is set in the access request information and write authority is set in the access enable/disable information.

That is, only processing for a mode in which both settings of the access request information and the access enable/disable information indicate permissions is permitted.

In this manner, access authority information for a package-specific directory corresponding to a studio that is different from the studio ID of content to be used or for a file set in the directory can be recorded in the access request information.

Figure 26:
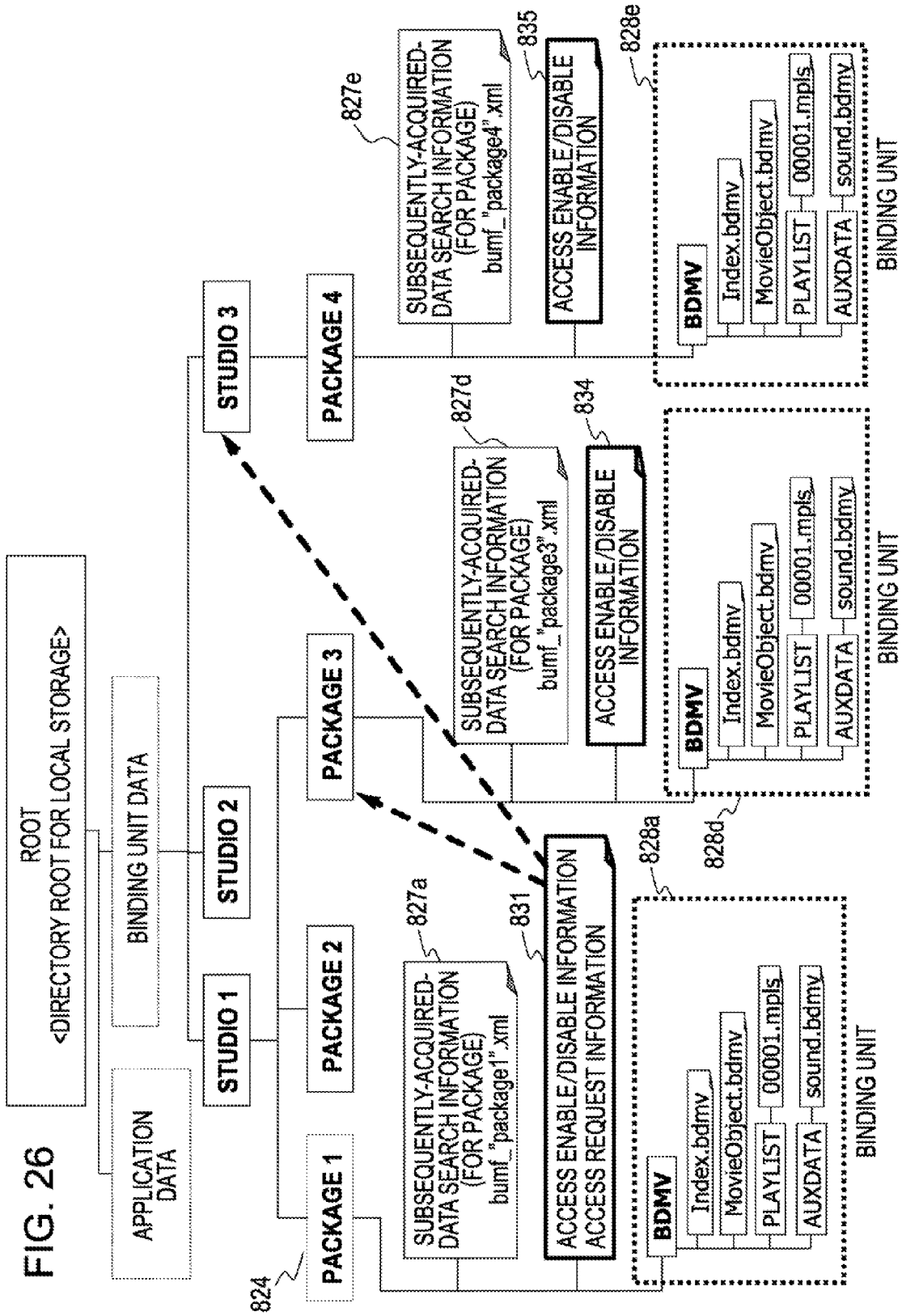
FIG. 26 is a diagram illustrating an example for use processing of the access control information in a configuration that has not shared directory.

In the example shown in FIG. 26, determination as to whether or not a file in another package-specific directory, i.e., the package-specific directory for studio ID=1 and package ID=3 or the package-specific directory for studio ID=3 and package ID=4, can be accessed during playback processing using the disc with studio ID=1 and package ID=1 requires referring to the access enable/disable information set in each directory to be accessed. A structure for determining whether or not access is possible without referring to the access enable/disable information in such another directory will be described with reference to FIG. 27.

Figure 27:
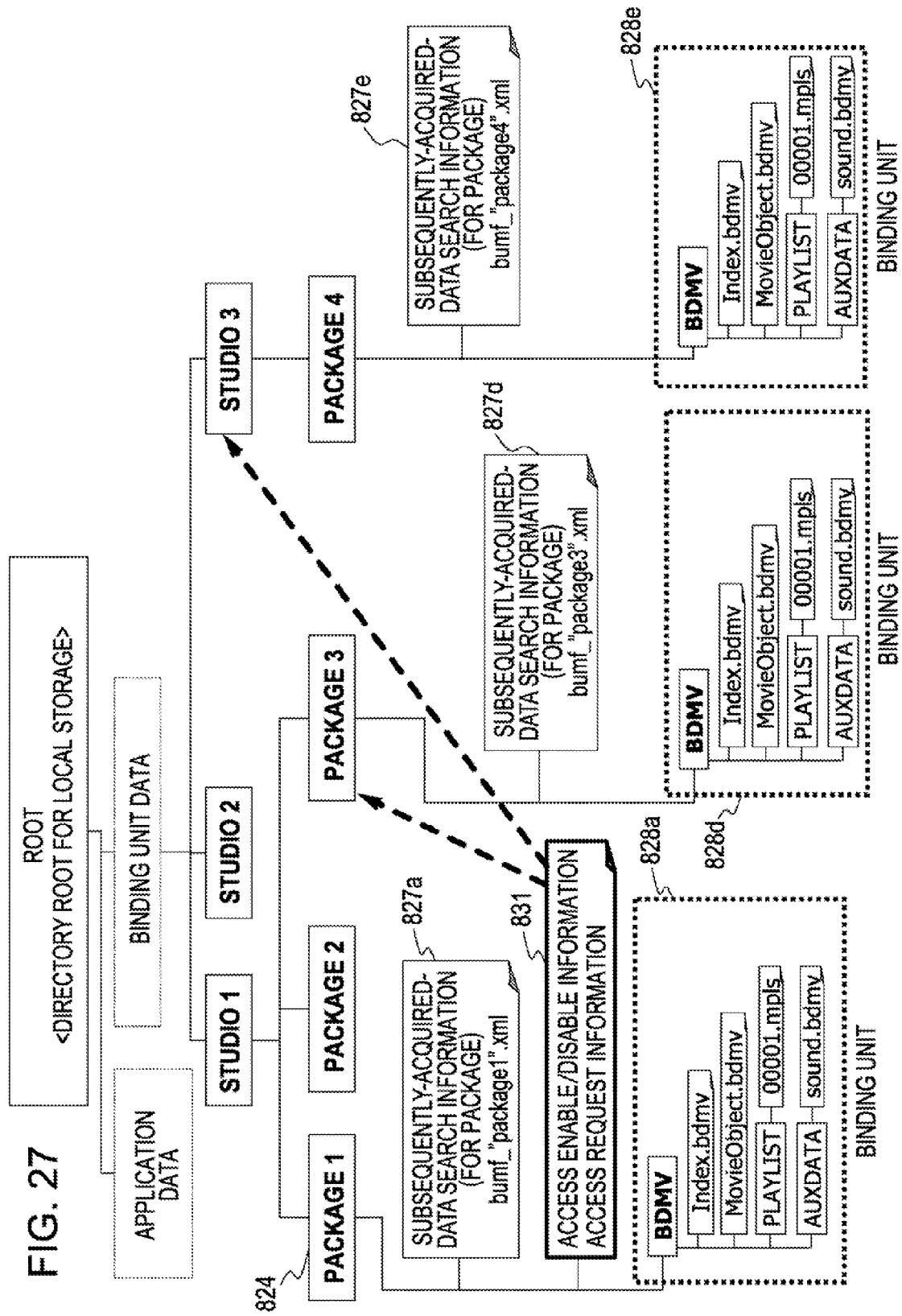
FIG. 27 is a diagram illustrating a structure and processing example in which only access control information set in one directory is used to determine whether or not subsequently acquired data for another directory can be used.

The directory shown in FIG. 27 also has a structure in which any shared directory is provided, similarly to the directory shown in FIG. 26. In addition, the access control information 831 including the access request information and the access enable/disable information is set in only a directory for studio ID=1 and package ID=1, and the access enable/disable information is not set in other package-specific directories.

In this structure, when a disc on which a CPS management unit corresponding to studio ID=1 and package ID=1 is stored is inserted into the information processing apparatus, not only a subsequently-acquired-data file set in the package-specific directory for studio ID=1 and package ID=1 but also a subsequently-acquired-data file set in the other package-specific directory can be used.

The use of a subsequently-acquired-data file of another package or another studio, as described above, is made possible based on the premise that a trusting relationship has been established between a using source and a used target. For example, during use of content of studio ID=1 and package ID=1, when subsequently acquired data set in a directory that is shown in FIG. 27 and that is associated with studio ID=3 and package ID=4 is to be used, the studio having studio ID=1 needs to receive a subsequently-acquired-data use permission from the studio having studio ID=3.

Figure 28:
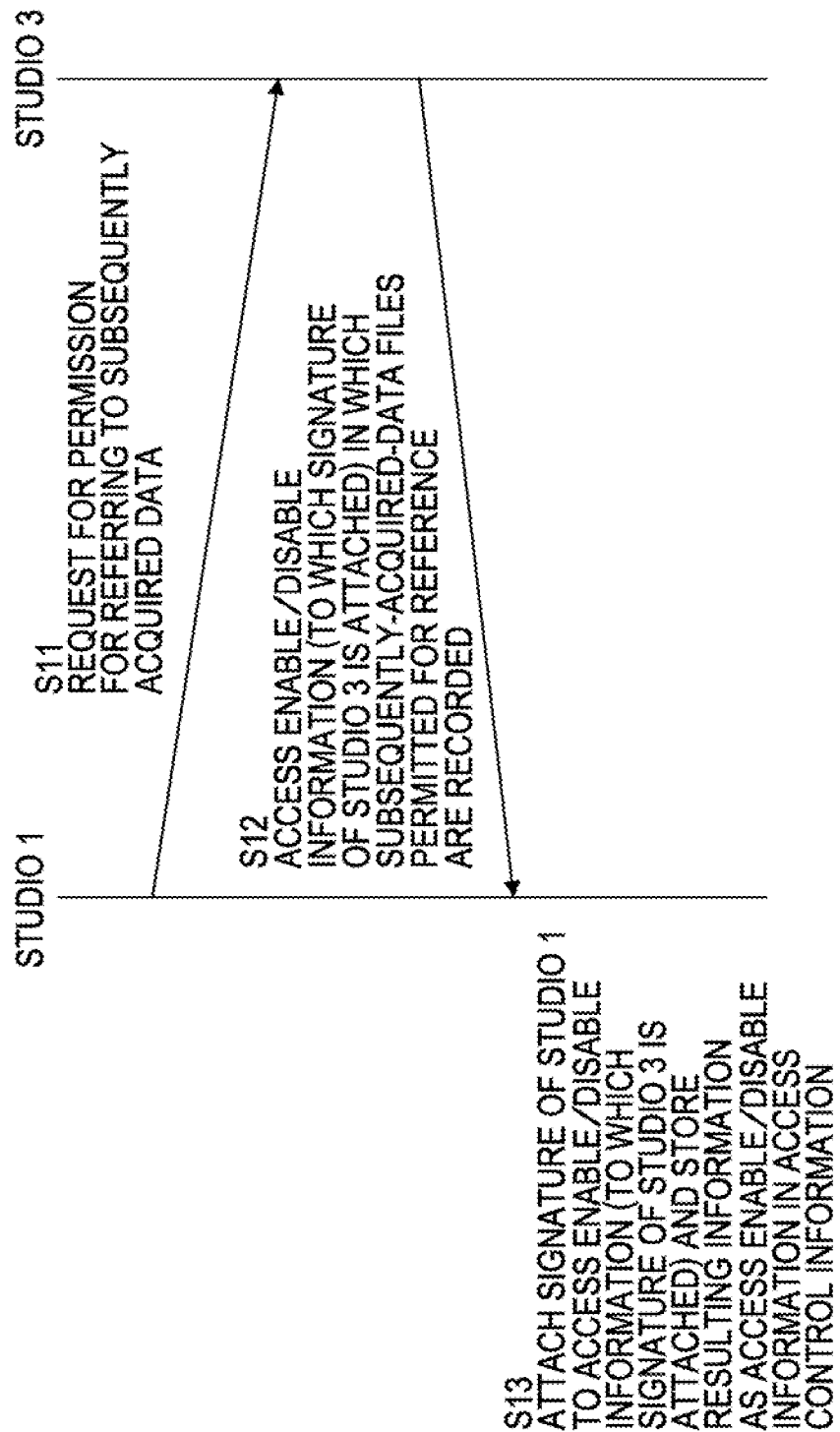
FIG. 28 is a diagram illustrating a subsequently-acquired-data use-permission sequence for setting, in the access control information set in one directory, access enable/disable information for determining whether or not subsequently acquired data for another directory can be used.

This subsequently-acquired-data use-permission processing will be described with reference to FIG. 28. The processing sequence shown in FIG. 28 is processing used for a case in which studio 1 receives, from studio 3, use permission for subsequently acquired data associated with studio 3 in order to set access enable/disable information for the subsequently acquired data associated with studio 3 as access enable/disable information that studio 1 sets for a package-specific directory for studio 1.

First, in step S11, studio 1 specifies a subsequently-acquired-data file that it desires to use and issues a request for use permission for the subsequently-acquired-data file to studio 3. Studio 3 generates access enable/disable information in which subsequently-acquired-data files permitted for use are listed, attaches a signature using its own secret key, and transmits the resulting information to studio 1 in step S12. The structure of the access enable/disable information is analogous to that described above with reference to FIG. 21. That is, validity-period information and write (write) and read (read) enable/disable information for each subsequently-acquired-data file are recorded.

Upon receiving the access enable/disable information having the signature from studio 3, in step S13, studio 1 further attaches a signature using its own secret key and then stores the resulting information as access enable/disable information in access control information set for its own directory.

Figure 29:
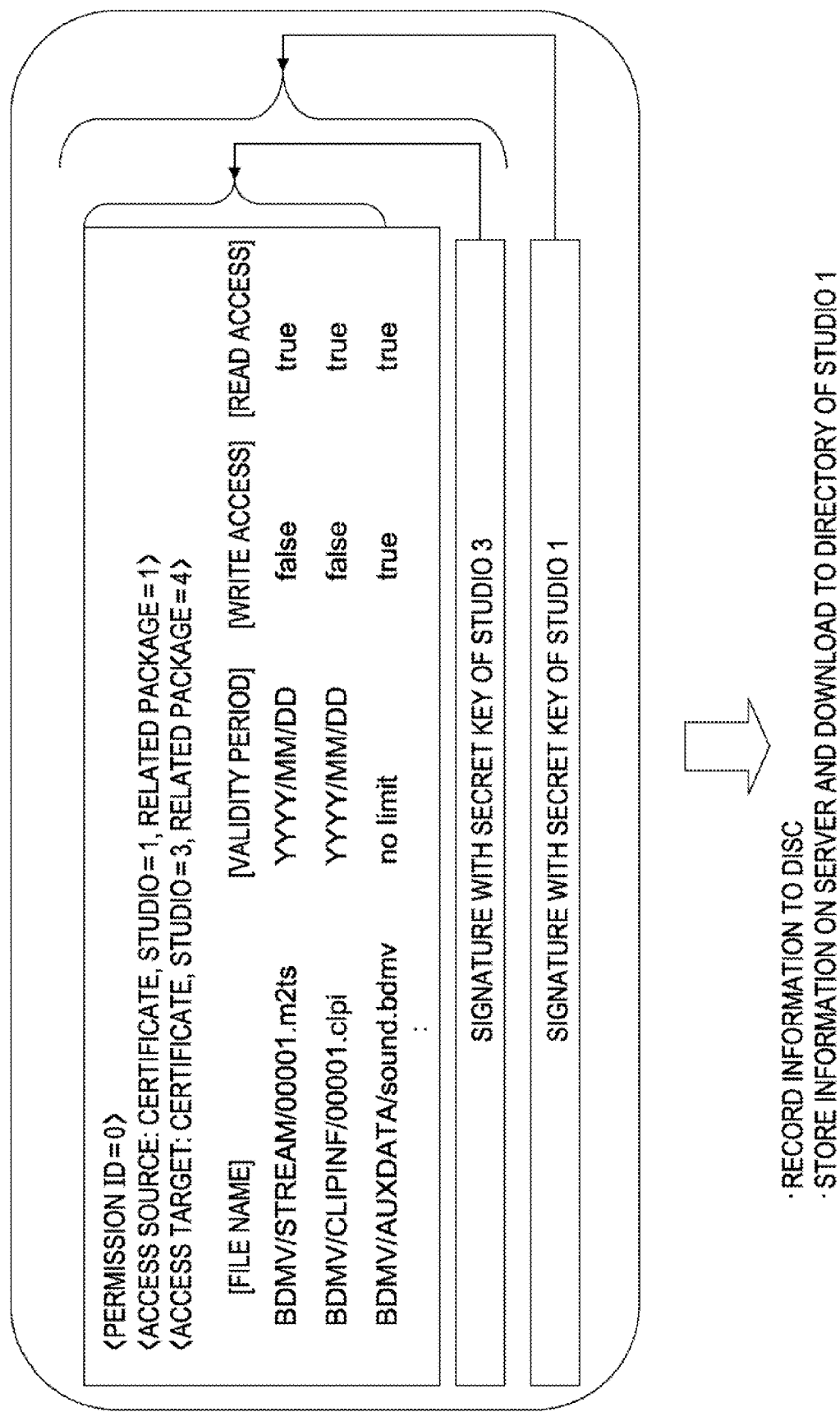
FIG. 29 is a diagram illustrating a structure example of subsequently-acquired-data access enable/disable information contained in access control information set in one directory, the access enable/disable information being associated with another directory.

FIG. 29 shows an example of the data structure of the access enable/disable information generated in this processing. The access enable/disable information shown in FIG. 29 is contained in the access control information 831 set in, of a directory shown in FIG. 27, the directory for studio ID=1 and package ID=1. Files included in the access enable/disable information are files for studio ID=3 and package ID=4. Validity period information and write (write) and read (read) enable/disable information regarding the files are recorded in the access enable/disable information. The access enable/disable information further has a structure to which a signature using a secret key of studio 1 and a signature using a secret key of studio 3 are attached.

When subsequently acquired data is to be used during playback of content associated with studio ID=1 and package ID=1, referring to the access enable/disable information shown in FIG. 29 as access enable/disable information contained in the access control information set for the directory for studio ID=1 and package ID=1 makes it possible to determine whether or not access to a file for studio ID=3 and package ID=4 is possible. When this processing is executed, the signature of studio 1 is verified using the secret key of studio 1 and the signature of studio 3 is verified using the public key of studio 3.

Next, a description will be given of an arrangement for preventing tampering of subsequently acquired data recorded on the local storage. In this arrangement, when new subsequently acquired data are recorded on the local storage, hash values of the subsequently acquired data are recorded in the above-described subsequently-acquired-data search information and hash-value verification is executed during the use of the subsequently acquired data to perform tamper verification of the subsequently acquired data.

An example of an arrangement in which has values, which serve as tamper verification values for subsequently acquired data, are stored in the subsequently-acquired-data search information 827 will be described with reference to FIG. 30. In the subsequently-acquired-data search information 827, data other than file-tampering verification data 871 are analogous to the data described above with reference to FIGS. 17 and 18, and thus a description for the data is omitted below.

Figure 30:
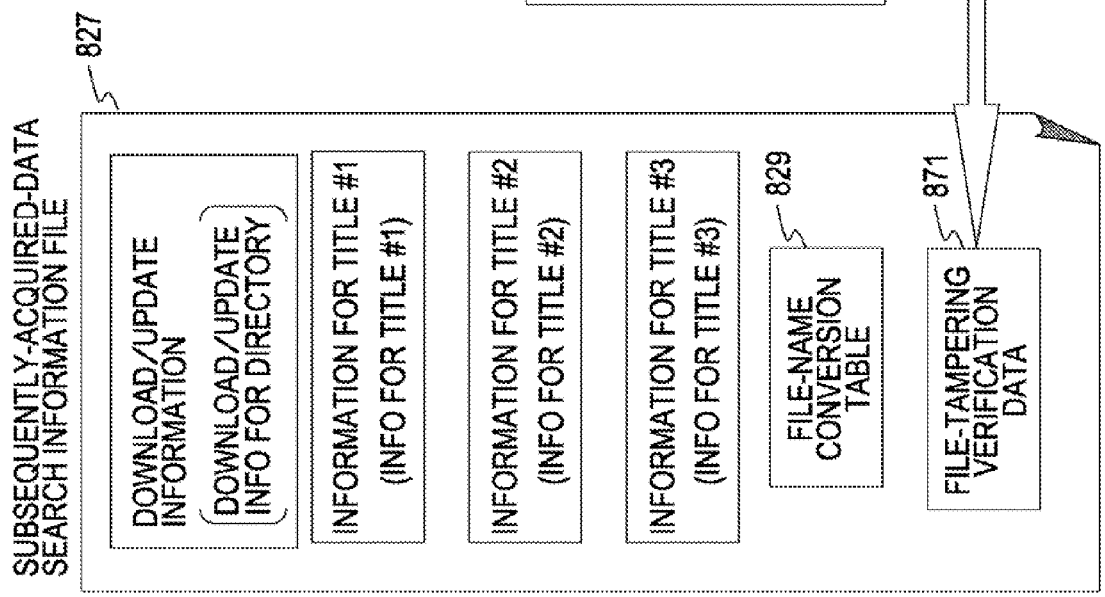
FIG. 30 illustrates an example in which file-tampering verification data is contained in the subsequently-acquired-data search information.

For example, as shown in FIG. 30, the file-tampering verification data 871 includes the files names of subsequently acquired data stored on the local storage and corresponding data of hash values generated based on the subsequently acquired data. Further, signature data are set for the hash values. The signature is generated using a secret key of a corresponding studio in the same manner as the access control information described above. The information processing apparatus uses a public key of a corresponding studio to execute signature verification for subsequently acquired data to be used, and uses the subsequently acquired data based on the condition that it is confirmed the subsequently acquired data to be used has not been tampered.

In the example shown in FIG. 30, hash values corresponding to subsequently-acquired-data files are set. The arrangement, however, may also be such that a file group containing multiple subsequently-acquired-data files is set and a hash value for the file group is calculated and stored. The storage location of the hash values for the subsequently-acquired-data files or the file group are not limited to the subsequently-acquired-data search information. That is, the hash values may be stored in the access control information or may be stored in a pre-set independent file.

Figure 31:
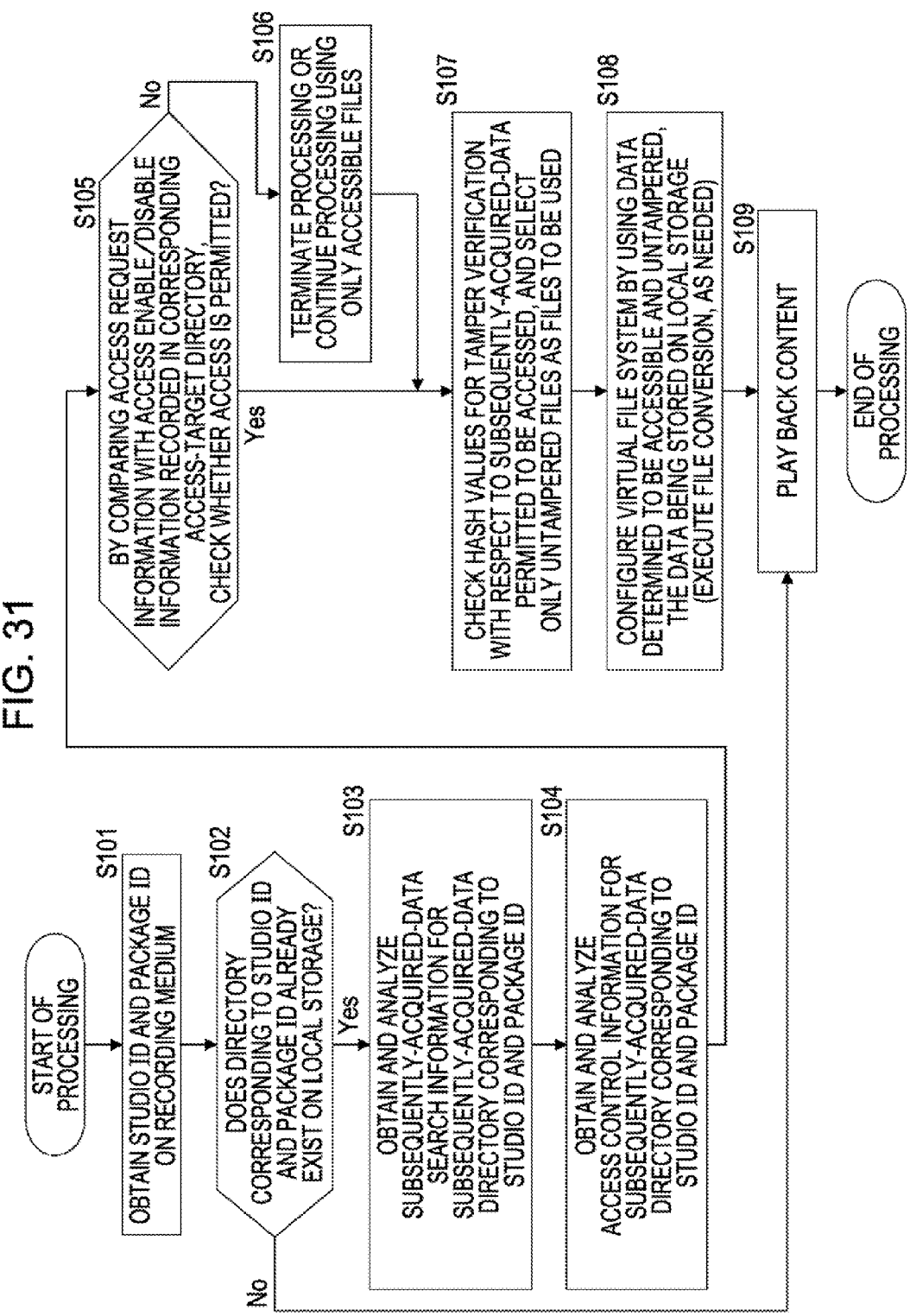
FIG. 31 is a flowchart illustrating a playback processing sequence using subsequently acquired data.

A processing sequence for a case in which the information processing apparatus performs playback processing using subsequently acquired data will be described next with reference to FIG. 31.

In step S101, upon loading of a recording medium such as a ROM disc on which CPS management units are recorded, the information processing apparatus obtains a studio ID and a package ID for a CPS management unit to be played back. The ID information can be obtained from the CPS-unit management information stored on the recording medium, information contained in a CPS unit being played back, or the like. Further, in step S102, a determination is made as to whether or not a directory in which a subsequently-acquired-data file corresponding to the studio ID and package ID obtained in step S101 exists in a directory on the local storage on which subsequently acquired data is stored, i.e., a data recordable area, such as the hard disk, or a removable medium.

When a subsequently-acquired-data directory corresponding to the studio ID and the package ID does not exist, in step S109, playback processing using only data stored on the recording medium is executed without the use of subsequently acquired data. In this case, a CPS unit key is obtained and decryption processing is executed based on the CPS unit key, as needed.

When a subsequently-acquired-data directory corresponding to the studio ID and the package ID exists, the process proceeds to step S103, in which subsequently-acquired-data search information for the directory is obtained and analyzed. In the subsequently-acquired-data search information, information regarding files that exist under the directory is recorded as described above with reference to FIG. 17.

Further, in step S103, access control information for the studio ID and the package ID is obtained and analyzed. The access control information obtained is access control information in a package-specific directory and is access request information in which access authority information for a directory or file that is recorded on the local storage and that becomes a merge candidate is recorded. In addition, in the access request information, access enable/disable information in which access authority is set is obtained.

Specifically, as the access enable/disable information, the access enable/disable information for the followings is obtained:

(1) Package-specific Directory,
(2) Inter-Package Shared Directory, and
(3) Inter-Studio Shared Directory.

Next, in step S105, the access request information and the access enable/disable information for the access-target directory are referred to check whether or not both the information are set to indicate access permissions.

As described above, specific cases are:

(a) Writing is permitted for subsequently-acquired-data file for which write authority is set in the access request information and write authority is set in the access enable/disable information, and (b) Reading is permitted for subsequently-acquired-data file for which read authority is set in the access request information and write authority is set in the access enable/disable information.

In either of the settings, that is, only processing for a mode in which both settings of the access request information and the access enable/disable information indicate permissions is permitted.

When it is determined in step S105 that neither the access request information nor the access enable/disable information is set to indicate access permission, the process proceeds to step S106. When any accessible subsequently-acquired-data file does not exist, a file permitted to be accessed is selected and the process proceeds to step S107. When all files are permitted to be accessed, the process proceeds from step S105 to step S107.

In step S107, hash values for the files permitted to be accessed are determined and the determined hash values are compared with corresponding hash values (in FIG. 30) already stored in the subsequently-acquired-data search information to verify whether or not the files are tampered.

In step S108, only subsequently-acquired-data files that are determined to be accessible and untampered are selected, and the selected files are virtually combined with directories and files on the recording medium.

For configuring this virtual file system, a file-name conversion table is recorded in the subsequently-acquired-data search-information file, and when the file name of a subsequently-acquired-data file to be used is registered, the file name is converted based on the file-name conversion table.

Through the generation processing of the virtual file system, a data file on the recording medium and a necessary associated file on the local storage can be processed as a file in one virtual directory. As a result of this processing, it is possible to perform high-speed access to files stored on different recording media.

Merge processing during the generation of the virtual file system is executed in order of (1)→(2)→(3)→(4) below:

(1) a data file set on the recording medium,
(2) a data file set in an inter-studio shared (shared directory),
(3) a data file set in an inter-package shared directory, and
(4) a data file set in a package-specific directory.

When the same file name exists, processing for overwriting it with a subsequent file is executed.

Next, the process proceeds to step S109, in which content playback processing, i.e., content playback using the subsequently acquired data, is executed. When a subsequently-acquired-data file has been set as encrypted data, which case is not illustrated in the flow, a key used for decrypting the subsequently-acquired-data file is generated and the subsequently-acquired-data file is decrypted for playback. The key used for the decryption is generated based on key generation processing (e.g., an AES cryptographic-key generation algorithm) in which, for example, a device ID, studio ID, package ID, volume ID, or user ID is used as key generation information.

Figure 32:
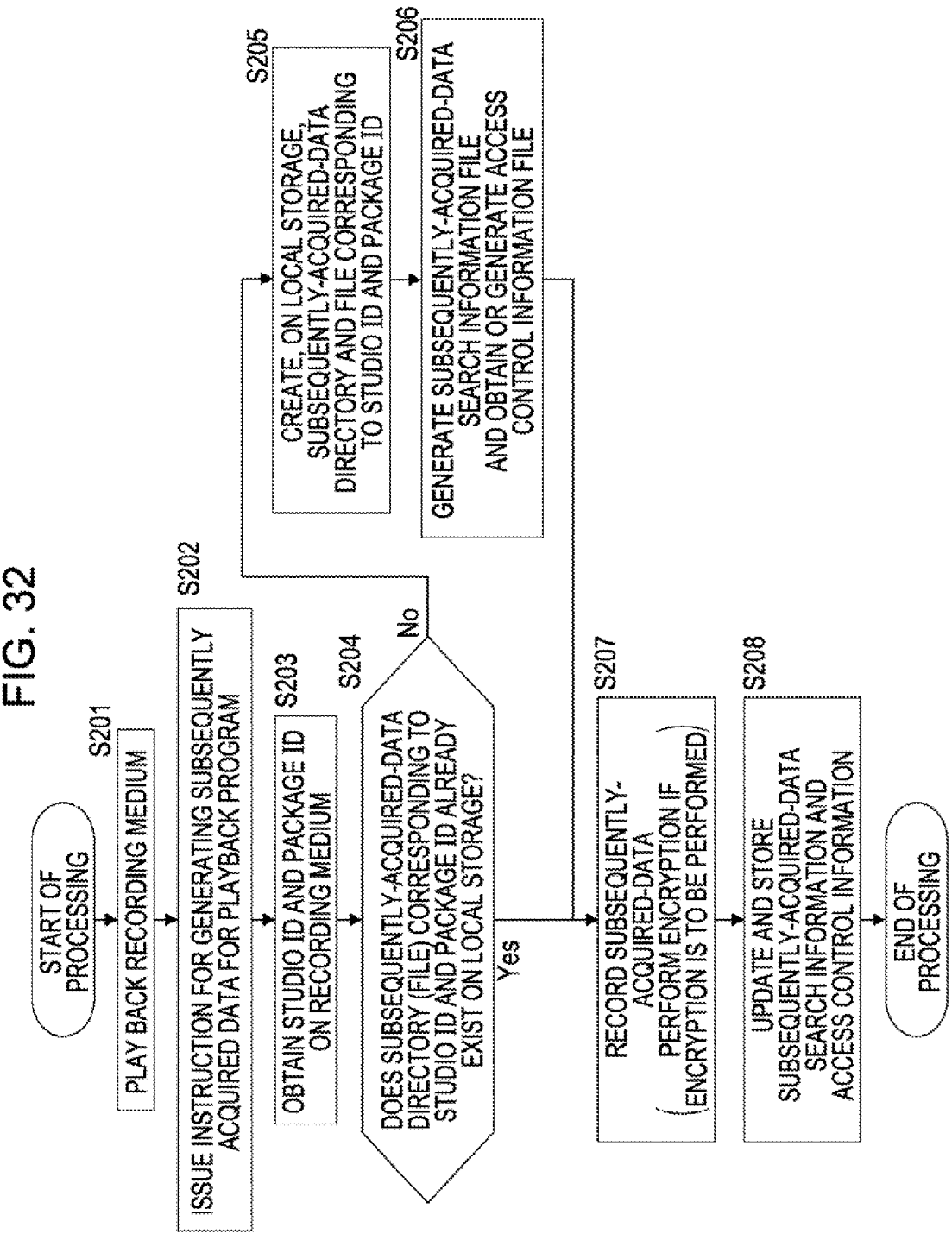
FIG. 32 is a flowchart illustrating a processing sequence for storing subsequently acquired data.

Next, a processing sequence for the information processing apparatus to store subsequently acquired data on an information recording medium, such as the hard disk, will be described with reference to the flowchart shown in FIG. 32. A recording medium such as a ROM disc on which a CPS management unit is recorded is loaded into the information processing apparatus for generating and obtaining subsequently acquired data, the information processing apparatus generates or obtains subsequently acquired data during playback of a program and data contained in the CPS management unit.

In step S201, upon the load of a storage medium such as a ROM on which a CPS management unit is recorded, the information processing apparatus plays back a program and data contained in the CPS management unit. In step S202, subsequently acquired data is generated or obtained. Data obtained in this processing is, for example, data generated by the information processing apparatus or data obtained from an external server. More specific examples include score data and character data of a game program, subtitle data of specific content, and commentary data.

In step S203, the information processing apparatus obtains a CPS unit to be played back, i.e., a studio ID and a package ID corresponding to a CPS unit already stored on the recording medium, such as a ROM. The ID information can be obtained from the CPS-unit management information stored on the recording medium, information contained in a CPS unit being played back, or the like.

Next, in step S204, the information processing apparatus determines whether or not a subsequently-acquired-data directory or file corresponding to the studio ID and package ID extracted in step S203 exists on the local storage, which serves as an area for recording subsequently acquired data, i.e., on the local storage, such as the hard disk or a removable storage medium in which the general-file-system-based management directory described above with reference to FIG. 16 and so on is set.

When a corresponding subsequently-acquired-data directory or file is not set, the process proceeds to step S205, in which a subsequently-acquired-data directory corresponding to the studio ID and package ID extracted in step S203 is set as a directory in the local storage. Further, the process proceeds to step S206, in which the subsequently-acquired-data search-information file described above with reference to FIGS. 17, 18, and 30 is generated and the access control information file described above with reference to FIGS. 20 to 22 is further obtained or generated.

After the subsequently-acquired-data management file and the access control information are generated or have been generated, the process proceeds to step S207, in which the subsequently acquired data is stored in a predetermined directory in the binding data directory. During the storage of the subsequently acquired data, processing, such as encryption processing for the subsequently-acquired-data file, generation of a hash value and a tamper-verification value, such as a signature, and encryption, is executed as needed. Next, in step S208, based on the data information newly stored in the subsequently-acquired-data file, processing for updating the subsequently-acquired-data search information and the access control information is executed and the processing is finished.

[7. Configuration Example of Information Processing Apparatus]

Figure 33:
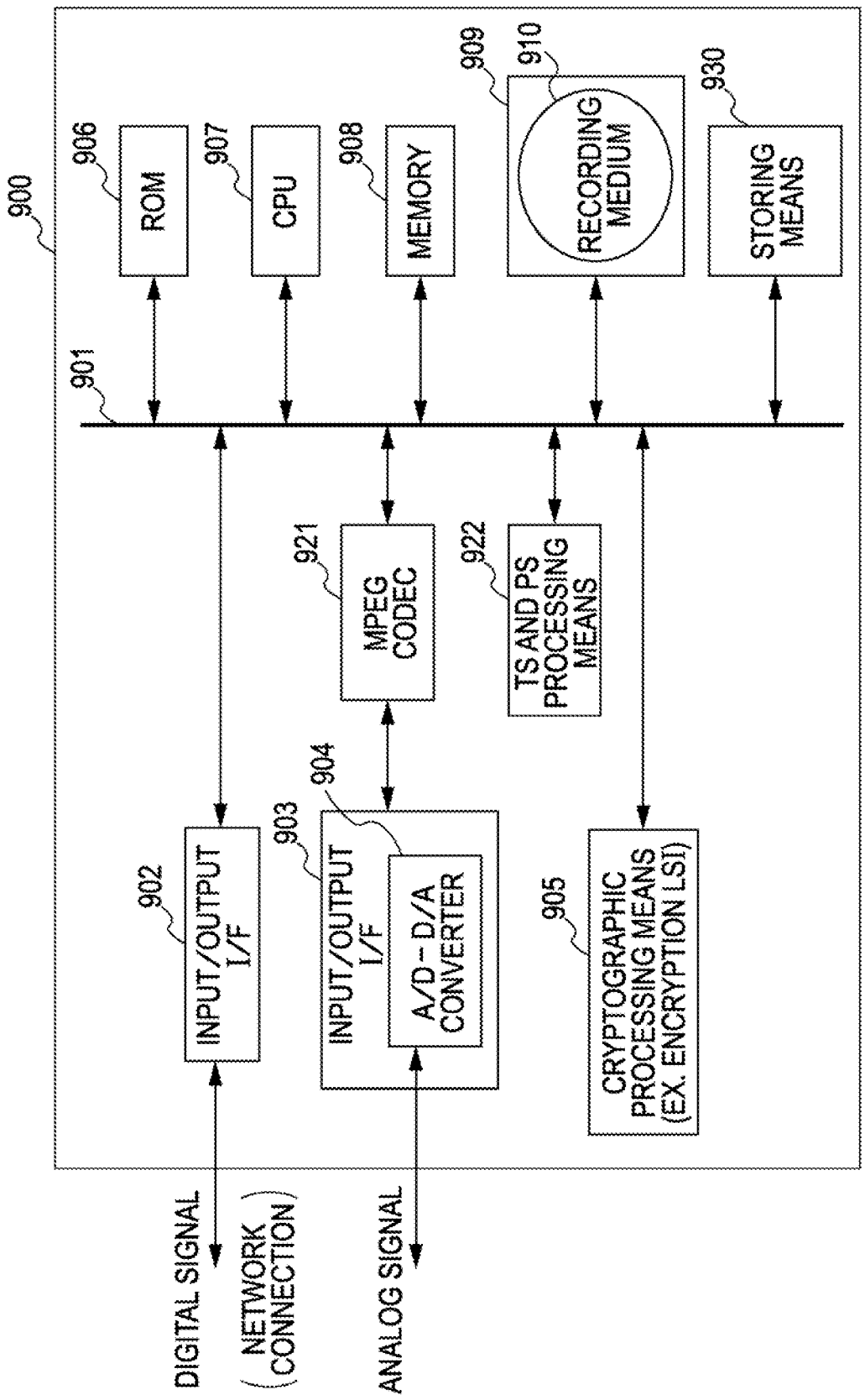
FIG. 33 is a diagram illustrating an example of the configuration of an information processing apparatus, into which the information recording medium is loaded, for executing playback processing or recording processing.

Next, a configuration example of an information processing apparatus for performing playback/recording processing on an information recording medium on which content managed by the above-described CPS units is stored with reference to FIG. 33.

An information processing apparatus 900 shown in FIG. 33 includes a drive 909 that drives an information recording medium 910 and inputs/outputs a data recording/playback signal, a CPU 907 that serves as controlling means to execute data processing in accordance with various programs, and a ROM 906 and a memory 908 that serve as storage areas for programs, parameters, and so on. The information processing apparatus 900 further includes an input/output I/F 902 that inputs/outputs a digital signal and an input/output I/F 903 that inputs/outputs an analog signal and that has an A/D-D/A converter 904. The processing apparatus 900 further includes an MPEG codec 921 that executes encoding/decoding processing of MPEG data, TS (transport stream) and PS (program stream) processing means 922 that executes TS and PS processing, cryptographic processing means 905 that executes various types of cryptographic processing, and storing means 930, such as a hard disk. The individual blocks are connected to a bus 901.

When the information processing apparatus 900 plays back AV-stream data including AV stream data containing MPEG-TS data from the information recording medium 910, data read by the drive 909 from the information recording medium 910 is decrypted by the cryptographic processing means 905, as needed, and is demultiplexed by the TS and PS processing means 922 into individual data, such as video, audio, and subtitle data.

Digital data decrypted by the MPEG codec 921 is converted into an analog signal by the D/A converter 904 in the input/out I/F 903 and the resulting data is output. When digital output is performed, MPEG-TS data decrypted by the cryptographic processing means 905 is output as digital data via the input/output I/F 902. In this case, the data is output to a digital interface, such as an IEEE 1394 cable, Ethernet cable, or a wireless LAN. For a network connection function, the input/output I/F 902 has a function for network connection.

When the information processing apparatus 900 outputs data to output-receiving equipment after converting the data into a format receivable thereby, the MPEG codec 921 performs rate-conversion processing and codec-conversion processing on the video, audio, and subtitles, and so on temporarily demultiplexed by the TS processing means 922. The resulting data are multiplexed by the TS and PS processing means 922 back into MPEG-TS, MPEG-PS, or the like, and the multiplexed data is output via the digital input/output I/F 902. Alternatively, the arrangement can be such that, under the control of the CPU 907, data is converted into a codec file or multiplexed file other than an MPEG file and is output via the digital input/output I/F 902.

The CPS-unit management table (see FIG. 2), which serves as CPS-unit management information, and management data, such as playback/copy control information for CPS units, are read from the information recording medium 910 and then are stored in the memory 908. Key information for each CPS unit required for playback can be obtained from the data stored in the memory.

Data of subsequently acquired data, such as data generated or obtained by the information processing apparatus 900, are recorded in the storing means 930, such as a hard disk. The subsequently acquired data are searched for through the use of the subsequently-acquired-data search information recorded in the storing means 930. In addition, only subsequently acquired data that is permitted to be accessed is obtained in accordance with the access control information recorded in the storing means 930, a virtual file system is configured in the above-described merge processing, and playback processing is executed in conjunction with content read from the recording medium.

Next, a description will be given of an operation in which the information processing apparatus 900 records data of subsequently acquired data, such as generated data or obtained data. Two cases in which a digital signal is input as data to be recorded and an analog signal is input as data to be recorded are possible. In the case of a digital signal, the digital signal is input via the digital-signal input/output I/F 902 and is subjected to appropriate encryption processing by the cryptographic processing means 905, as needed, and the resulting data is stored on the recording medium 910 or the storing means 930.

Data of subsequently acquired data, such as data generated or obtained by the information processing apparatus 900, are recorded on the storing means 930, such as a hard disk. The subsequently-acquired-data search information and the access control information are further recorded on the storing means 930.

When an input digital signal is stored after the data format is converted, the MPEG codec 921, the CPU 907, and the TS and PS processing means 922 convert the data format into a data format for storage. Thereafter, the cryptographic processing means 905 performs appropriate cryptographic processing on the data and stores the resulting data on the recording medium 910. In the case of an analog signal, the analog signal that is input to the input/output I/F 903 is converted into a digital signal by the A/D converter 904 and the digital signal is converted by the MPEG codec 921 into a signal having a codec format used during recording.

Thereafter, the TS and PS processing means converts the digital signal into AV multiplexed data, which has a recording data format. As needed the data is then subjected to appropriate encryption processing by the cryptographic processing means 905 and is stored on the recording medium 910. The subsequently-acquired-data search information and the access control information are also recorded on the storing means 930.

When the information processing apparatus 900 obtains necessary information through a network outside the apparatus, the obtained data are temporarily stored in the memory 908 in the information processing apparatus 900. The data stored include, for example, key information required for content playback, subtitles; data, such as subtitles, audio, and still images, that are to be played back in conjunction with the content playback; content management information; and playback-apparatus operating rules (usage rules) corresponding to the content management information.

Subsequently generated or obtained data are temporarily stored in the memory 908, and are stored on the storing means 930, such as a hard disk, in accordance with a user selection or a predetermined control sequence.

A program for executing playback processing and recording processing is stored in the ROM 906. During execution processing of the program, the memory 908 is used to store parameters and data and to serve as a work area. Although the description for FIG. 33 has been given using the apparatus configuration that can perform data recording and playback, an apparatus having only a playback function or an apparatus having only a recording function can also be configured and the present invention is also applicable to the apparatuses.

The present invention has been described above in detail with reference to the particular embodiment. However, it is obvious that those skilled in the art can make a modification and substitution to the embodiment in a scope without departing from the substance of the present invention. That is, the present invention has been disclosed by way of example and thus should not be construed as limiting. The scope of the claims should be construed in order to understand the substance of the present invention.

The series of processing described herein can be executed by hardware, software, or a combined configuration thereof. When the processing is executed with software, it can be executed by loading a program, in which the processing sequence is recorded, into an in-computer memory built into dedicated hardware or installing the program onto a general computer that is capable of performing various types of processing.

For example, the program can be pre-stored on a recording medium, such as a hard disk or a ROM (read only memory). Alternatively, the program can be temporarily or permanently stored (recorded) on a removable recording medium, such as a flexible disc, a CD-ROM (compact disc read only memory), an MO (magneto optical) disc, a DVD (digital versatile disc), a magnetic disk, or a semiconductor memory. Such removable recording media can be supplied as the so-called "package software".

In addition to installing the program from the above-described removable recording media onto a computer, the program can be wirelessly transferred from a download site to the computer or can be transferred to the computer by a wired connection through a network such as a LAN (local area network) and/or the Internet, so that the program transferred in such a manner is received by the computer and is stored on a recording medium such as a built-in hard disk.

The various types of processing described herein not only include processing that is time-sequentially executed according to the described sequence but also include processing that is concurrently or individually executed according to the throughput of an apparatus that executes the processing or according to need. The term "system" herein refers to a logical combination of a plurality of apparatuses and is not limited to a system in which individual apparatus are included in the same housing.

INDUSTRIAL APPLICABILITY

As described above, according to one embodiment of the present invention, when subsequently acquired data, such as information subsequently generated or downloaded by a user in association with content stored on an information recording medium, is recorded to a hard disk, removable medium, or the like, subsequently-acquired-data search information is set. This allows a subsequently-acquired-data file to be searched for and subsequently acquired data to be obtained based on the subsequently-acquired-data search information.

In addition, according to one embodiment of the present invention, when subsequently acquired data, such as information subsequently generated or downloaded by a user in association with content stored on an information recording medium, is recorded to a hard disk, removable medium, or the like, access control information for the subsequently acquired data is set. This allows access control for each subsequently-acquired-data file to be performed based on the access control information.

Additionally, according to one embodiment of the present invention, directories that can be shared for different content stored on information storage media, for example, a package-shared directory and a studio-shared directory, are set as directories under the subsequently-acquired-data storing directory and search information and access control information for files set in the shared directories are set. This makes it possible to perform efficient search and stringent access control on files set in package-unique directories and files set in the shared files.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An information processing apparatus comprising:
a data processor;
a first memory device; and
a second memory device storing instructions which when executed by the data processor, cause the data processor to:
(a) store, on the first memory device, subsequently acquired data which is subsequently generated or obtained as data associated with content read from an information recording medium;
(b) set, in a subsequently-acquired-data directory set for the first memory device, a directory corresponding to identification information set for the information recording medium or the content; and
(c) after the directory has been set in the subsequently-acquired-data directory, set, in the directory:
(i) a file of the subsequently acquired data; and
(ii) search information which is used to search the file of the subsequently acquired data,
wherein the data processor is configured to (i) perform a virtual combination processing of a data file on the information recording medium and the file of the subsequently acquired data based on the search information, and (ii) store, in a file set in the subsequently-acquired-data directory, a file-name conversion table for files set in the subsequently-acquired-data directory,
wherein the file-name conversion table is configured to convert a first file name associated with a first identifier into a second file name having the same format as the first file name, and convert the first file name associated with a second identifier into a third file name having the same format as the first file name, and
wherein the second file name is different than the third file name.

2. The information processing apparatus of claim 1, wherein the instructions, when executed by the data processor, cause the data processor to:
(a) set, in the subsequently-acquired-data directory set for the first memory device, a shared directory that can be shared for multiple different pieces of identification information set for the information recording medium or the content; and
(b) set, in the set shared directory, a subsequently-acquired-data file and search information for the subsequently-acquired-data file.

3. The information processing apparatus of claim 1, wherein the instructions, when executed by the data processor, cause the data processor to set, as a file associated with the subsequently-acquired-data directory, access control information regarding the subsequently acquired data.

4. The information processing apparatus of claim 3, wherein the access control information includes:
(a) access request information in which access authority information for a directory or a file set in the subsequently-acquired-data directory is recorded; and
(b) access enable/disable information in which access enable/disable information for the file set in the subsequently-acquired-data directory is recorded.

5. The information processing apparatus of claim 1, wherein the file-name conversion table is a table in which file names of the files set in the subsequently-acquired-data directory and file names that serve as converted file names and that are identifiable by a playback-processing execution application are associated with each other.

6. An information processing apparatus comprising:
a data processor; and
a first memory device storing instructions which when executed by the data processor, cause the data processor to:
(a) execute content-playback processing using content read from an information recording medium and subsequently acquired data stored on a second memory device and associated with the content;
(b) obtain, based on identification information set for the information recording medium or the content, search information set in association with the identification information from the second memory device, wherein the identification information corresponds to a directory set in a subsequentlyacquired-data directory set for the second memory device; and
(c) obtain subsequently acquired data associated with the content read from the information recording medium, in accordance with the obtained search information,
wherein the data processor is configured to (i) perform a virtual combination processing of a data file on the information recording medium and a file of the subsequently acquired data based on the search information, and (ii) store, in a file set in the subsequently-acquired-data directory, a file-name conversion table for files set in the subsequently-acquired-data directory,
wherein the file-name conversion table is configured to convert a first file name associated with a first identifier into a second file name having the same format as the first file name, and convert the first file name associated with a second identifier into a third file name having the same format as the first file name, and
wherein the second file name is different than the third file name.

7. The information processing apparatus of claim 6, wherein the instructions, when executed by the data processor, cause the data processor to:
(a) select, from low-order directories in the subsequently-acquired-data directory set for the second memory device, a directory corresponding to the identification information set for the information recording medium or the content;
(b) obtain search information set for the selected directory; and
(c) obtain subsequently acquired data associated with the content read from the information recording medium, in accordance with the obtained search information.

8. The information processing apparatus of claim 6, wherein the instructions, when executed by the data processor, cause the data processor to:
(a) select, from low directories in the subsequently-acquired-data directory set for the second memory device, a shared directory that can be shared for multiple different pieces of identification information set for the information recording medium or the content;
(b) obtain search information set for the selected shared directory; and
(c) obtain subsequently acquired data associated with the content read from the information recording medium, in accordance with the obtained search information.

9. The information processing apparatus according to claim 6, wherein the instructions, when executed by the data processor, cause the data processor to:
(a) obtain access control information set in association with the identification information from the second memory device, based on the identification information set for the information recording medium or the content; and
(b) execute access to subsequently acquired data in accordance with the obtained access control information.

10. The information processing apparatus of claim 6, wherein the instructions, when executed by the data processor, cause the data processor to:
(a) select, from low-order directories in the subsequently-acquired-data directory set for the second memory device, a directory corresponding to the identification information set for the information recording medium or the content;
(b) obtain access control information set for the selected directory; and
(c) execute access to subsequently acquired data in accordance with the obtained access control information.

11. The information processing apparatus of claim 6, wherein the instructions, when executed by the data processor, cause the data processor to:
(a) select, from low-order directories in the subsequently-acquired-data directory set for the second memory device, a shared directory that can be shared for multiple different pieces of identification infoiination set for the information recording medium or the content;
(b) obtain access control information set for the selected directory; and
(c) execute access to subsequently acquired data in accordance with the obtained access control information.

12. The information processing apparatus of claim 6, wherein the instructions, when executed by the data processor, cause the data processor to:
(a) obtain, based on the identification information set for the information recording medium or the content, access control information set in association with the identification information from the second memory device;
(b) access subsequently acquired data in accordance with the obtained access control information, wherein the access control information includes:

(i) access request information in which access authority information for a directory or a file set in the subsequently-acquired-data directory is recorded; and (ii) access enable/disable information in which access enable/disable information for the file set in the subsequently-acquired-data directory is recorded; and (c) execute access-authority checking processing based on the access request information and access-enable/disable checking processing based on the access enable/disable information.

13. The information processing apparatus of claim 6, wherein the instructions, when executed by the data processor, cause the data processor to:

(a) read the file-name conversion table for files stored on the second memory device from the second memory device;

(b) convert files names of the files stored on the second memory device in accordance with the file-name conversion table; and (c) generate a virtual file system in which the converted files names serve as setting file names.

14. The information processing apparatus of claim 6, wherein the instructions, when executed by the data processor, cause the data processor to:

(a) read tamper-verifying data for a file or a file group stored on the second memory device from the second memory device; and (b) execute, based on the tamper-verifying data, tamper-verification processing of a subsequently-acquired-data file to be used.

15. A method of operating an information processing apparatus including instructions, the method comprising:

(a) causing a data processor to execute the instructions to store, on a memory device, subsequently acquired data which is subsequently generated or obtained as data associated with content read from an information recording medium;

(b) causing the data processor to execute the instructions to set, in a subsequentlyacquired-data directory set for the memory device, a low-order directory corresponding to identification information set for the information recording medium or the content;

(c) causing the data processor to execute the instructions to set, in the set low-order directory, a file of the subsequently acquired data and search information for the file of the subsequently acquired data;and (d) causing a data processor to execute the instructions to (i) perform a virtual combination processing of a data file on the information recording medium and the file of the subsequently acquired data based on the search information, and (ii) store, in a file set in the subsequently-acquired-data directory, a file-name conversion table for files set in the subsequently-acquired-data directory, wherein the file-name conversion table is configured to convert a first file name associated with a first identifier into a second file name having the same format as the first file name, and convert the first file name associated with a second identifier into a third file name having the same format as the first file name, and wherein the second file name is different than the third file name.

16. A method of operating an information processing apparatus, the method comprising:

(a) causing a data processor to execute the instructions to execute content-playback processing using content read from an information recording medium and subsequently acquired data stored on a memory device and associated with the content;

(b) causing the data processor to execute the instructions to obtain, based on identification information set for the information recording medium or the content, search information set in association with the identification information from the memory device, wherein the identification information corresponds to a directory set in a subsequently-acquired-data directory set for the memory device;

(c) causing the data processor to execute the instructions to obtain subsequently acquired data associated with the content read from the information recording medium, in accordance with the obtained search information; and (d) causing a data processor to execute the instructions to wherein the data processor is configured to (i) perform a virtual combination processing of a data file on the information recording medium and a file of the subsequently acquired data based on the search information, and (ii) store, in a file set in the subsequently-acquired-data directory, a file-name conversion table for files set in the subsequently-acquired-data directory, wherein the file-name conversion table is configured to convert a first file name associated with a first identifier into a second file name having the same format as the first file name, and convert the first file name associated with a second identifier into a third file name having the same format as the first file name, and wherein the second file name is different than the third file name.

17. A non-transitory computer readable medium storing instructions which, when executed, causes an information processing apparatus to:

(a) store, on a memory device, storing subsequently acquired data, which is subsequently generated or obtained as data associated with content read from an infoimation recording medium;

(b) set, in a subsequently-acquired-data directory set for the memory device, a low-order directory corresponding to identification information set for the information recording medium or the content;

(c) set, in the set low-order directory, a file of the subsequently acquired data and search information for the file of the subsequently acquired data;

(d) perform a virtual combination processing of a data file on the information recording medium and the file of the subsequently acquired data based on the search information; and (e) store, in a file set in the subsequently-acquired-data directory, a file-name conversion table for files set in the subsequently-acquired-data directory, wherein the file-name conversion table is configured to convert a first file name associated with a first identifier into a second file name having the same format as the first file name, and convert the first file name associated with a second identifier into a third file name having the same format as the first file name, and wherein the second file name is different than the third file name.

18. A non-transitory computer readable medium storing instructions which, when executed, causes an information processing apparatus to:

(a) execute content-playback processing using content read from an information recording medium and subsequently acquired data stored on a memory device and associated with the content;

(b) obtain, based on identification information set for the information recording medium or the content, search information set in association with the identification information from the memory device, wherein the identification information corresponds to a directory set in a subsequently-acquired-data directory set for the memory device;
(c) obtain subsequently acquired data associated with the content read from the information recording medium, in accordance with the obtained search information;
(d) perform a virtual combination processing of a data file on the information recording medium and a file of the subsequently acquired data based on the search information; and
(e) store, in a file set in the subsequently-acquired-data directory, a file-name conversion table for files set in the subsequently-acquired-data directory,
wherein the file-name conversion table is configured to convert a first file name associated with a first identifier into a second file name having the same format as the first file name, and convert the first file name associated with a second identifier into a third file name having the same format as the first file name, and
wherein the second file name is different than the third file name.

* * * * *